US009267809B2

(12) United States Patent
Karasawa et al.

(10) Patent No.: US 9,267,809 B2
(45) Date of Patent: Feb. 23, 2016

(54) CONTROL APPARATUS AND METHOD FOR CONTROLLING OPERATION TARGET DEVICE IN VEHICLE, AND STEERING WHEEL

(71) Applicant: JVC KENWOOD Corporation, Yokohama-shi, Kanagawa (JP)

(72) Inventors: Manabu Karasawa, Yokohama (JP); Koichi Nakajima, Yokohama (JP); Ryo Kondo, Yokohama (JP); Toru Doigaki, Yokohama (JP); Shunsuke Fukuda, Yokohama (JP); Ryo Idegami, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 14/176,626

(22) Filed: Feb. 10, 2014

(65) Prior Publication Data

US 2014/0156107 A1    Jun. 5, 2014

Related U.S. Application Data

(63) Continuation of application No. PCT/JP2012/059712, filed on Apr. 9, 2012.

(30) Foreign Application Priority Data

| Aug. 11, 2011 | (JP) | 2011-176168 |
|---|---|---|
| Sep. 14, 2011 | (JP) | 2011-200563 |
| Sep. 15, 2011 | (JP) | 2011-201354 |
| Sep. 15, 2011 | (JP) | 2011-201356 |
| Sep. 21, 2011 | (JP) | 2011-206096 |
| Sep. 21, 2011 | (JP) | 2011-206099 |
| Sep. 21, 2011 | (JP) | 2011-206150 |
| Sep. 28, 2011 | (JP) | 2011-212025 |
| Jan. 18, 2012 | (JP) | 2012-007894 |
| Feb. 29, 2012 | (JP) | 2012-043554 |
| Mar. 28, 2012 | (JP) | 2012-073562 |

(51) Int. Cl.
*G06F 17/00* (2006.01)
*G01C 21/36* (2006.01)

(Continued)

(52) U.S. Cl.
CPC ............ *G01C 21/3664* (2013.01); *B60K 20/06* (2013.01); *B60K 35/00* (2013.01);
(Continued)

(58) Field of Classification Search
CPC ............ B62D 6/00; B62D 11/24; B62D 1/04; B62D 1/046; G06F 9/455; G06F 17/00; G06F 3/033; G06F 1/16; G06F 3/023; G06F 1/1626; G06F 3/048883; B60Q 1/50; B60Q 1/00; B60K 37/04; B60K 37/06; B60K 20/06; B60K 35/00; G60F 1/1662; G09G 5/00; G06K 9/00; G01C 21/3664
See application file for complete search history.

(56) References Cited

U.S. PATENT DOCUMENTS

| 5,365,803 A * | 11/1994 | Kelley | .................. | B60K 20/06 |
|---|---|---|---|---|
| | | | | 180/333 |
| 6,418,362 B1 * | 7/2002 | St. Pierre | ............... | B60K 37/06 |
| | | | | 280/778 |

(Continued)

FOREIGN PATENT DOCUMENTS

| JP | 61-161852 U | 10/1986 |
|---|---|---|
| JP | 3-129513 A | 6/1991 |

(Continued)

OTHER PUBLICATIONS

Japanese Office Action dated Apr. 14, 2015 issued in corresponding Japanese Patent Application No. 2012-091845.

(Continued)

*Primary Examiner* — Behrang Badii
(74) *Attorney, Agent, or Firm* — Nath, Goldberg & Meyer; Jerald L. Meyer; Stanley N. Protigal

(57) ABSTRACT

A first detector is configured to detect a state where a first area in a touch sensor mounted on a grip portion that a driver grips on a steering wheel is touched. A second detector is configured to detect a state where a particular input operation is performed on a second area located on the upper side of the first area in the touch sensor. A controller is configured to control an operation target device to be operated with the touch sensor according to the particular input operation when the first detector detects the state where the first area is touched and the second detector detects the state where the particular input operation is performed.

6 Claims, 45 Drawing Sheets

(51) Int. Cl.
    *G06F 1/16*        (2006.01)
    *B60K 37/06*       (2006.01)
    *B60Q 1/00*        (2006.01)
    *B62D 6/00*        (2006.01)
    *G06F 3/023*       (2006.01)
    *B60K 35/00*       (2006.01)
    *B62D 1/04*        (2006.01)
    *B60K 37/04*       (2006.01)
    *B60K 20/06*       (2006.01)

(52) U.S. Cl.
    CPC ............... *B60K 37/04* (2013.01); *B60K 37/06* (2013.01); *B60K 2350/1024* (2013.01); *B60K 2350/928* (2013.01); *B60Q 1/00* (2013.01); *B62D 1/046* (2013.01); *B62D 6/00* (2013.01); *G06F 1/16* (2013.01); *G06F 3/023* (2013.01); *G06F 17/00* (2013.01)

(56) References Cited

U.S. PATENT DOCUMENTS

| | | | | |
|---|---|---|---|---|
| 6,626,062 | B1* | 9/2003 | Yoshitake | B60K 37/06 74/552 |
| 7,295,904 | B2* | 11/2007 | Kanevsky et al. | 701/36 |
| 2004/0030807 | A1* | 2/2004 | Wessler | G06F 1/1626 710/1 |
| 2006/0047386 | A1* | 3/2006 | Kanevsky | B60K 35/00 701/36 |
| 2007/0062753 | A1 | 3/2007 | Yoshida et al. | |
| 2011/0057785 | A1 | 3/2011 | Golomb | |
| 2012/0150388 | A1* | 6/2012 | Boissonnier | B62D 1/046 701/41 |

FOREIGN PATENT DOCUMENTS

| | | |
|---|---|---|
| JP | 06-156114 A | 6/1994 |
| JP | 10-334771 A | 12/1998 |
| JP | 2000-228126 A | 8/2000 |
| JP | 2005-228353 A | 8/2005 |
| JP | 2005-348123 A | 12/2005 |
| JP | 2006-341729 A | 12/2006 |
| JP | 2007-076491 A | 3/2007 |
| JP | 2007-106353 A | 4/2007 |
| JP | 2008-87566 A | 4/2008 |
| JP | 2008-195220 A | 8/2008 |
| JP | 2009-248629 A | 10/2009 |
| JP | 2009-301300 A | 12/2009 |

OTHER PUBLICATIONS

Japanese Office Action dated Apr. 14, 2015 issued in corresponding Japanese Patent Application No. 2012-091848.
Office Action dated Apr. 22, 2015 issued in corresponding Japanese Application No. 2012-043537.
Office Action dated Apr. 22, 2015 issued in corresponding Japanese Application No. 2012-043543.
Office Action dated Apr. 22, 2015 issued in corresponding Japanese Application No. 2012-091897.
Office Action dated Apr. 22, 2015 issued in corresponding Japanese Application No. 2012-091892.

* cited by examiner

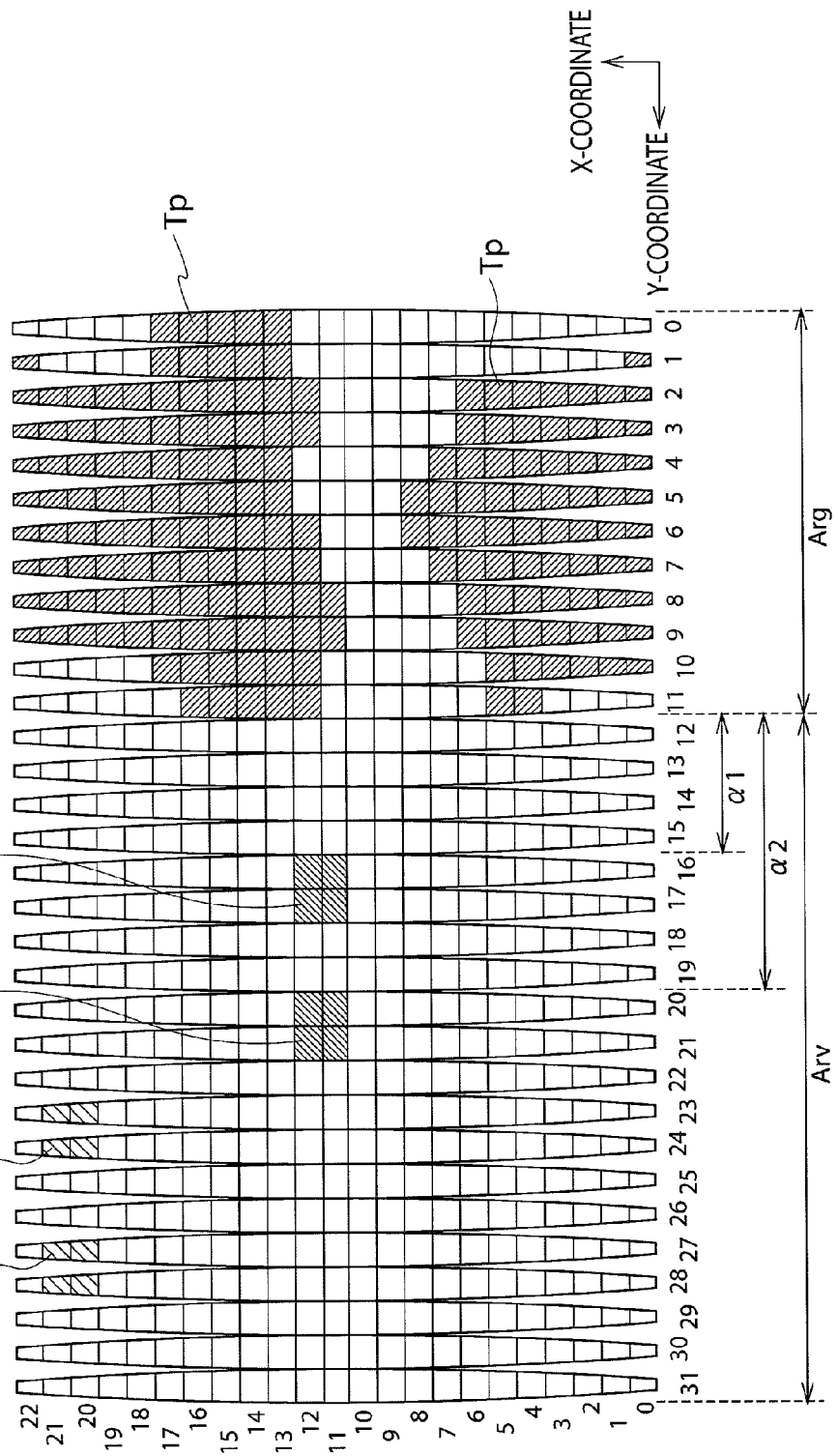

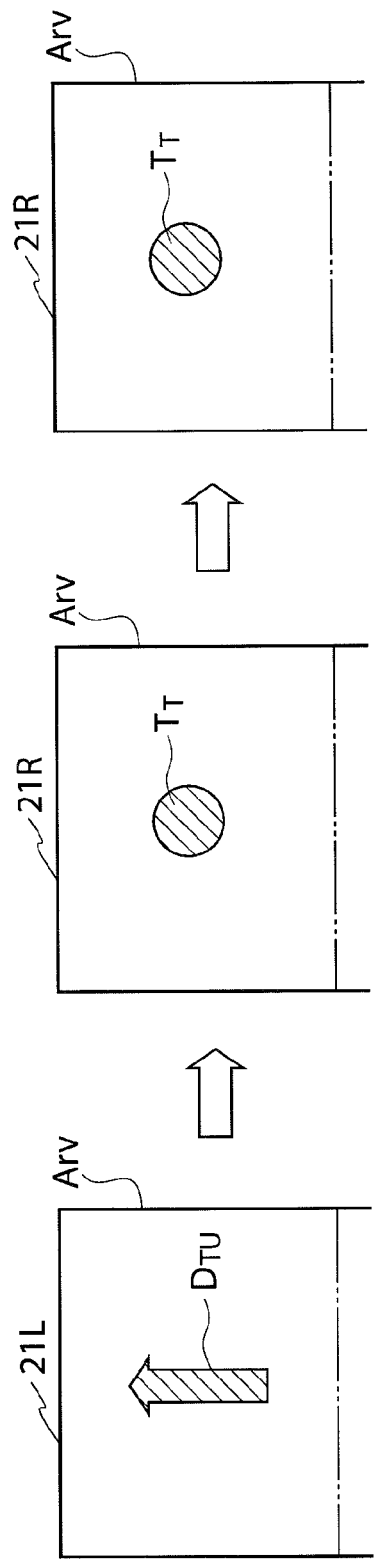

| DRIVER | Lx | Lya | Lyb | CONTACT DETECTION REGION TOTAL NUMBER |
|--------|----|----|----|---------------------------------------|
| A | 21 | 16 | 22 | 190 |
| B | 18 | 14 | 20 | 164 |
| C | 23 | 18 | 24 | 226 |

CONTROL APPARATUS AND METHOD FOR CONTROLLING OPERATION TARGET DEVICE IN VEHICLE, AND STEERING WHEEL

CROSS REFERENCE TO RELATED APPLICATION

This application is a Continuation of PCT Application No. PCT/JP2012/059712, filed on Apr. 9, 2012, and claims the priority of Japanese Patent Applications No. 2011-176168, filed on Aug. 11, 2011, No. 2011-200563, filed on Sep. 14, 2011, No. 2011-201354, filed on Sep. 15, 2011, No. 2011-201356, filed on Sep. 15, 2011, No. 2011-206096, filed on Sep. 21, 2011, No. 2011-206099, filed on Sep. 21, 2011, No. 2011-206150, filed on Sep. 21, 2011, No. 2011-212025, filed on Sep. 28, 2011, No. 2012-007894, filed on Jan. 18, 2012, No. 2012-043554, filed on Feb. 29, 2012, and No. 2012-073562, filed on Mar. 28, 2012, the entire contents of all of which are incorporated herein by reference.

BACKGROUND

The present disclosure relates to a control apparatus and method for controlling an operation target device, which is onboard equipment such as a navigation device or a vehicle action control device that controls actions of a vehicle such as a transmission and a direction indicator, and relates to a steering wheel suitable to operate the operation target device.

Operation switches located on steering wheels, for operating onboard equipment such as an installed navigation device, are widely used in vehicles (refer to Japanese Unexamined Patent Application Publication No. 2007-106353 (Patent Literature 1)).

The operation switches located on the steering wheel improve operability because a driver is not required to stretch the arm to operate the onboard equipment.

As is described in Patent Literature 1, such operation switches are generally located not on a circular portion of a steering wheel, which is a grip portion that a driver grips with the hands, but on a connection area connecting the circular portion and a center portion in which an air bag is housed.

Therefore, the driver is required to remove or widely slide the hands from the circular portion gripping for operating the operation switches.

Japanese Unexamined Patent Application Publication No. 2005-348123 (Patent Literature 2) discloses that operation switches are located on a back surface or an inner side surface of a circular portion of a steering wheel.

SUMMARY

According to Patent Literature 2, since the operation switches are located on the circular portion, a driver can operate the operation switches without removing or widely sliding the hands from the circular portion.

However, the operation switches described in Patent Literature 2 which are push-button keys or recess/projection keys may have an adverse effect on the driver when operating the steering wheel. Such recesses/projections are not preferable to be located on the circular portion that the driver grips.

Further, an operation target device should be prevented from being unnecessarily operated with an operation unit, such as operation switches located on a circular portion, when a driver has no intention of operating the operation target device while gripping the circular portion during normal driving.

A first aspect of the embodiments provides a control apparatus for controlling an operation target device in a vehicle, including: a first detector configured to detect a state where a first area in a touch sensor mounted on a grip portion that a driver grips on a steering wheel is touched; a second detector configured to detect a state where a particular input operation is performed on a second area located on the upper side of the first area in the touch sensor; and a controller configured to control an operation target device to be operated with the touch sensor according to the particular input operation when the first detector detects the state where the first area is touched and the second detector detects the state where the particular input operation is performed.

A second aspect of the embodiments provides a method for controlling an operation target device in a vehicle, including: detecting a state where a first area in a touch sensor mounted on a grip portion that a driver grips on a steering wheel is touched; detecting a particular input being performed on a second area located on the upper side of the first area in the touch sensor in the state where the first area is touched; and controlling an operation target device to be operated with the touch sensor according to the particular input operation when detecting the particular input operation being performed.

BRIEF DESCRIPTION OF THE DRAWINGS

FIG. 23 is a plan view showing a state where the touch sensor shown in FIG. 6 is developed and explaining another constitution example for determining whether a driver intends to operate the operation target device.

FIG. 29 is a view showing a second example of setting an operation mode according to a combination of input operations on both right and left touch sensors with right and left hands.

DETAILED DESCRIPTION

First Embodiment

Hereinafter, a control apparatus and method for controlling an operation target device in a vehicle according to a first embodiment will be explained with reference to the accompanying drawings. Further, a steering wheel according to at least one embodiment will be explained.

Figure 1:
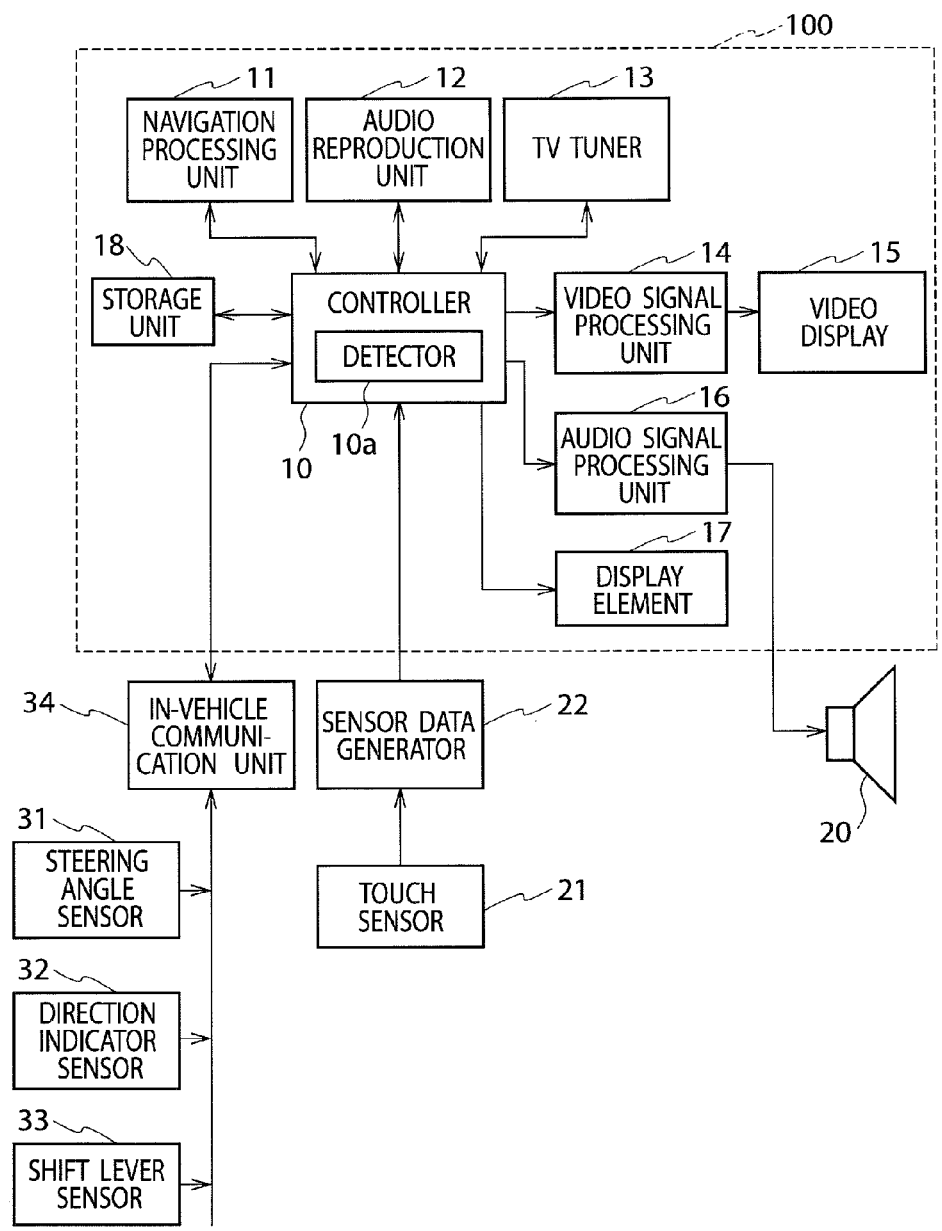
FIG. 1 is a block diagram showing a control apparatus for controlling an operation target device in a vehicle according to each embodiment.
Figure 2:
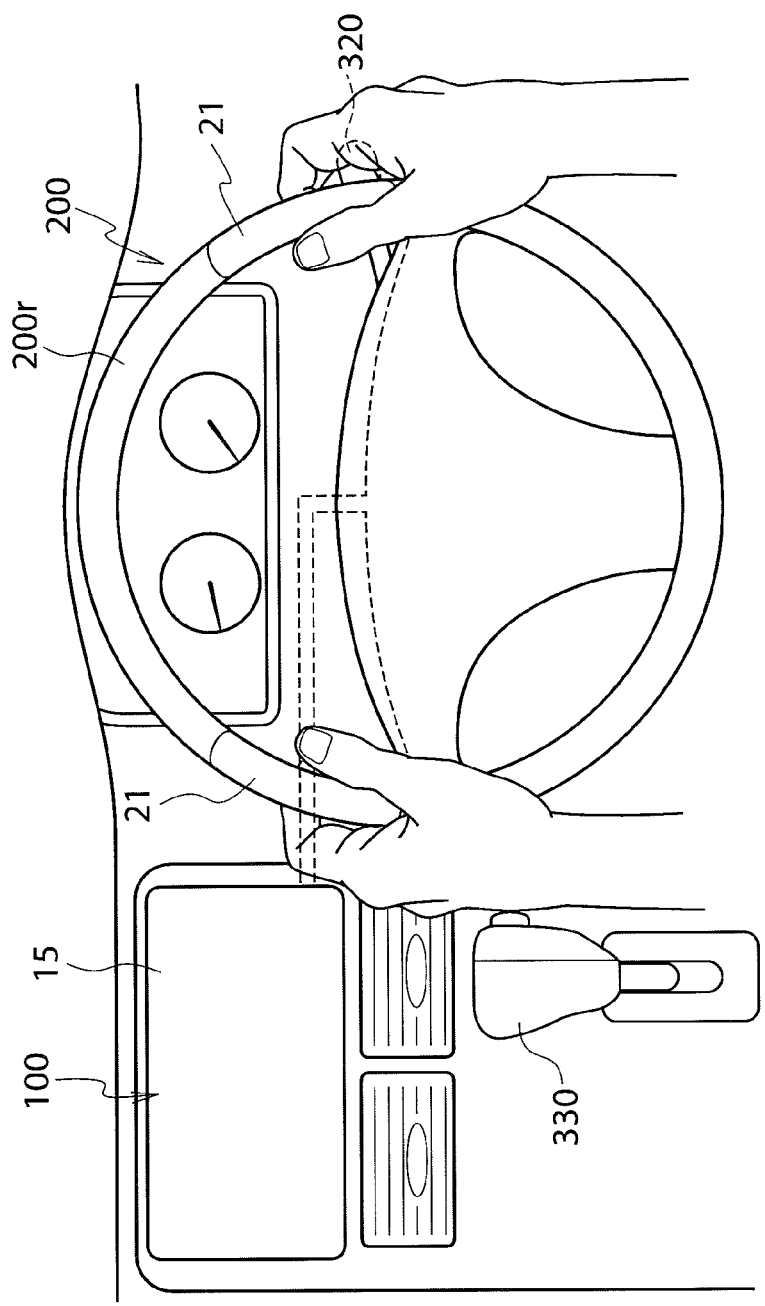
FIG. 2 is a flat partial view showing an example of a vehicle including the control apparatus for controlling an operation target device according to each embodiment.

As shown in FIG. 1 and FIG. 2, onboard equipment 100 is installed in a dashboard of a vehicle. In the example shown in FIG. 1, the onboard equipment 100 includes a controller 10, a navigation processing unit 11, an audio reproduction unit 12, a television (TV) tuner 13, a video signal processing unit 14, a video display 15, an audio signal processing unit 16, a display element 17, and a storage unit 18. The controller 10 includes a detector 10a.

The navigation processing unit 11 includes, for example, a storage unit for storing map data and a GPS antenna. The navigation processing unit 11 serves as a route guide in association with the controller 10.

The audio reproduction unit 12 reproduces audio signals stored in an optical disc such as a compact disc or a semiconductor memory in accordance with the control by the controller 10.

The TV tuner 13 receives TV broadcast wave signals from predetermined broadcasting stations in accordance with the control by the controller 10.

Video signals output from the navigation processing unit 11 or the TV tuner 13 are input to the video signal processing unit 14 via the controller 10 and processed so as to be displayed on the video display 15 such as a liquid crystal panel.

Audio signals output from the navigation processing unit 11, the audio reproduction unit 12 and the TV tuner 13 are input to the audio signal processing unit 16 and processed so as to be produced from an external speaker 20. The audio signal processing unit 16 includes an amplifier.

The speaker 20 is located, for example, in the inside of a door of the vehicle. The display element 17 is, for example, a light emitting diode (LED) and turns on or turns off depending on a contact state of a touch sensor 21 described below in accordance with the control by the controller 10. The display element 17 is located, for example, in a casing of the onboard equipment 10 so that the driver can visually recognize the display element 17.

The display element 17 may be separated from the onboard equipment 100 and located adjacent to a steering wheel 200 of the vehicle. The storage unit 18 is a nonvolatile memory.

As shown in FIG. 2, touch sensors 21 serving as an operation unit are mounted on a circular portion 200r of the steering wheel 200. The circular portion 200r is a grip portion that the driver grips during driving.

In the example shown in FIG. 2, the touch sensors 21 are mounted within predetermined angle ranges on both right and left sides of the circular portion 200r. The touch sensors 21 are multi-touch sensors capable of detecting contact of plural parts.

The touch sensors 21 are each preferably mounted around 360 degrees of the circumference of the cross section in the radial direction of the circular portion 200r. Here, the touch sensors 21 may cover substantially the entire circumference of the cross section of the circular portion 200r and are not required to be mounted completely around 360 degrees of the circumference of the cross section.

The driver grips part of the circular portion 200r on which the touch sensors 21 are mounted. In FIG. 1, the output from the touch sensors 21 is input into a sensor data generator 22. When the driver touches the touch sensors 21 with the hands, a contact detection signal is input into the sensor data generator 22.

The sensor data generator 22 generates, based on the input contact detection signal, sensor data including positional data showing which region in the touch sensors 22 the contact detection signal is obtained from and then supplies the data to the controller 10. The touch sensors 21 and the sensor data generator 22 may be integrated together, or the sensor data generator 22 may be positioned inside the controller 10.

The touch sensor 21 may be a projected capacitive (mutual capacitance) type touch sensor. An example of the touch sensor 21 mounted on the circular portion 200r may be a flexible touch panel developed by MICRO TECHNOLOGY CO., LTD.

This flexible touch panel has a constitution in which a sensor portion is made of an ultra-slim plate glass with a thickness of 0.02 to 0.05 mm, and the ultra-slim plate glass is attached to a polyethylene terephthalate (PET) film.

There is almost no possibility that the touch sensors 21 mounted on the circular portion 200r are obstacles to operation of the steering wheel 200 performed by the driver since the surfaces of the touch sensors 21 do not have recesses/projections that the driver can recognize with the hands or fingers.

As indicated by dashed lines in FIG. 2, the touch sensors 21 and the onboard equipment 100 may be connected via electric wires placed inside the steering wheel 200 and the dash board.

In FIG. 1 and FIG. 2, a steering angle sensor 31 detects a turning angle of the steering wheel 200. A direction indicator sensor 32 detects a direction indicator 320 being operated. A shift lever sensor 33 detects a position where a shift lever 330 is located.

The respective detection signals from the steering angle sensor 31, the direction indicator sensor 32 and the shift lever sensor 33 are supplied to the controller 10 via an in-vehicle communication unit 34.

The following is an explanation of examples of a location and range of the touch sensors 21 mounted on the circular portion 200r of the steering wheel 200 with reference to FIG. 3A to FIG. 3E. Note that the top, the bottom, the right and the left described below represent those of the steering wheel 200 when the driver sees the steering wheel 200 in a state where the steering wheel 200 is not turned (in a state where the vehicle goes straight).

Figure 3A:
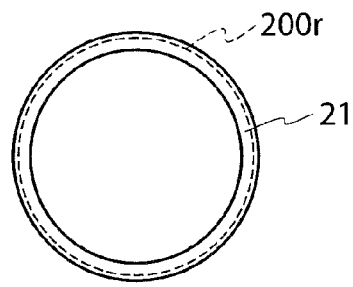
FIG. 3A to FIG. 3E are views each showing an example of a location and range of touch sensors mounted on a steering wheel according to each embodiment.
Figure 3B:
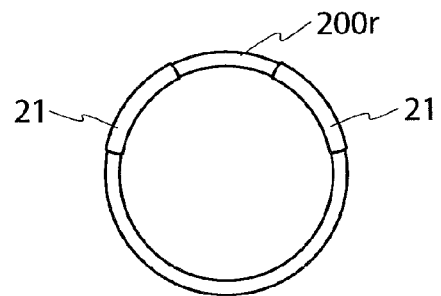
Figure 3C:
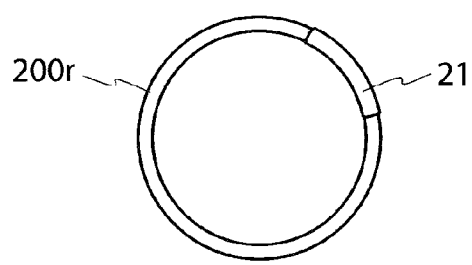

FIG. 3A is an example in which the touch sensor 21 is mounted on the entire circumference of the circular portion 200r. FIG. 3B is an example in which the touch sensors 21 are separately mounted within predetermined angle ranges on both upper right and upper left sides of the circular portion 200r, as in the case of FIG. 2. FIG. 3C is an example in which the touch sensor 21 is mounted within a predetermined angle range only on the upper right side of the circular portion 200r.

Figure 3D:
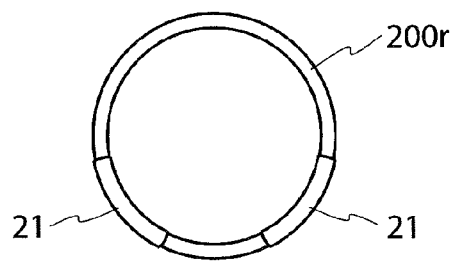
Figure 3E:
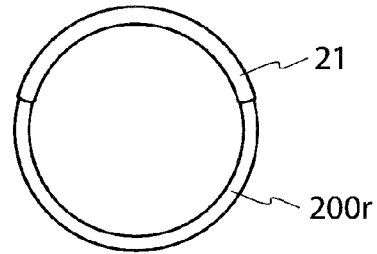

FIG. 3D is an example in which the touch sensors 21 are separately mounted within predetermined angle ranges on both lower right and lower left sides of the circular portion 200r. FIG. 3E is an example in which the touch sensor 21 is mounted in a relatively wide angle range on the upper side of the circular portion 200r including the top thereof. FIG. 3E corresponds to an example in which the touch sensors 21 on the right and left sides shown in FIG. 3B are connected together.

Figure 4:
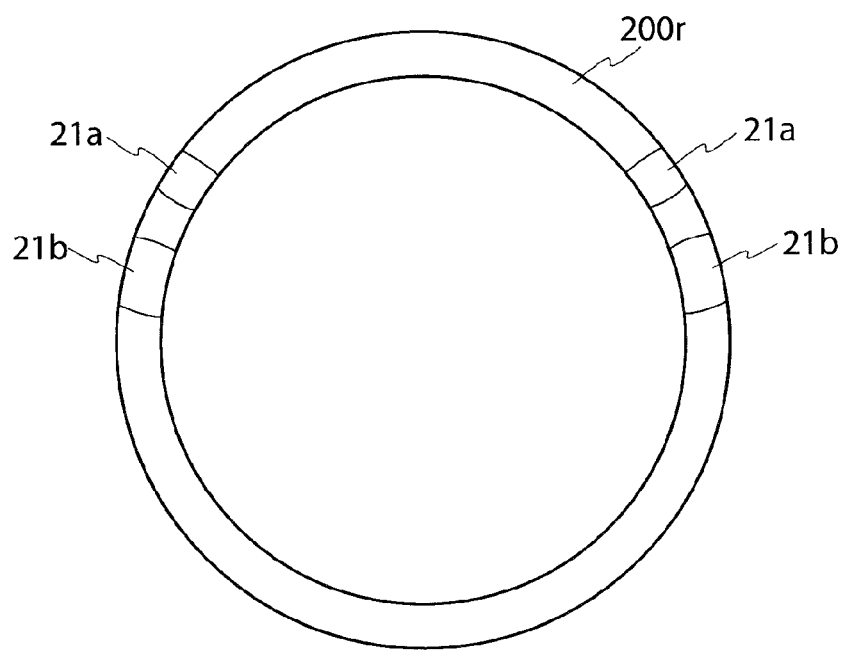
FIG. 4 is a view showing another example of a location and range of the touch sensors mounted on the steering wheel according to each embodiment.

FIG. 4 is an example in which the touch sensors 21 on the right and left sides in FIG. 3B are each divided into an upper touch sensor 21a and a lower touch sensor 21b. In the example of FIG. 4, the upper touch sensor 21a detects contact of the index finger and the thumb, and the lower touch sensor 21b detects contact of mainly the palm, the second finger and the third finger.

Figure 5:
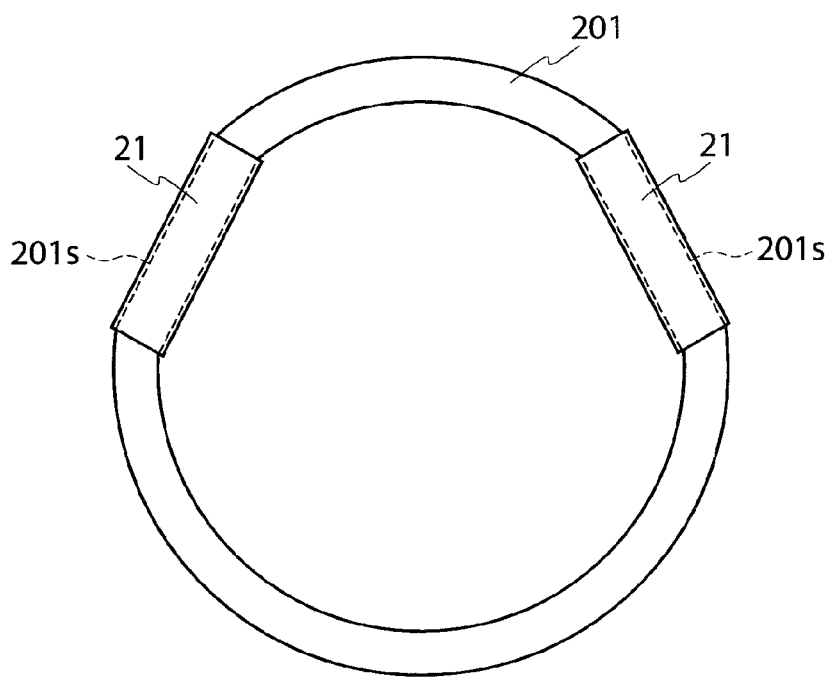
FIG. 5 is a view showing an example in which the touch sensors are mounted on a deformed steering wheel.

FIG. 5 is an example in which the touch sensors 21 are mounted on a deformed steering wheel 201 not having a round shape. The touch sensors 21 are mounted on straight portions 201s on both right and left sides of the deformed steering wheel 201. The driver drives while gripping the straight portions 201s serving as grip portions, and the touch sensors 21 detect contact of the palms and the fingers.

The following is how to detect contact of the palms and the fingers with the touch sensors 21 mounted on the upper right and upper left sides of the circular portion 200r in a state where the driver is holding the touch sensors 21, as shown in FIG. 2.

Figure 6:
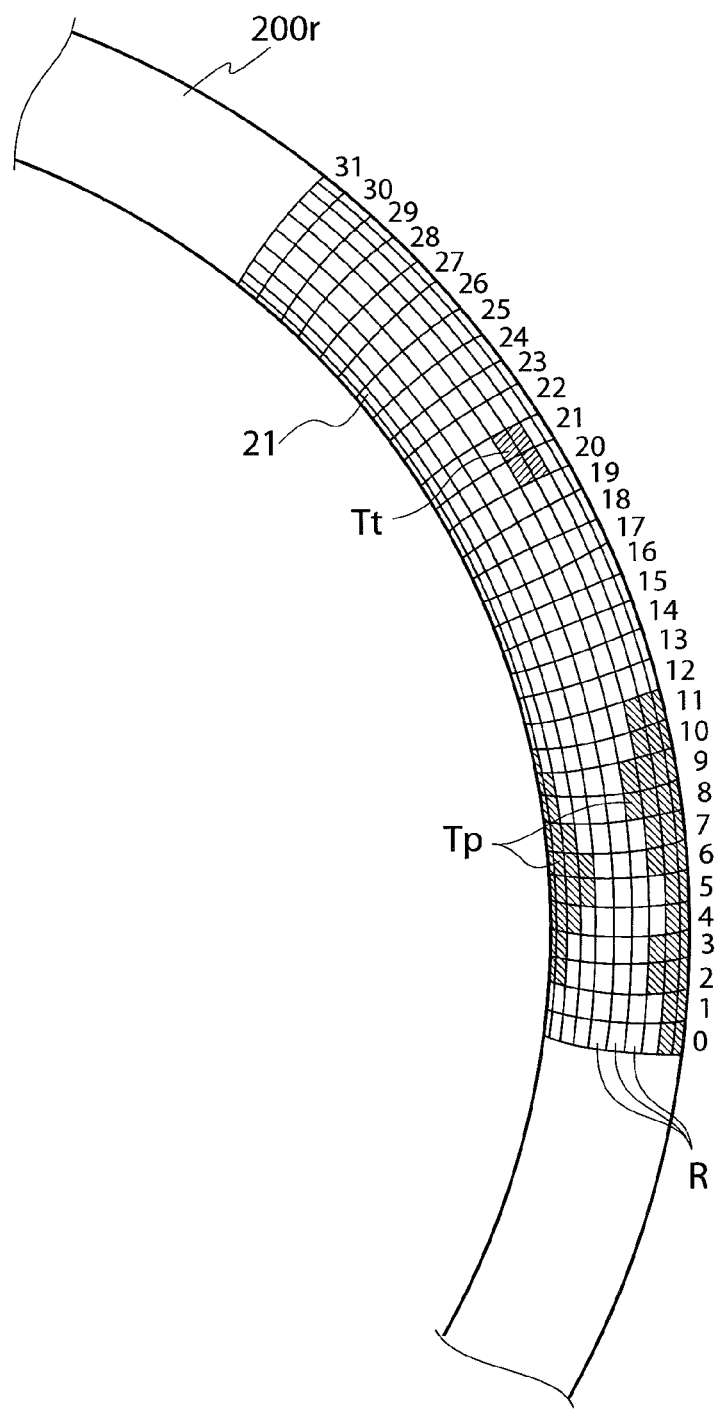
FIG. 6 is a partial perspective view showing an example of regions from which sensor data is obtained while the touch sensor on the steering wheel is held.

FIG. 6 is an example showing contact ranges of the palm and the fingers when the driver holds the touch sensor 21 on the right side in FIG. 2. Note that FIG. 6 is an example, and the way of gripping the circular portion 200r with the hand of the driver and the size of the hand are not particularly limited.

FIG. 6 shows plural hatched detection regions R indicated by reference sign Tp where the contact of the palm is detected, and shows plural hatched detection regions R indicated by reference sign Tt where the contact of the thumb is detected.

Hereinafter, reference sign Tp is referred to as a palm contact detection portion Tp, and reference sign Tt is referred to as a thumb contact detection portion Tt. The index finger comes into contact with the rear side of the touch sensor 21, which is the traveling direction side of the vehicle not shown in FIG. 6.

As shown in FIG. 6, the touch sensor 21 has the plural detection regions R that detect the contact of the palm and the fingers. Coordinates are assigned to the respective detection regions R of the touch sensor 21.

As shown in FIG. 6, one of the coordinates of the detection regions R at the lower end of the touch sensor 21 in the circumferential direction of the circular portion 200r is set to zero, and the respective coordinates of the detection regions R from the lower end to the upper end of the touch sensor 21 in the circumferential direction are sequentially set to 1, 2, ..., 30 and 31. The respective coordinates of the touch sensor 21 in the circumferential direction of the circular portion 200r is defined as a Y-coordinate.

Figure 7:
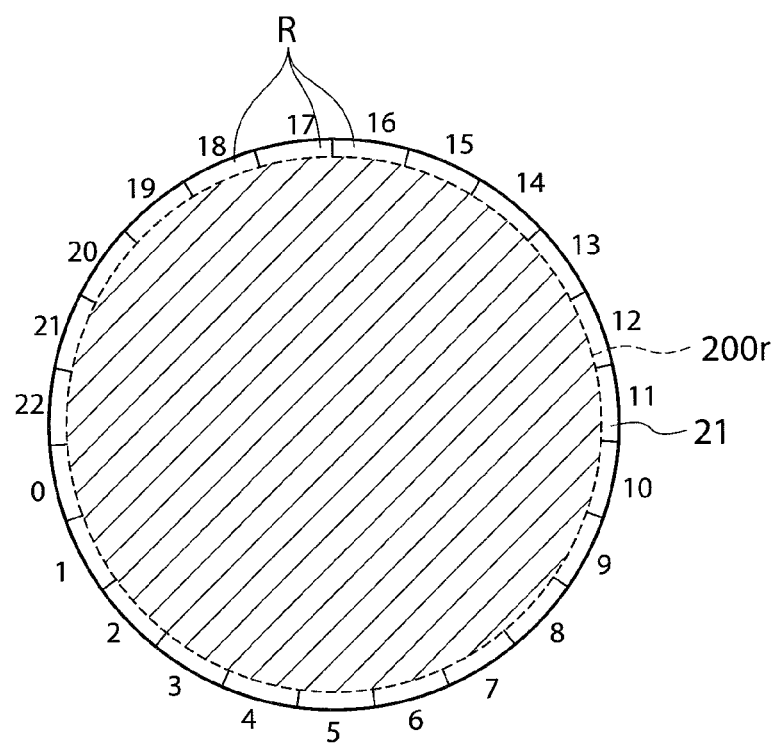
FIG. 7 is a cross-sectional view showing coordinates in a circumferential direction in the cross section of the touch sensor.

FIG. 7 is a cross-sectional view in the radial direction of the circular portion 200r at a position where the touch sensor 21 is mounted.

As shown in FIG. 7, one of the coordinates of the detection regions R, for example, on the inner diameter side in the cross section of the circular portion 200r is set to zero. The respective coordinates of the detection regions R in the circumferential direction in the cross section of the circular portion 200r are sequentially set to 1, 2, ..., 21 and 22 in a counter-clockwise direction in FIG. 7 from the inner diameter side to the front side, from the front side to the outer diameter side, from the outer diameter side to the rear side, and from the rear side to the inner diameter side. The respective coordinates of the touch sensor 21 in the circumferential direction in the cross section is defined as an X-coordinate.

The sensor data generator 22 can obtain positional data showing which part in the touch sensor 21 the driver touches based on the detection regions R on the X-coordinate and the Y-coordinate from which contact detection signals are obtained.

Figure 8:
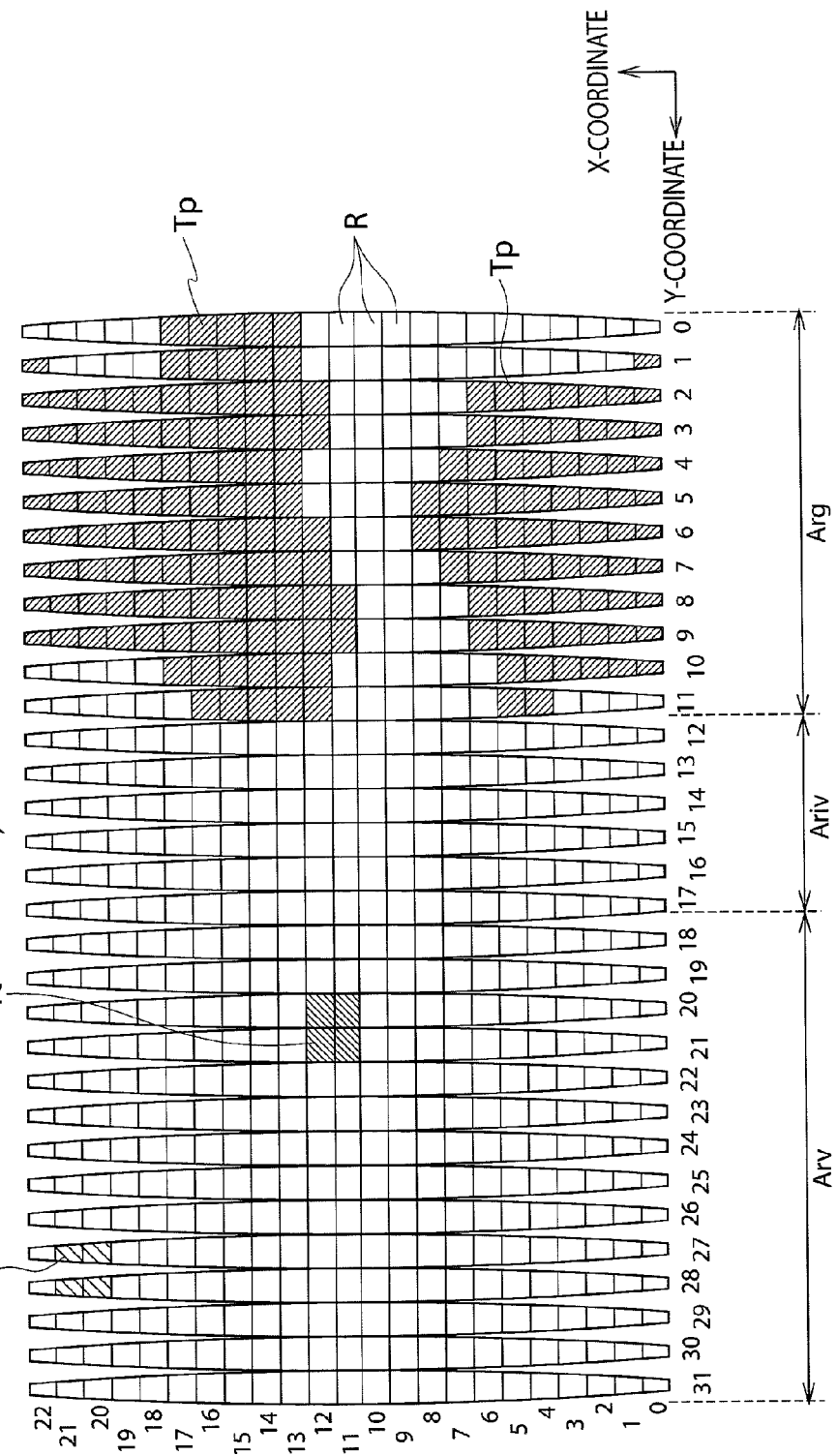
FIG. 8 is a plan view showing a state where the touch sensor shown in FIG. 6 is developed.
Figure 9:
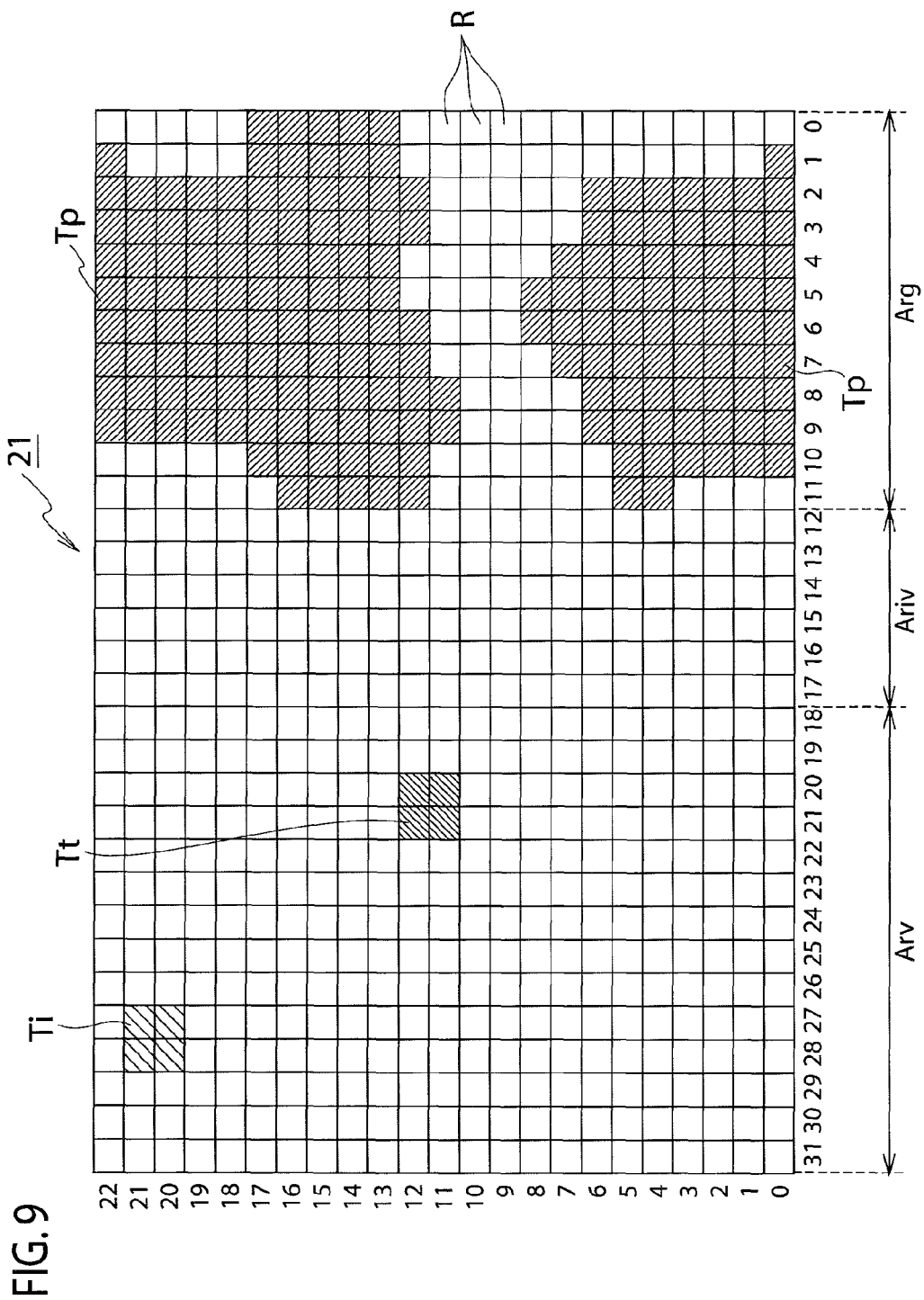
FIG. 9 is a schematic view showing a state where each region shown in FIG. 8 is converted into a uniform size.

FIG. 8 shows a state where the touch sensor 21 shown in FIG. 6 is developed. FIG. 9 schematically shows a state where each region in the touch sensor 21 shown in FIG. 8 is converted into a uniform size.

FIG. 8 and FIG. 9 each show index finger contact detection portions Ti which are plural detection regions R in contact with the index finger, in addition to the palm contact detection portions Tp and the thumb contact detection portions Tt. Here, when the second finger, the third finger or the fourth finger comes into contact with the touch sensor 21, the touch sensor 21 also detects the contact of the respective fingers.

Note that, in the present embodiment, the thumb or the index finger is used as a finger suitable for a particular input operation performed on the touch sensor 21 by the driver.

The input operation performed with the thumb or the index finger will be explained in detail below. The detector 10a of the controller 10 detects the input operation performed on the touch sensor 21 with the thumb or the index finger based on the sensor data output from the sensor data generator 22.

The detector 10a also detects the circular portion 200r (the touch sensor 21) being held based on the sensor data output from the sensor data generator 22. The controller 10 controls an operation target device according to the particular input operation performed on the touch sensor 21.

An example of the operation target device is the onboard equipment 100. In particular, in accordance with the particular input operation, the controller 10 can control the navigation processing unit 11 to carry out route guiding or control the audio reproduction unit 12 to reproduce/stop audio signals or advance/reverse reproducing tracks (compositions).

Further, in accordance with the particular input operation, the controller 10 can control the TV tuner 13 to change receiving channels and control the amplifier of the audio signal processing unit 16 to turn the volume up or down.

Another example of the operation target device is a vehicle action control device that controls actions of the vehicle. In particular, the controller 10 may control a transmission, a direction indicator, an ON/OFF state of an air conditioner, or temperature setting of the air conditioner via the in-vehicle communication unit 34.

When the operation target device is the vehicle action control device, the sensor data output from the sensor data generator 22 is preferably input into a control unit installed in the vehicle so as to control the vehicle action control device. The control unit that controls the operation target device may be the controller 10 in the onboard equipment 100 or may be an external control unit located outside the onboard equipment 100 installed in the vehicle.

According to the present embodiment, since the driver operates the operation target device with the quite thin touch sensor 21 mounted on the circular portion 200r that the driver holds, the driver can operate the operation target device without removing or widely sliding the hands from the circular portion 200r.

Further, there is almost no possibility that the touch sensor 21 is an obstacle to operation of the steering wheel 200 performed by the driver since the surface of the touch sensor 21 does not have recesses/projections.

Here, the operation target device is required to be prevented from being unnecessarily operated by the driver when the driver has no intention of operating the operation target device such as during normal driving with the circular portion 200r held with the hands. According to the present embodiment, the following are measures to prevent unintended incorrect operation by the driver.

As shown in FIG. 8 and FIG. 9, a grip detection area Arg for detecting contact of the palm, an operation detection area Arv for detecting an operation input performed with the thumb or the index finger as an effective operation input, and an operation invalid area Ariv where an operation input is invalid located between the grip detection area Arg and the operation detection area Arv, are arranged in the plural detection regions R on the touch sensor 21.

The palm contact detection portions Tp are located in the grip detection area Arg, and the thumb contact detection portions Tt and the index finger contact detection portions Ti are located in the operation detection area Arv.

Although the operation invalid area Ariv also includes the detection regions R that detect contact of the palm or fingers as in the case of the grip detection area Arg and the operation detection area Arv, the operation invalid area Ariv may be used in a manner such that the controller 10 (the detector 10a) or the sensor data generator 22 processes an input operation from the operation invalid area Ariv to be invalid.

Alternatively, the touch sensor 21 may be configured in a manner such that no detection region R is present in the operation invalid area Ariv. Such a case is substantially equivalent to the example shown in FIG. 4.

When the driver is gripping the circular portion 200r during normal driving, the palm contact detection portions Tp are located relatively close to the thumb contact detection portions Tt and the index finger contact detection portions Ti. Thus, according to the present embodiment, the operation invalid area Ariv is provided so as to accurately distinguish a case where the driver is merely gripping the circular portion 200r from a case where the driver touches the touch sensor 21 intentionally to operate the operation target device.

When the driver intends to operate the operation target device, the driver touches the touch sensor 21 by intentionally stretching the thumb or the index finger to perform a particular input operation described below. When the particular input operation described below is performed in the operation detection area Arv, the controller 10 controls the operation target device according to the input operation.

In addition, incorrect operation performed on the operation target device should be prevented if the driver unintentionally touches the operation detection area Arv and the driver is not gripping the circular portion 200r for normal driving. Therefore, according to the present embodiment, the detector 10a determines that the driver is gripping the circular portion 200r when a predetermined area or greater of the palm contact detection portions Tp is detected in the grip detection area Arg.

The controller 10 is configured to control the operation target device when the driver is gripping the circular portion 200r and at the same time a particular operation is performed in the operation detection area Arv. The detected area of the palm contact detection portions Tp necessary to determine that the driver is gripping the circular portion 200r may be determined as appropriate based on statistical investigation of areas obtained in a manner such that several drivers grip the steering wheel 200 in a normal gripping manner.

The area of the palm contact detection portions Tp in the grip detection area Arg is merely an example of a condition for determining that the driver is gripping the circular portion 200r, and the condition for determination is not limited thereto.

Figure 10:
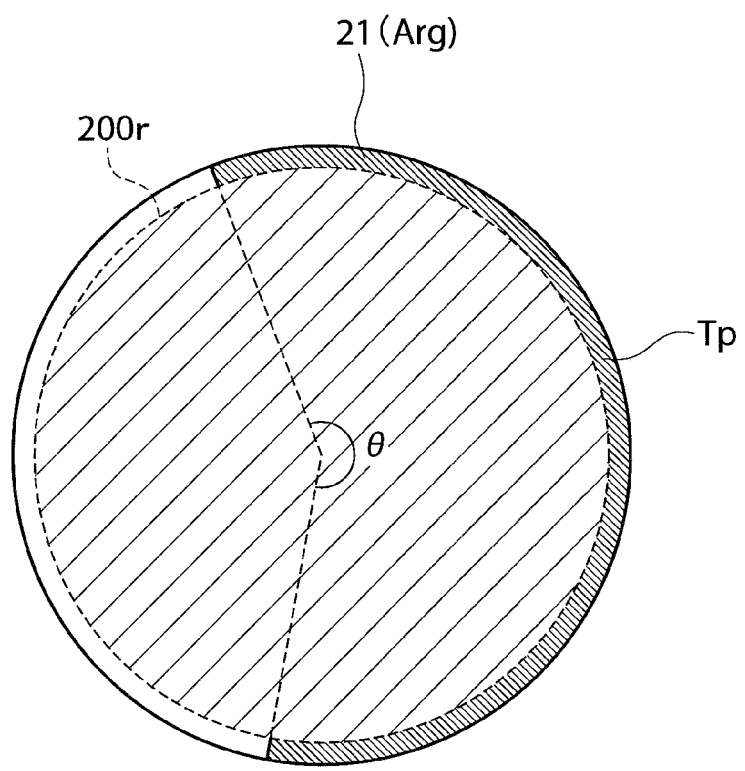
FIG. 10 is a view showing an example of a condition for determining that the touch sensor on the steering wheel is held.

FIG. 10 shows a cross section of the circular portion 200r cut in the grip detection area Arg of the touch sensor 21. The detector 10a may determine that the driver is gripping the circular portion 200r when the angle θ in the palm contact detection portions Tp in the circumferential direction in the cross section is a predetermined angle or greater. The predetermine angle is, for example, 180°.

As explained above, according to the present embodiment, since the controller 10 determines whether the driver is gripping the circular portion 200r (the touch sensor 21) and accepts the operation input to the touch sensor 21 only when the driver is gripping the circular portion 200r, incorrect operation in a case where the driver unintentionally touches the operation detection area Arv can be avoided.

As a preferred constitution of the present embodiment, the operation detection area Arv is located at a predetermined distance from the grip detection area Arg. Therefore, the particular input operation performed on the touch sensor 21 intentionally by the driver can be accurately detected. Accordingly, a possibility of occurrence of incorrect operation can greatly be decreased.

Further, according to the present embodiment, the area of the palm contact detection portions Tp and the angle θ in the circumferential direction of the palm contact detection portions Tp in the grip detection area Arg, are used as the conditions for accurately determining whether the driver is gripping the circular portion 200r. Accordingly, incorrect operation can be prevented even if the driver unintentionally touches the operation detection area Arv when the driver is not gripping the circular portion 200r.

The controller 10 turns on the display element 17 to inform the driver that the operation input is available in the operation detection area Arv when the detector 10a detects the driver gripping the circular portion 200r (the touch sensor 21) according to the sensor data based on the contact detection signal from the grip detection area Arg.

The driver can determine whether the operation target device can be operated by use of the touch sensor 21 according to the ON/OFF state of the display element 17. The display element 17 may be located adjacent to the steering wheel.

Here, when the touch sensor 21 is mounted on the entire circumference of the circular portion 200r as shown in FIG. 3A or when the touch sensor 21 is mounted on a relatively wide range as shown in FIG. 3E, a position on the touch sensor 21 that the driver holds is not particularly limited.

Therefore, the positions of the grip detection area Arg and the operation detection area Arv as described with reference to FIG. 8 and FIG. 9 and the operation invalid area Ariv provided as necessary, are required to be dynamically determined depending on the position on the touch sensor 21 that the driver holds.

Thus, the controller 10 determines a region including the palm contact detection portions Tp as the grip detection area Arg when the touch sensor 21 is gripped in a state where the grip detection area Arg and other areas have not been set. A predetermined range on the Y-coordinate including the palm contact detection portions Tp may be determined as the grip detection area Arg.

As described above, when the detector 10a detects a predetermined area or greater of the plural detection regions R in the touch sensor 21 being touched by the driver, the detected area is determined as the palm contact detection portions Tp since the palm contact detection portions Tp have a predetermined area or greater. Alternatively, as explained with reference to FIG. 10, when the detector 10a detects a predetermined angle range or greater in the touch sensor 21 in the circumferential direction in the cross section of the circular portion 200r being touched by the driver, the detected range is determined as the palm contact detection portions Tp.

After setting the grip detection area Arg, the controller 10 sets a predetermined range on the Y-coordinate located above the grip detection area Arg as the operation detection area Arv. In such a case, a predetermined range on the Y-coordinate adjacent to the grip detection area Arg is set as the operation invalid area Ariv as necessary so that the operation detection area Arv is located in a manner as to be separated from the grip detection area Arg.

Next, examples of the particular input operation performed on the touch sensor 21 by the driver with the thumb or the index finger will be explained with reference to FIG. 11A to FIG. 11E, FIG. 12A to FIG. 12D, and FIG. 13A to FIG. 13D.

FIG. 11A to FIG. 11E are schematic plan views each showing a half of the touch sensor 21 on either the front side facing the driver or the rear side. The operations shown in FIG. 11A to FIG. 11E are performed with the thumb on the front side and performed with the index finger on the rear side.

Figure 11A:
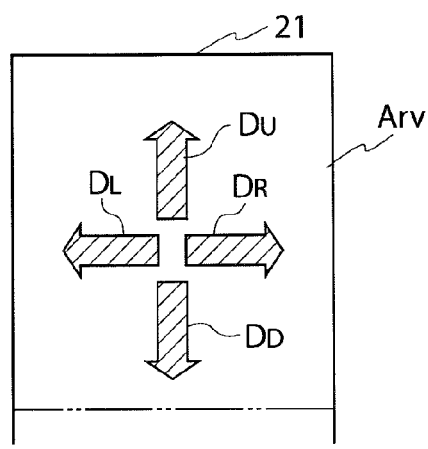
FIG. 11A to FIG. 11E are schematic views showing examples of a particular input operation performed on the touch sensor.

In FIG. 11A, $D_R$ represents right dragging to slide the thumb or the index finger in the right direction on the touch sensor 21 (on the operation detection area Arv), and $D_L$ represents left dragging to slide the thumb or the index finger in the left direction. $D_U$ represents upward dragging to slide the thumb or the index finger upward, and $D_D$ represents downward dragging to slide the thumb or the index finger downward.

In FIG. 11A, a flick to flick the touch sensor 21 in each direction with the thumb or the index finger may be performed in place of the right dragging $D_R$, the left dragging $D_L$, the upper dragging $D_U$ and the lower dragging $D_D$.

Figure 11B:
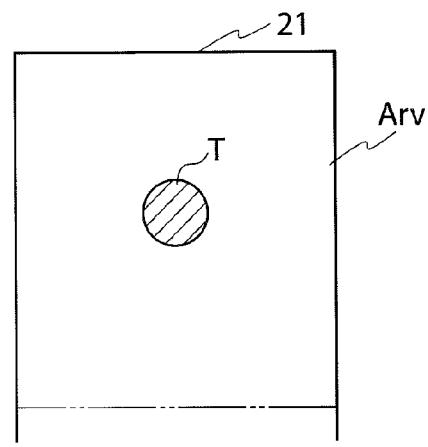
Figure 11C:
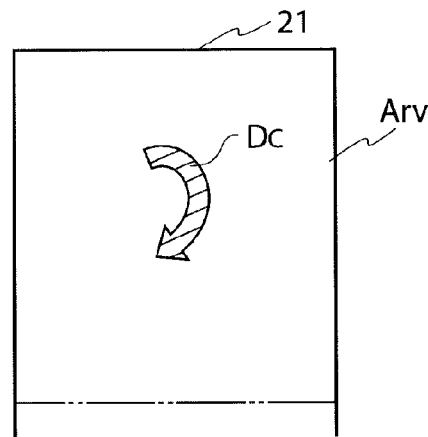

FIG. 11B shows tapping T to tap the touch sensor 21 with the thumb or the index finger. FIG. 11C shows arc dragging $D_C$ to draw an arc on the touch sensor 21 with the thumb or the index finger.

Figure 11D:
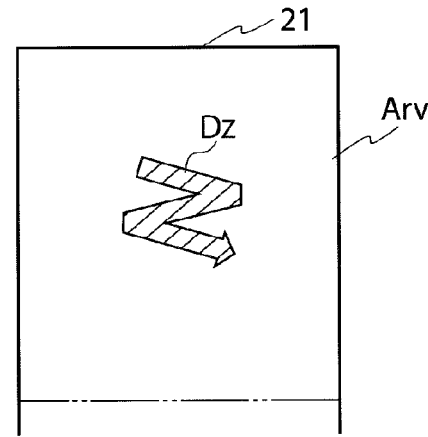
Figure 11E:
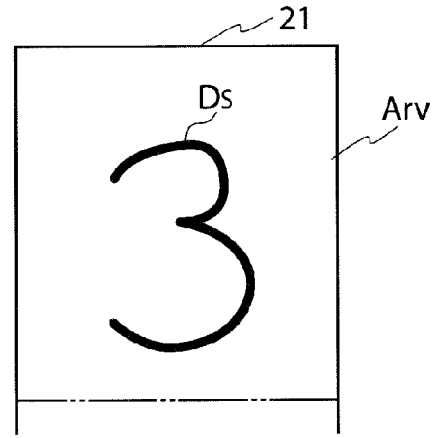

FIG. 11D shows zigzag dragging $D_Z$ to drag on the touch sensor 21 in a zigzag manner with the thumb or the index finger. FIG. 11E shows symbol input dragging $D_S$ to draw a symbol with the thumb or the index finger. FIG. 11E shows a state where the number "3" is drawn as a symbol. As for symbols, the numbers or alphabets that are relatively easily recognized are preferably used.

FIG. 12A to FIG. 12D are schematic plan views each showing a front part 21*f* which is a half of the touch sensor 21 on the front side and a rear part 21*r* which is a half of the touch sensor 21 on the rear side when the touch sensor is developed. The front part 21*f* corresponds to the area from 1 to 11 on the X-coordinate and the rear part 21*r* corresponds to the area from 12 to 22 on the X-coordinate shown in FIG. 8 and FIG. 9.

FIG. 12A to FIG. 12D each show the front part 21*f* and the rear part 21*r* in a manner as to have the same area, although the front part 21*f* and the rear part 21*r* do not actually have the same area shown in the examples of FIG. 8 and FIG. 9. For reasons of convenience, FIG. 12A to FIG. 12D each show the rear part 21*r* not as viewed from the rear side of the circular portion 200*r* but as viewed from the front side through the front part 21*f*.

As shown in FIG. 12A to FIG. 12D, each combination pattern of the input operation performed on the front part 21*f* with the thumb and the input operation performed on the rear part 21*r* with the index finger may be used as the particular input operation performed on the touch sensor 21.

Figure 12A:
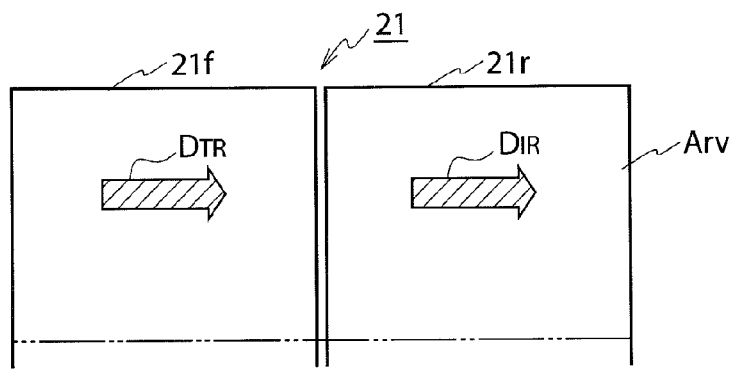
FIG. 12A to FIG. 12D are schematic views showing other examples of the particular input operation performed on the touch sensor.

FIG. 12A is an example of performing right dragging $D_{TR}$ to slide the thumb in the right direction on the front part 21*f* and right dragging $D_{IR}$ to slide the index finger in the right direction on the rear part 21*r*. The dragging of FIG. 12A is performed with both the thumb and the index finger from the inner circumferential side to the outer circumferential side of the circular portion 200*r*. The dragging with both the thumb and the index finger in the opposite direction of FIG. 12A is also applicable.

Figure 12B:
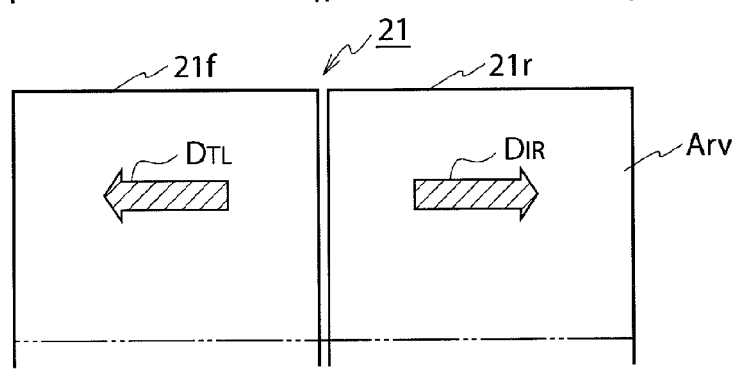

FIG. 12B is an example of performing left dragging $D_{TL}$ to slide the thumb in the left direction on the front part 21*f* and right dragging $D_{IR}$ to slide the index finger in the right direction on the rear part 21*r*. The dragging of FIG. 12B is performed with the thumb from the outer circumferential side to the inner circumferential side of the circular portion 200*r* and with the index finger from the inner circumferential side to the outer circumferential side of the circular portion 200*r*.

Figure 12C:
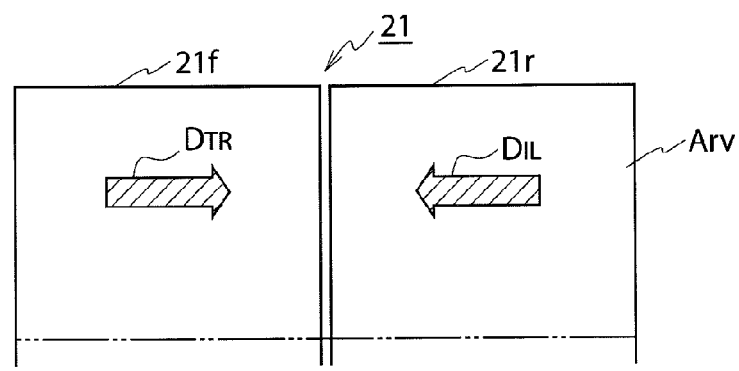

FIG. 12C is an example of performing right dragging $D_{TR}$ to slide the thumb in the right direction on the front part 21*f* and left dragging $D_{IL}$ to slide the index finger in the left direction on the rear part 21*r*. The dragging of FIG. 12C is performed with the thumb from the inner circumferential side to the outer circumferential side of the circular portion 200*r* and with the index finger from the outer circumferential side to the inner circumferential side of the circular portion 200*r*.

Figure 12D:
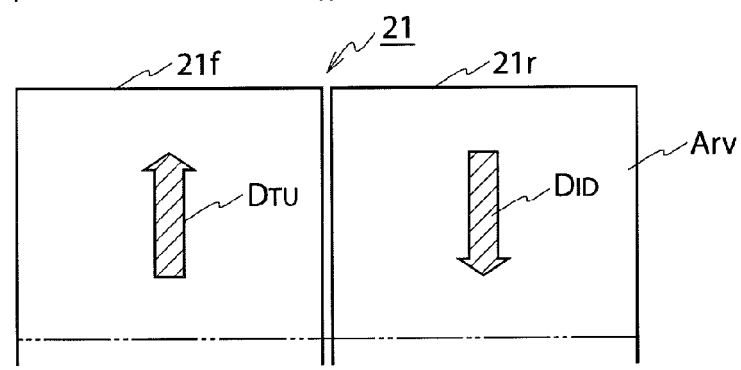

FIG. 12D is an example of performing upward dragging $D_{TU}$ to slide the thumb in the upward direction on the front part 21*f* and downward dragging $D_{ID}$ to slide the index finger in the downward direction on the rear part 21*r*. A pattern of the dragging with the thumb in the downward direction and with the index finger in the upward direction, or a pattern of the dragging with both the thumb and the index finger in the upward direction or in the downward direction, is also applicable.

Although the present embodiment exemplified the several combination patterns of the input operation on the front portion 21*f* with the thumb and the input operation on the rear part 21*r* with the index finger, the present embodiment is not limited thereto, and the input operation pattern may be selected as appropriate in consideration of ease of the input operation.

The possibility of occurrence of incorrect operation can be further decreased in a manner such that each combination pattern of the input operation with the thumb and the input operation with the index finger as shown in FIG. 12A to FIG. 12D is used as the particular input operation for controlling the operation target device.

Further, as shown in FIG. 3A, FIG. 3B, FIG. 3D, FIG. 3E, FIG. 4 and FIG. 5, in the case where the touch sensors 21 (21*a*, 21*b*) can be operated with both right and left hands, each combination pattern of the operations with the right and left hands may also be used as the particular input operation for controlling the operation target device.

FIG. 13A to FIG. 13D are examples showing several combination patterns of the input operations with the right and left hands in a case where the left touch sensor 21 in FIG. 3B is defined as a left touch sensor 21L and the right touch sensor 21 in FIG. 3B is defined as a right touch sensor 21R. These figures are schematic plan views each corresponding to the front part 21*f* of FIG. 12A to FIG. 12D operated with the thumb.

Figure 13A:
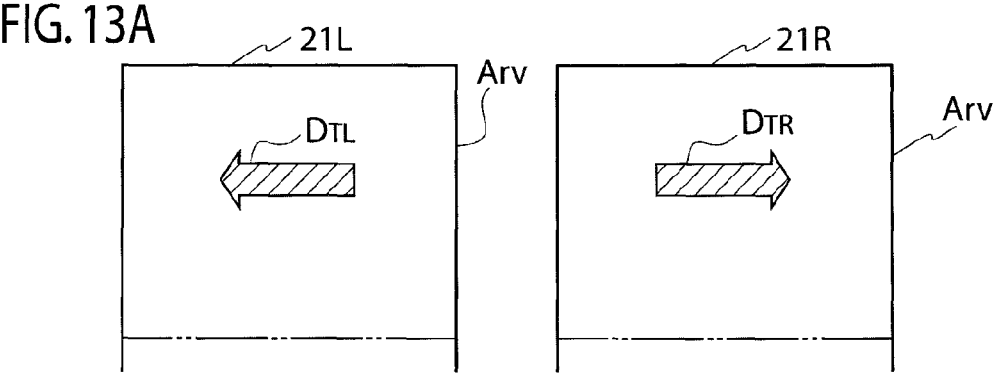
FIG. 13A to FIG. 13D are schematic views showing still other examples of the particular input operation performed on the touch sensor.

FIG. 13A is a combination pattern of left dragging $D_{TL}$ to slide the thumb in the left direction on the left touch sensor 21L and right dragging $D_{TR}$ to slide the thumb in the right direction on the right touch sensor 21R.

Figure 13B:
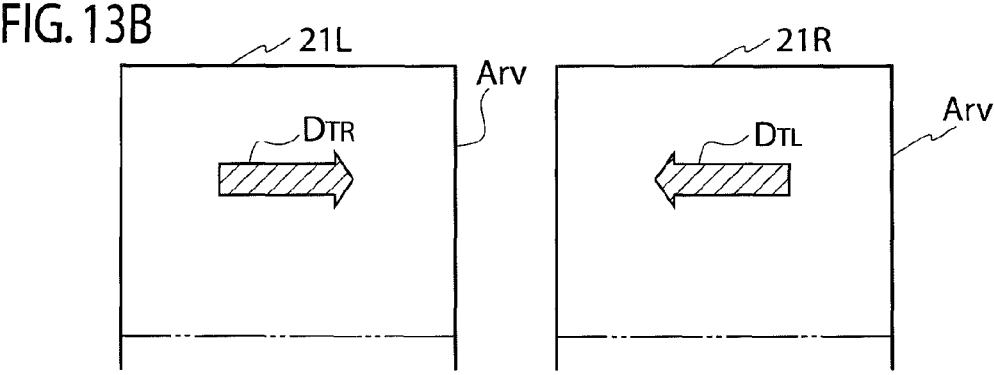

FIG. 13B is a combination pattern of right dragging $D_{TR}$ to slide the thumb in the right direction on the left touch sensor 21L and left dragging $D_{TL}$ to slide the thumb in the left direction on the right touch sensor 21R.

Figure 13C:
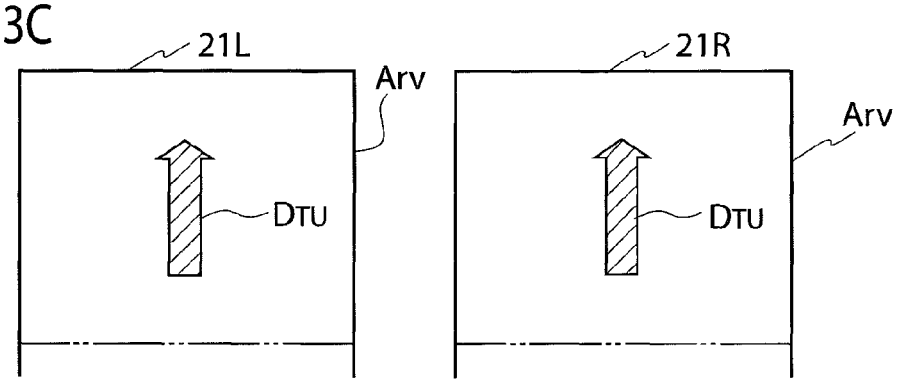

FIG. 13C is a pattern of upward dragging $D_{TU}$ to slide the thumbs in the upward direction on both the left touch sensor 21L and the right touch sensor 21R.

Figure 13D:
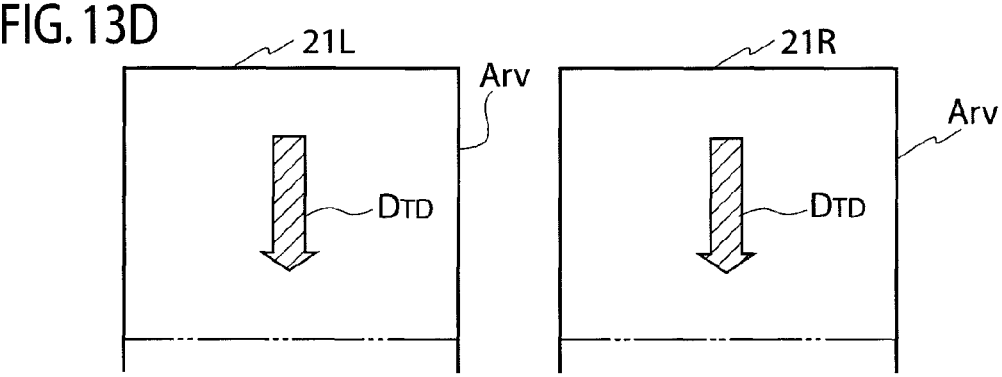

FIG. 13D is a pattern of downward dragging $D_{TD}$ to slide the thumbs in the downward direction on both the left touch sensor 21L and the right touch sensor 21R.

The use of each combination pattern of the input operations with both right and left hands as the particular input operation for controlling the operation target device, can contribute to safety driving since the driver grips the circular portion 200*r* with both hands. Particularly, the example of FIG. 3B can contribute to safety driving since the touch sensors 21 are mounted on the most preferable gripped positions for both hands in the circular portion 200*r*.

The input operation may be accepted when the right and left touch sensors 21 are held with both hands. The input operation may not be accepted when one hand is removed from the touch sensor 21. Alternatively, the touch sensor 21 may be on standby for acceptance of the input operation when one hand is removed from the touch sensor 21.

The particular input operation performed only with one hand also contributes to safety driving as long as the input operation is accepted when the right and left touch sensors 21 are held with both hands.

When the driver has no intention of operating the operation target device while gripping the circular portion 200*r* during normal driving, there is a relatively low possibility of unexpected occurrence of the specific combination pattern of the input operation with the thumb and the input operation with the index finger or the specific combination pattern of the input operations with the right and left hands.

Thus, if using only the specific combination pattern of the input operation with the thumb and the input operation with the index finger or the specific combination pattern of the input operations with the right and left hands, part of or all of the measures to prevent incorrect operation described above may be omitted.

Even if, of course, using only the specific combination pattern of the input operations with the right and left hands, the measures to prevent incorrect operation may also be used.

The storage unit 18 stores a table relating the particular input operation or each combination pattern of the particular input operations described above to a type of control performed on the operation target device.

The controller 10 controls the operation target device according to the table stored in the storage unit 18 depending on the operation input to the touch sensor 21. The storage unit 18 may be located in the controller 10.

Figure 14:
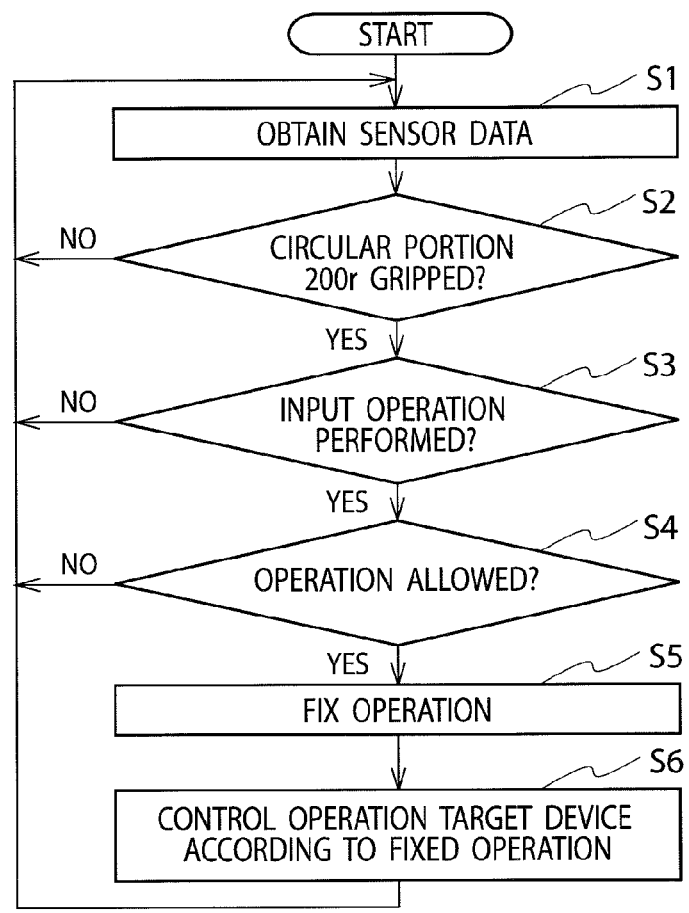
FIG. 14 is a flowchart for explaining the operation in each embodiment.

With reference to the flowchart shown in FIG. 14, processing executed by the controller 10 in the present embodiment is explained in more detail below. In FIG. 14, the controller 10 obtains the sensor data output from the sensor data generator 22 in step S1. The controller 10 determines whether the circular portion 200r is gripped based on the detection output from the detector 10a in step S2.

When the controller determines that the circular portion 200r is gripped (YES), the controller 10 proceeds to step S3. When the controller determines that the circular portion 200r is not gripped (NO), the controller 10 returns to step S1.

The controller 10 determines whether the input operation is performed based on the detection output from the detector 10a in step S3. When the controller 10 determines that the input operation is performed (YES), the controller 10 proceeds to step S4. When the controller 10 determines that the input operation is not performed (NO), the controller 10 returns to step S1.

The controller 10 determines whether to allow the operation performed on the operation target device according to the input operation in step S4. When the controller 10 determines to allow the operation (YES), the controller 10 proceeds to step S5. When the operation is not allowable (NO), the controller 10 returns to step S1.

As explained above, the controller 10 allows the operation performed on the operation target device when the particular input operation is performed in the operation detection area Arv, and does not allow the operation performed on the operation target device when the particular input operation is performed in the operation invalid area Ariv.

Even when the input operation is performed in the operation detection area Arv, the controller 10 does not allow the operation performed on the operation target device if the performed input operation is not the particular input operation. The controller 10 allows the operation performed on the operation target device only when the particular input operation is performed.

The controller 10 fixes the operation based on the input operation in step S5, controls the operation target device according to the fixed operation in step S6, and returns to step S1.

The operations according to the present embodiment are summarized as follows.

The detector 10a (first detector) detects a state where a first area is touched in the touch sensor 21 mounted on the grip portion (the circular portion 200r or the straight portion 201s) gripped by the driver on the steering wheel 200 or 201. An example of the first area is the grip detection area Arg. The detector 10a (second detector) detects a state where the particular input operation is performed in a second area located on the upper side of the first area in the touch sensor 21 while the first area is touched. An example of the second area is the operation detection area Arv.

Since the thumb or the index finger is located above the palm during driving, the area located on the upper side of the first area may be defined as the second area. When the particular input operation is performed while the first area is touched, the operation target device to be operated with the touch sensor 21 is controlled according to the particular input operation.

The area located on the upper side is an area above the first area defined in a state where the driver is gripping the grip portion and the steering wheel 200 is not turned. It is preferable to determine that the first area is touched when a predetermined area or greater of the first area is touched.

Another aspect is as follows.

The detector 10a (first detector) detects a state where a predetermined angle range or greater in the circumferential direction in the cross section of the grip portion when the steering wheel 200 or 201 is cut in the radial direction, is touched in the first area on the touch sensor 21 mounted to cover a predetermined area of the grip portion (the circular portion 200r or the straight portion 201s) gripped by the driver on the steering wheel 200 or 201.

The detector 10a (second detector) detects the particular input operation being performed in the second area separate from the first area in the touch sensor 21 while a predetermine angle range or greater of the first area is touched. When a predetermined angle range or greater of the first area is touched and the particular input operation is performed, the operation target device to be operated with the touch sensor 21 is controlled according to the particular input operation.

The second area is preferably an area located on the upper side of the first area. The area located on the upper side is an area above the first area defined in a state where the driver is gripping the grip portion and the steering wheel 200 is not turned.

Figure 15:
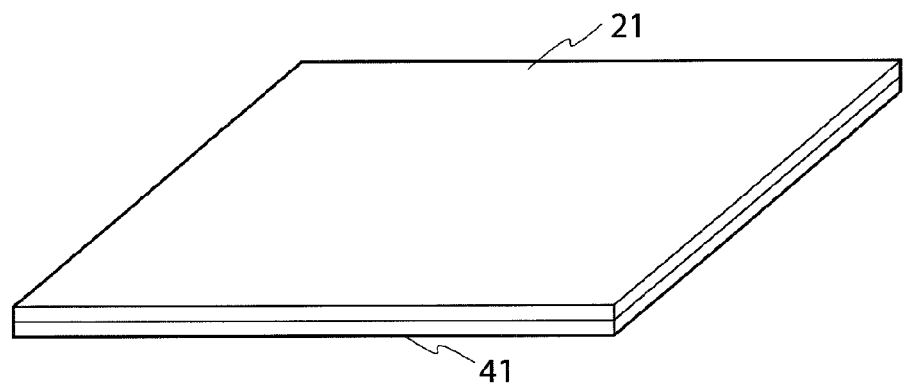
FIG. 15 is a schematic perspective view showing a constitution example for changing color when the touch sensor is operated.
Figure 16:
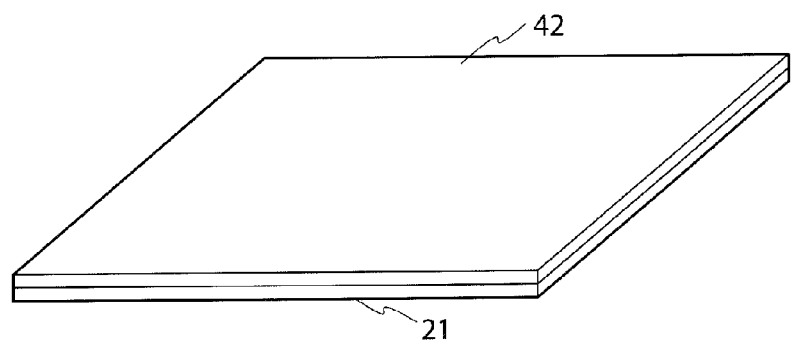
FIG. 16 is a schematic perspective view showing a constitution example for changing a texture when the touch sensor is operated.

FIG. 15 and FIG. 16 are constitution examples for effectively informing the driver that the touch sensor 21 has been operated. FIG. 15 and FIG. 16 are schematic views in which the touch sensor 21 is developed and converted into a rectangular shape, as in the case of FIG. 9.

FIG. 15 is an example in which a color change sheet 41 containing a coloring substance is placed on the lower surface of the touch sensor 21. When a transparent conductive film is used in the touch sensor 21, the driver can recognize, though the touch sensor 21, the color of the color change sheet 41 placed on the lower surface of the touch sensor 21.

The controller 10 changes the color of part of the color change sheet 41 corresponding to the part where the touch sensor 21 is touched so that the driver can confirm the operation performed on the touch sensor 21.

FIG. 16 is an example in which a tactile feedback sheet 42 to change a sense of touch (a texture) is placed on the upper surface of the touch sensor 21. An example of the tactile feedback sheet 42 may be a sheet called "E-sheet" developed by Senseg in Finland.

This sheet is used to obtain feedback of a sense of touch by electrifying a film. Even if the tactile feedback sheet 42 is placed on the upper surface of the touch sensor 21, the touch sensor 21 can detect the contact of the fingers.

When the driver operates the touch sensor 21 via the tactile feedback sheet 42, the controller 10 changes a sense of touch of the tactile feedback sheet 42 so that the driver can confirm the operation performed on the touch sensor 21.

Next, a steering wheel according to at least one embodiment is explained with reference to FIG. 17. A steering wheel 210 according to at least one embodiment shown in FIG. 17 is configured to output a control signal to the operation target device.

Figure 17:
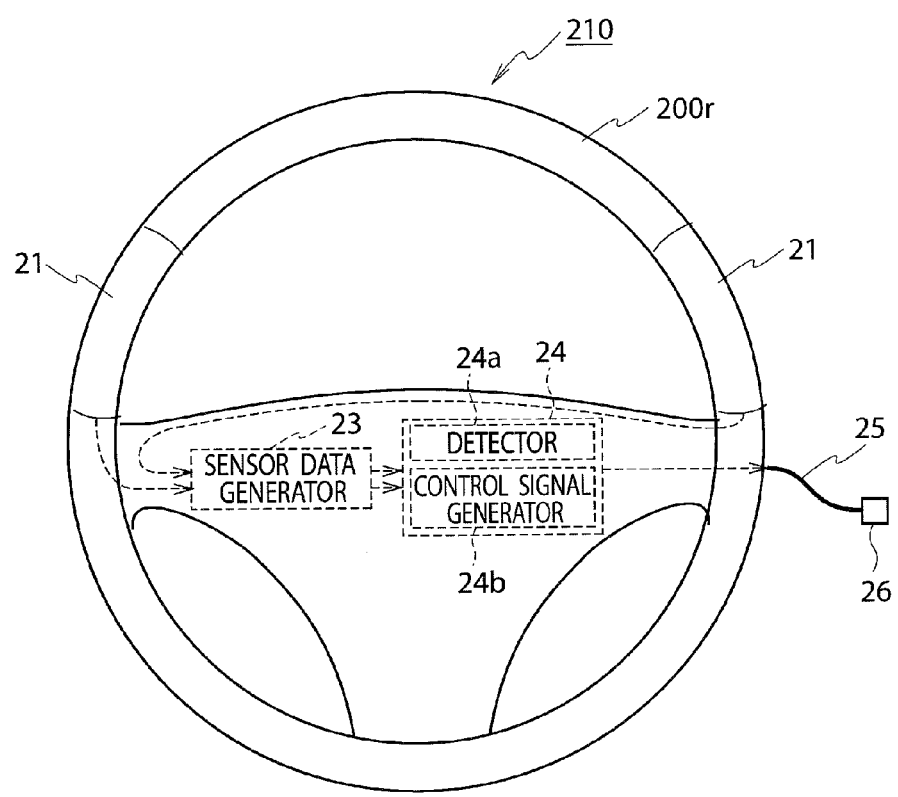
FIG. 17 is a plan view showing an embodiment of a steering wheel.

The elements in FIG. 17 which are the same as those in FIG. 1 and FIG. 2 are indicated by the same reference numerals, and overlapping explanations thereof are not repeated. As shown in FIG. 17, the steering wheel 210 includes a sensor data generator 23 identical to the sensor data generator 22 of FIG. 1 and a controller 24 identical to the controller 10 located, for example, in an area other than the circular portion 200r. The controller 24 includes a detector 24a identical to the detector 10a and a control signal production unit 24b.

In a state where the steering wheel 210 is installed in the vehicle, the control signal production unit 24b produces a control signal for controlling the operation target device according to the particular input operation performed on the touch sensor 21.

The control signal output from the control signal production unit 24b is further output to an output terminal 26 via a cable 25. The operation target device to which the output terminal is connected can be controlled by use of the control signal. Examples of the particular input operation are the same as those shown in FIG. 11A to FIG. 11E, FIG. 12A to FIG. 12D and FIG. 13A to FIG. 13D. Conditions for producing the control signal by the control signal production unit 24b are also the same as those described above.

The touch sensor 21 may be detachably mounted on the circular portion 200r by use of a hook-and-loop fastener. Although the circular portion 200r serves as the grip portion, the grip portion is not necessarily formed into a circular shape.

The touch sensor 21 is not required to be composed of a single sheet and may be composed of plural touch sensor pieces. The touch sensor 21 composed of the plural touch sensor pieces has the advantage of the manufacture process since each piece can be formed into a simple shape.

When the touch sensor 21 is composed of the plural touch sensor pieces, the touch sensor pieces are not required to exclude the presence of gaps therebetween when arranged.

The touch sensor 21 according to the present embodiment is mounted to cover the grip portion. It should be noted that the state of being mounted to cover the grip portion in the present embodiment includes a case where the touch sensor 21 composed of the plural touch sensor pieces is mounted to cover the grip portion while gaps are present between the touch sensor pieces.

In addition, the covering range of the touch panel 21 is not limited to the grip portion (the circular portion 200r or the straight portion 201s) gripped by the driver during driving and may be extended to the surface of the connecting portion between the circular portion 200r and the center portion in which an air bag or the like is housed.

The connecting portion is a portion located between the right and left hands in FIG. 2, and a portion where the sensor data generator 23 and the controller 24 are located in FIG. 17.

As described above, the touch sensor 21 may be extended to the surface of the connecting portion so as to arrange the operation detection area Arvin the connecting portion closer to the grip portion. The touch sensor 21 located in the region closer to the grip portion allows the driver to operate the operation target device without removing or widely sliding the hands from the grip portion during driving.

Accordingly, there is almost no possibility that the touch sensor 21 is an obstacle to operation of the steering wheel 200, 201 or 210 by the driver even if the touch sensor 21 is extended to the surface of the connecting portion.

Second Embodiment

A control apparatus and method for controlling an operation target device in a vehicle according to a second embodiment will be explained below. Fundamental constitutions and operations in the second embodiment are the same as those in the first embodiment, and only different elements will be explained below.

In step S4 described above, it is preferable not to allow the operation for controlling the operation target device (namely, to disable the operation) when the vehicle is in a particular condition. A turning angle of the steering wheel 200 is set in the controller 10 to determine whether to allow the operation for controlling the operation target device.

Figure 18:
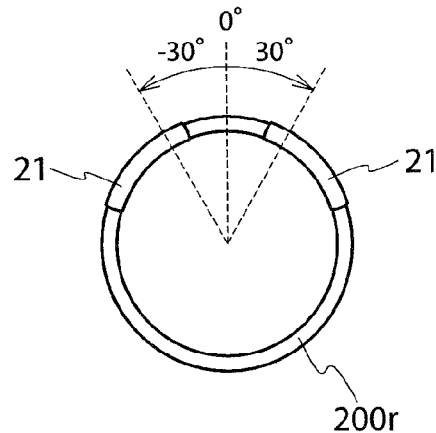
FIG. 18 is a view for explaining a turning angle of the steering wheel.

As shown in FIG. 18, when the steering wheel 200 is not turned, the turning angle is 0°. For example, the turning angle is conceived to be in a plus range when turned in a right direction, and the turning angle is conceived to be in a minus range when turned in a left direction. The input operation performed on the touch sensor 21 is valid and allowed when the turning angle is within a range of, for example, plus or minus 30°, and the input operation performed on the touch sensor 21 is invalid and not allowed when the turning angle exceeds the range of plus or minus 30°.

When the turning angle exceeds the range of plus or minus 30°, the vehicle is turning right or left or turning at a corner. If the operation target device is controlled in such a particular condition, a possibility of occurrence of incorrect operation greatly increases. In other words, the operation input performed in such a particular condition is more likely to be an input unintentionally made by the user, which is not preferable in view of a safety aspect.

According to the present embodiment, the particular condition of the vehicle disables the operation for controlling the operation target device.

As described above, the turning angle of the steering wheel 200 detected by the steering angle sensor 31 is input into the controller 10. The controller 10 switches the input operation performed on the touch sensor 21 between a valid state and an invalid state according to the turning angle of the steering wheel 200 detected by the steering angle sensor 31.

A detection signal from the direction indicator sensor 32 is also input into the controller 10. Therefore, the controller 10 may disable the input operation performed on the touch sensor 21 when the direction indicator 320 is operated according to the detection signal from the direction indicator sensor 32.

When the direction indicator 320 is operated, the steering wheel 200 can be conceived to be in the particular condition where the steering wheel 200 is being turned and the turning angle thereof is exceeding a predetermined range. Note that, although the direction indicator 320 may perform other operations in addition to the indication of a right/left turn, the operation of the direction indicator 320 in the present embodiment is to indicate the right/left turn.

It is not preferred to control the operation target device by performing the particular input operation on the touch sensor 21 during reversing the vehicle. This is because a possibility of occurrence of incorrect operation greatly increases, which is not preferable in view of a safety aspect.

Therefore, the controller 10 may also disable the input operation performed on the touch sensor 21 according to a detection signal from the shift lever sensor 33 when the shift lever 330 is located in a reversing position.

When the turning angle of the steering wheel 200 exceeds a predetermined range, for example, the range of plus or minus 30° or when the direction indicator 320 is operated, or when the shift lever 330 is located in the reversing position, the operation for controlling the operation target device may be invalid.

Here, disabling the operation for controlling the operation target device may include a state where the operation for controlling the operation target device is invalid even if the particular input operation is performed, or a state where the controller 10 disables input from the sensor data generator 22 even if some sensor data is input into the controller 10. It is only required to disable the operation for controlling the operation target device consequently.

Figure 19:
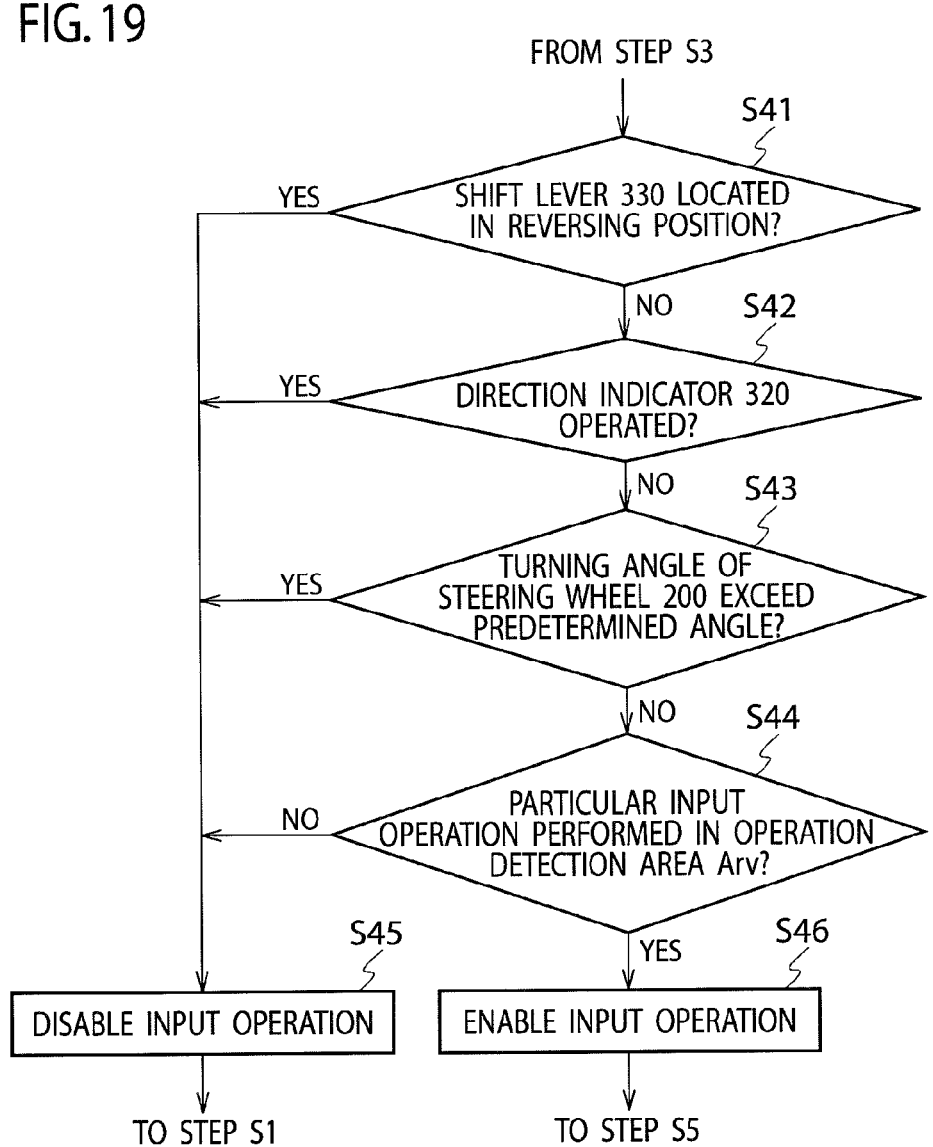
FIG. 19 is a flowchart showing specific processing in Step S4 in FIG. 14.

A specific processing example of step S4 shown in FIG. 14 is explained below with reference to the flowchart shown in FIG. 19. As shown in FIG. 19, the controller 10 determines whether the shift lever 330 is located in the reversing position in step S41.

When the shift lever 330 is located in the reversing position (YES), the controller 10 does not allow the input operation of step S3 in step S45 and moves to step S1 in FIG. 14. When the shift lever 330 is not located in the reversing position (NO), the controller 10 determines whether the direction indicator 320 is operated in step S42.

When the direction indicator 320 is operated (YES), the controller 10 does not allow the input operation of step S3 in step S45 and moves to step S1 in FIG. 14.

When the direction indicator 320 is not operated (NO), the controller 10 determines whether the turning angle of the steering wheel 200 exceeds a predetermined range in step S43.

When the turning angle of the steering wheel 200 exceeds a predetermined range (YES), the controller 10 does not allow the input operation of step S3 in step S45 and moves to step S1 in FIG. 14.

When the turning angle of the steering wheel 200 does not exceed a predetermined range (NO), the controller 10 determines whether the particular input operation is performed in the operation detection area Arv in step S44.

When no particular input operation is performed (NO), the controller 10 does not allow the input operation of step S3 in step S45 and moves to step S1 in FIG. 14. When the controller 10 does not allow the input operation in step S45, the operation for controlling the operation target device is invalid.

When the particular input operation is performed (YES), the controller 10 allows the input operation of step S3 in step S46 and moves to step S5 in FIG. 14.

Although the three steps of step S41, step S42 and step S43 are carried out in the example shown in FIG. 19, only one or two steps may be carried out. Note that, when the two of or all of step S41, step S42 and step S43 are carried out, the order of the steps is not particularly limited.

Although the present embodiment employs the shift lever 330, the configuration of the operation unit to switch the vehicle between going forward and going backward and to change gear ratios of the transmission, is not particularly limited and may be any of a floor shift, a steering column and a paddle shift. All of them are included in the shift lever.

As explained above, the operation for controlling the operation target device is invalid when the vehicle is in the particular state such as a right turn, a left turn, a turn at a corner and a reverse movement, so that the input operation is not performed on the touch sensor 21 during the particular state, which contributes to an increase in safety.

Third Embodiment

A control apparatus and method for controlling an operation target device in a vehicle according to a third embodiment will be explained below. Fundamental constitutions and operations in the third embodiment are the same as those in the first embodiment, and only different elements will be explained below.

In the third embodiment, the input operation performed on the touch sensor 21 with a finger is not accepted when the driver has no intention of operating the operation target device such as during normal driving with the circular portion 200r gripped with the hands, but the input operation performed on the touch sensor 21 with a finger is accepted only when the driver intends to operate the operation target device.

When the driver intends to operate the particular input operation on the touch sensor 21 with the thumb or the index finger, the driver may intentionally or unconsciously change the manner of gripping the circular portion 200r (the touch sensor 21) so as to easily move the thumb or the index finger.

Figure 20:
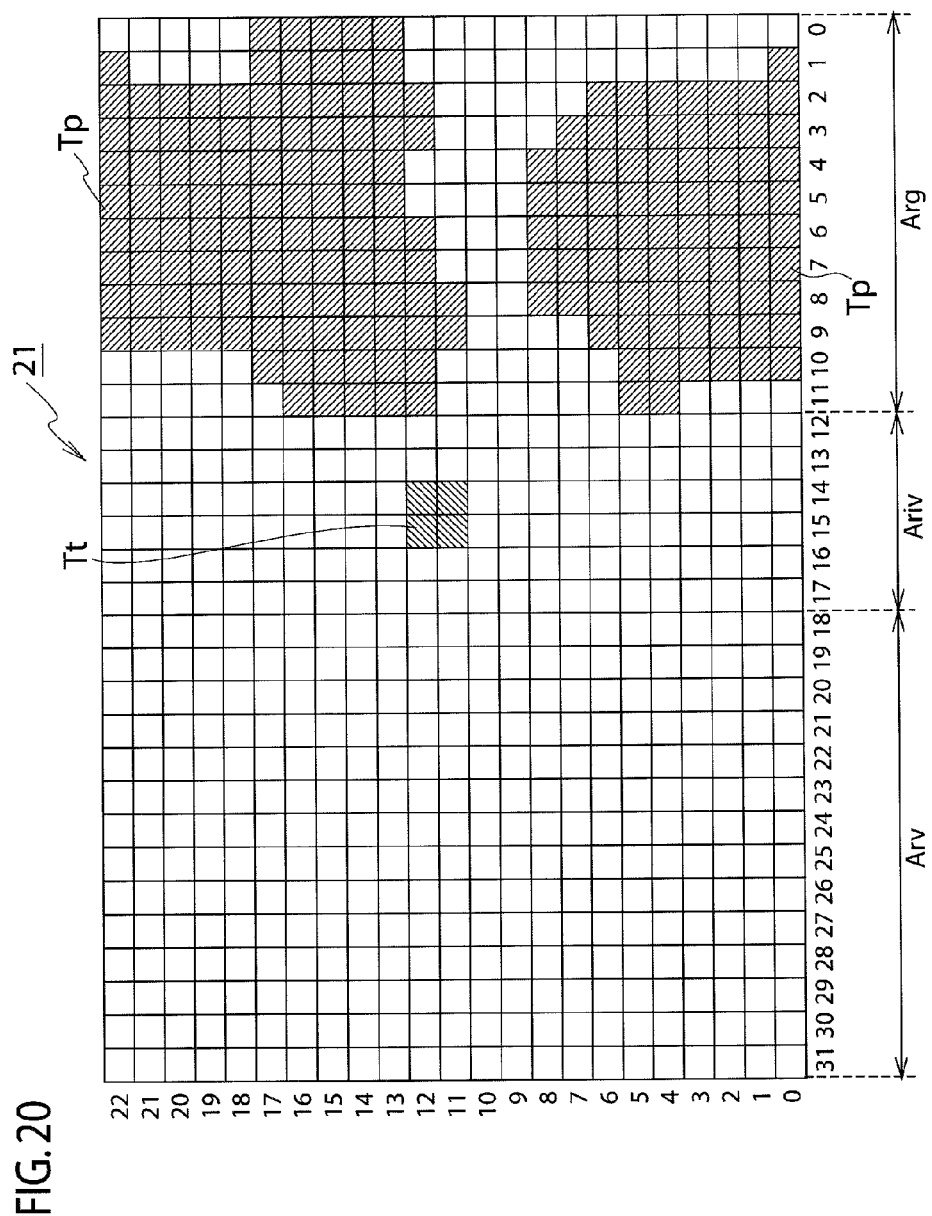
FIG. 20 is a schematic view showing an example in which a driver holds the touch sensor during normal driving.

FIG. 20 shows an example of a contact state in the palm contact detection portions Tp and the thumb contact detection portions Tt when the driver grips the circular portion 200r during normal driving. FIG. 20 is a schematic view in which each region in the touch sensor 21 is converted into a uniform size, as in the case of FIG. 9.

As shown in FIG. 20, the palm contact detection portions Tp have a relatively wide area, and the thumb contact detection portions Tt are located adjacent to the palm contact detection portions Tp. The index finger contact portions Ti are also located adjacent to the palm contact detection portions Tp although not shown in FIG. 20.

Figure 21:
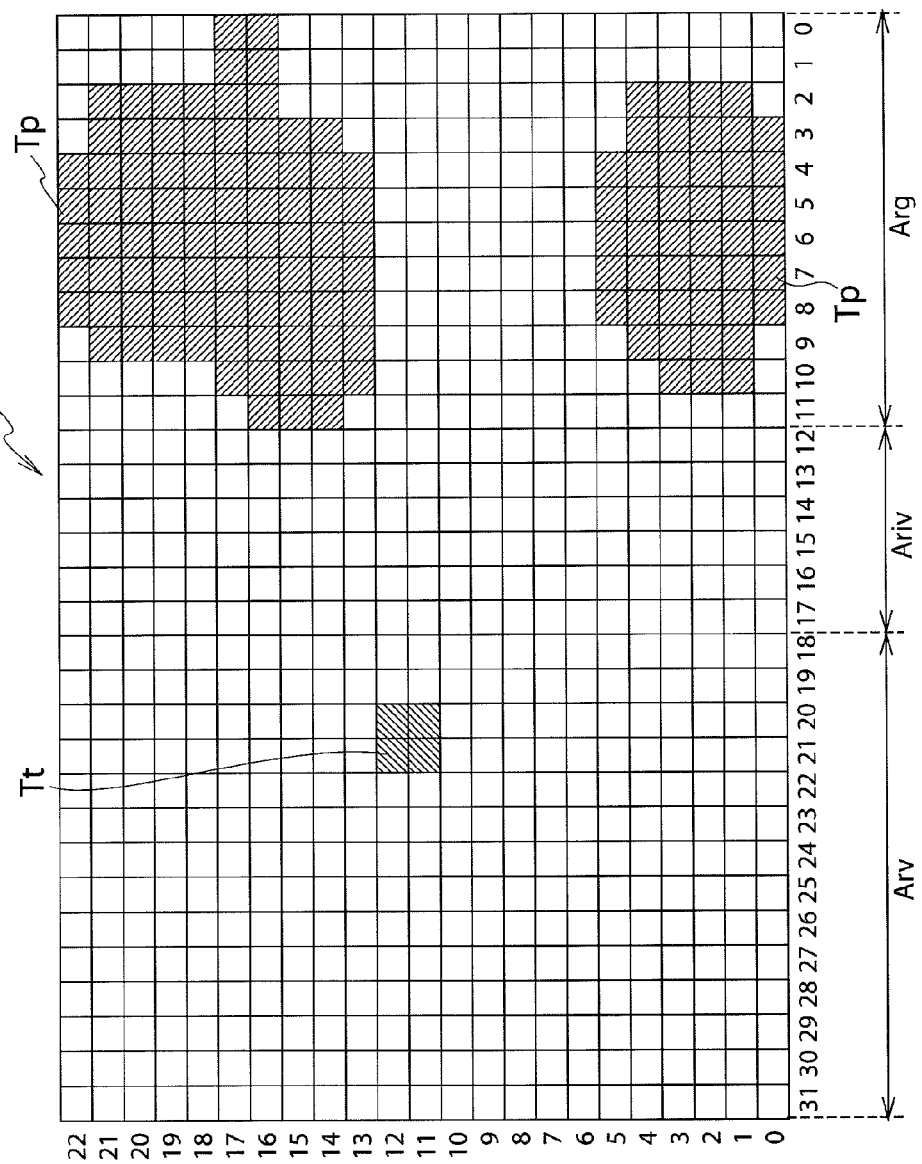
FIG. 21 is a schematic view showing an example in which a driver intends to operate an operation target device while holding the touch sensor.

FIG. 21 shows an example of a contact state in the palm contact detection portions Tp and the thumb contact detection portions Tt when the driver intends to operate the operation target device.

As shown in FIG. 21, the area of the palm contact detection portions Tp decreases compared with that in FIG. 20, and the thumb contact detection portions Tt are located away from the palm contact detection portions Tp. The index finger contact portions Ti are also located away from the palm contact detection portions Tp although not shown in FIG. 21.

As is apparent from the comparison of FIG. 20 with FIG. 21, the area of the palm contact detection portions Tp greatly changes between the case where the driver is merely gripping the circular portion 200r during normal driving and the case where the driver intends to operate the operation target device by performing the particular input operation on the touch sensor 21 with the thumb or the index finger.

Note that the palm contact detection portions Tp may include portions with which the second finger, the third finger and the fourth finger (and also the index finger according to circumstances) come into contact.

The number 8 on the X-coordinate and the numbers 4 to 8 on the Y-coordinate in the palm contact detection portions Tp in FIG. 20 are portions with which tips of the second finger, the third finger and the fourth finger are in contact. In FIG. 21, however, the portions with which the tips of the second finger, the third finger and the fourth finger are in contact move to the number 5 on the X-coordinate and the numbers 4 to 8 on the Y-coordinate. This represents that the positions of the tips of the second finger, the third finger and the fourth finger shift to the rear side of the circular portion 200r.

The intention of operating the operation target device may be determined based on a positional change of end portions of the palm contact detection portions Tp in the circumferential direction in the cross section of the circular portion 200r.

Further, the intention of operating the operation target device may be determined based on a positional change of end portions of the palm contact detection portions Tp in the circumferential direction in the cross section of the circular portion 200r, in addition to the area change of the palm contact detection portions Tp.

The controller 10 determines that the driver is gripping the circular portion 200r for normal driving when the palm contact detection portions Tp have a first area that is a predetermined area or greater as shown in FIG. 20, so as not to accept the input operation performed on the touch sensor 21 with the finger.

The controller 10 determines that the driver intends to operate the operation target device when the palm contact detection portions Tp have a second area, as shown in FIG. 21, which is decreased by a predetermined ratio or greater compared with the area in FIG. 20, so as to accept the input operation performed on the touch sensor 21 with the finger.

In the constitution example of discriminating between the state of normal driving and the state of intending to operate the operation target device according to the area change of the palm contact detection portions Tp, the operation invalid area Ariv is not necessarily provided.

Figure 22:
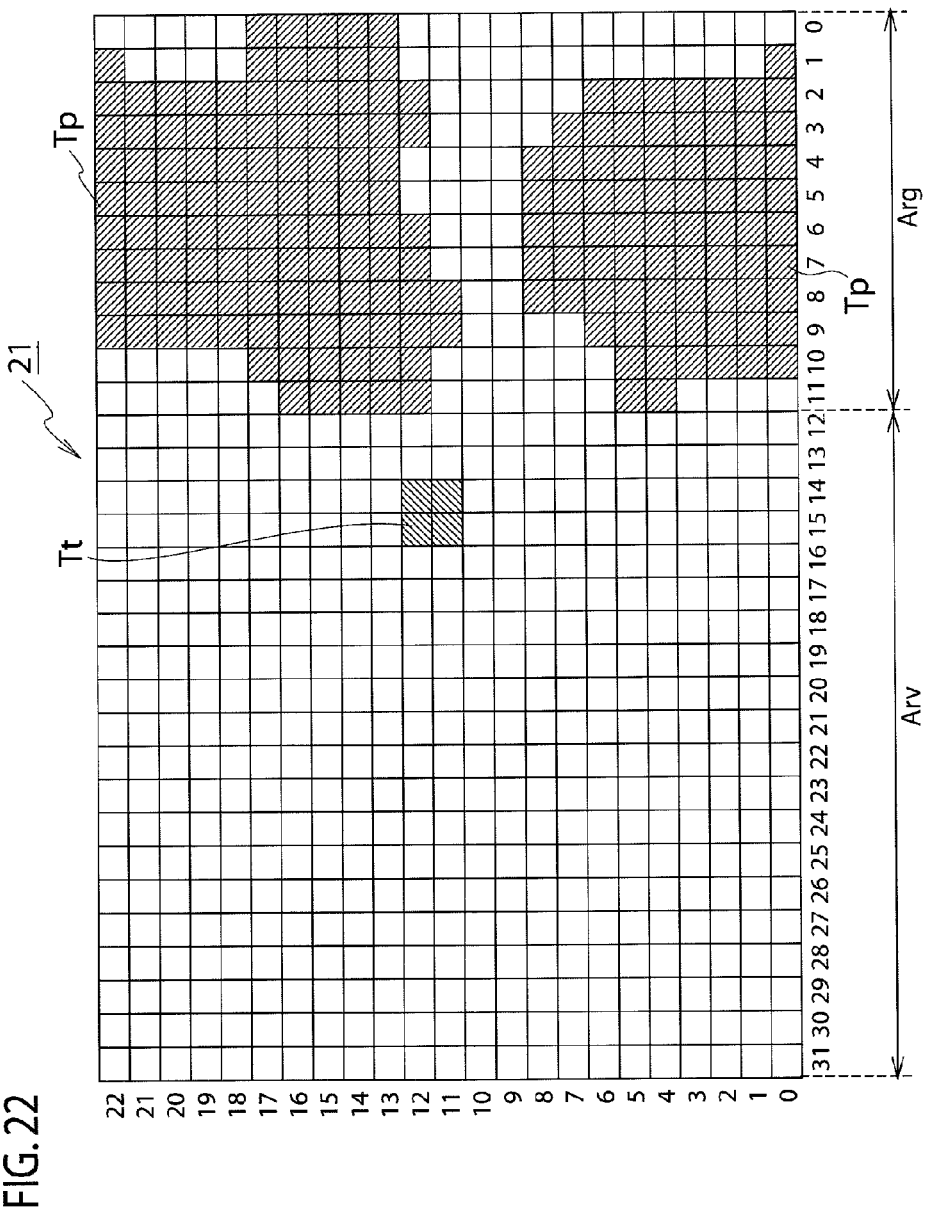
FIG. 22 is a schematic view showing a state where an operation invalid area Ariv in FIG. 20 is omitted.

FIG. 22 shows a state, omitting the operation invalid area Ariv, where the grip detection area Arg and the operation detection area Arv are preliminarily arranged in the touch sensor 21 or where the controller 10 arranges the grip detection area Arg and the operation detection area Arv in the touch sensor 21.

FIG. 22 shows a state where the driver is gripping the circular portion 200r for normal driving, as in the case of FIG. 20. The controller 10 can discriminate between the above-described two states so as to prevent incorrect operation even though the operation invalid area Ariv is not provided as shown in FIG. 22.

Alternatively, the area of the palm contact detection portions Tp shown in FIG. 20 and the area of the palm contact detection portions Tp shown in FIG. 21 may be preliminarily registered in the controller 10 or in the storage unit 18 so as to switch between the state where the input operation performed on the touch sensor 21 is accepted and the state where the input operation performed on the touch sensor 21 is not accepted. Since the area of the palm contact detection portions is, of course, not always constant, an allowable margin of difference of the area is set in advance.

A change in shape of the palm contact detection portions Tp may be detected instead of the area change or in addition to the area change of the palm contact detection portions Tp.

Further, a change of the angle θ in the circumferential direction in the cross section of the palm contact detection portions P shown in FIG. 10 or a change of the maximum length of the palm contact detection portions Tp in the X-coordinate direction may be detected.

The state where the input operation is not accepted may be a state where the operation for controlling the operation target device is not accepted even if the particular input operation is performed, or may be a state where the controller 10 disables input from the sensor data generator 22 even if some sensor data is input into the controller 10. It is only required to disable the operation for controlling the operation target device consequently.

Fourth Embodiment

A control apparatus and method for controlling an operation target device in a vehicle according to a fourth embodiment will be explained below. Fundamental constitutions and operations in the fourth embodiment are the same as those in the first embodiment, and only different elements will be explained below.

A constitution example of accurately distinguishing the case where the driver is merely gripping the circular portion 200r from the case where the driver touches the touch sensor 21 to operate the operation target device according to the fourth embodiment is explained below with reference to FIG. 23.

FIG. 23 shows a state where the touch sensor 21 is developed in the same manner as FIG. 8. The operation invalid area Ariv is omitted in the constitution example shown in FIG. 23. When the driver is merely gripping the circular portion 200r, the thumb contact detection portions Tt and the index finger contact detection portions Ti are conceived to be located relatively close to the palm contact detection portions Tp.

The thumb contact detection portions Tt and the index finger contact detection portions Ti are defined as Tt0 and Ti0, respectively, in the case where the driver has no intention of operating the operation target device and the driver is merely gripping the circular portion.

FIG. 23 shows a case where the thumb contact detection portions Tt0 and the index finger contact detection portions Ti0 are detected when the driver is merely gripping the circular portion 200r and has no intention of operating the operation target device, and a case where the thumb contact detection portions Tt0 and the index finger contact detection portions Ti0 move to the thumb contact detection portions Tt and the index finger contact detection portions Ti located away from the palm contact detection portions Tp when the driver intends to operate the operation target device.

Although FIG. 23 shows the case where the thumb contact detection portions Tt0 and the thumb contact detection portions Tt have the same X-coordinate and where the index finger contact detection portions Ti0 and the index finger contact detection portions Ti have the same X-coordinate, the respective X-coordinates are not necessarily the same. In such a case, it is only required to focus only on the movement on the Y-coordinate.

The controller 10 stores, as a reference distance, a distance α1 between the end of the palm contact detection portions Tp towards the thumb contact detection portions Tt0 and the end of the thumb contact detection portions Tt0 towards the palm contact detection portions Tp in the state where the driver is gripping the circular portion 200r for normal driving. The controller 10 may serve as a storage unit to store the reference distance α1, or the storage unit 18 may store the reference distance α1.

The distance between the end of the palm contact detection portions Tp towards the thumb contact detection portions Tt and the end of the thumb contact detection portions Tt towards the palm contact detection portions Tp in the state where the driver intends to operate the operation target device, is, for example, a distance α2 which is longer than the distance α1.

The controller 10 determines that the driver intends to operate the operation target device when the controller 10 detects the thumb contact detection portions Tt having a predetermined distance, longer than the reference distance α1, from the end of the palm contact detection portions Tp towards the thumb contact detection portions Tt0. The controller 10 accepts the input operation performed with the thumb in this state as a valid operation detected in the thumb contact detection portions Tt.

Although FIG. 23 shows only the distances α1 and α2 between the palm contact detection portions Tp and the thumb contact detection portions Tt0 and Tt, a distance between the palm contact detection portions Tp and the index finger detection portions Ti0 may be stored in a similar manner to the distances α1 and α2 so as to detect the index finger detection portions Ti when the driver intends to operate the operation target device.

Namely, in the state where the driver is gripping the circular portion 200r but does not perform the input operation, the reference distance between the palm contact detection portions Tp in which the palm of the driver is in contact with the touch sensor 21 and the finger contact detection portions (the thumb contact detection portions Tt0 or the index finger detection portions Ti0) in which the finger (the thumb or the index finger) that performs the input operation is in contact with the touch sensor 21, may be stored so that the input operation performed with the finger is accepted as a valid operation when the palm contact detection portions Tp and the finger contact detection portions have a predetermined distance therebetween which is longer than the reference distance.

The operation invalid area Ariv may be provided although not shown in FIG. 23. When the operation invalid area Ariv is provided, the range of the operation invalid area Ariv may be smaller than that in FIG. 8.

Fifth Embodiment

A control apparatus and method for controlling an operation target device in a vehicle according to a fifth embodiment will be explained below. Fundamental constitutions and operations in the fifth embodiment are the same as those in the first embodiment, and only different elements will be explained below. The fifth embodiment shows still another constitution example of preventing occurrence of incorrect operation.

In FIG. 13A to FIG. 13D, the combination patterns of the input operations with both right and left hands used as the particular input operation for controlling the operation target device were shown. In order to further decrease the occurrence of incorrect operation, the controller 10 may enable the input operation when the detector 10a detects the same input operation being performed with both right and left hands.

The controller 10 may enable the input operation when detecting the same input operation being performed concurrently with both right and left hands.

Examples of the case where the same input operation is performed concurrently with both right and left hands are explained below with reference to FIG. 24A to FIG. 24C.

Figure 24A:
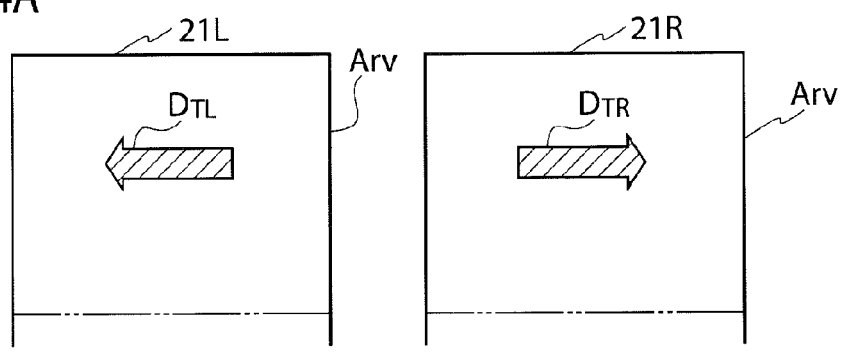
FIG. 24A to FIG. 24C are views each showing an example of an identical input operation performed concurrently on right and left touch sensors with right and left hands.

FIG. 24A shows a case where left dragging $D_{TL}$ to slide the thumb in the left direction on the left touch sensor 21L and right dragging $D_{TR}$ to slide the thumb in the right direction on the right touch sensor 21R are concurrently performed, as in the case of FIG. 13A.

FIG. 24A is an example of the same input operation of the dragging with both right and left thumbs on the circular portion 200r from the inner circumferential side to the outer circumferential side. Of course, the case where the right dragging $D_{TR}$ to slide the thumb in the right direction on the left touch sensor 21L and the right dragging $D_{TR}$ to slide the thumb in the right direction on the right touch sensor 21R are concurrently performed, or the case where the left dragging $D_{TL}$ to slide the thumb in the left direction on the left touch sensor 21L and the left dragging $D_{TL}$ to slide the thumb in the left direction on the right touch sensor 21R are concurrently performed, may also be defined as the same input operation.

However, the symmetrical input operation as shown in FIG. 24A is preferably defined as the same input operation.

Figure 24B:
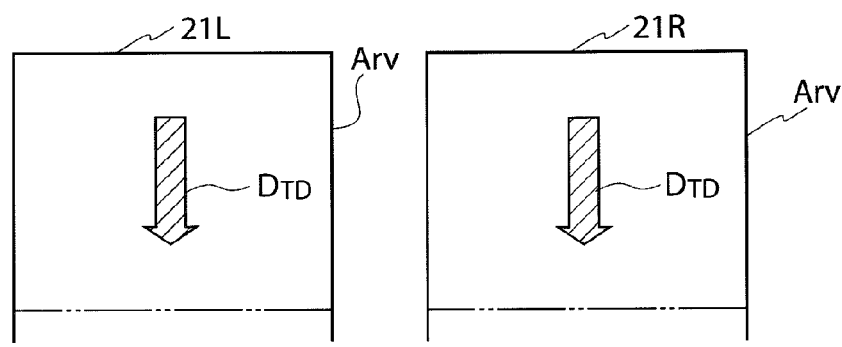

FIG. 24B is an example in which downward dragging $D_{TD}$ to slide the thumbs in the downward direction is performed concurrently on both the left touch sensor 21L and the right touch sensor 21R, as in the case of FIG. 13D.

The case where upward dragging $D_{TU}$ to slide the thumbs in the upward direction is performed concurrently on both the left touch sensor 21L and the right touch sensor 21R, may also be defined as the same input operation.

In the case of the dragging to slide the fingers in the vertical direction, the dragging not in a symmetrical manner but in the same direction on right and left sides may be defined as the same input operation.

The index fingers may be used in place of the thumbs in FIG. 24 and FIG. 24B.

Figure 24C:
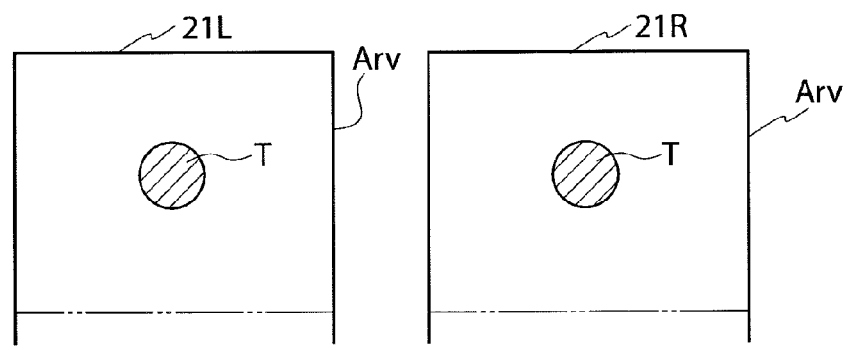

FIG. 24C is an example in which tapping T to tap the touch sensor 21 with the thumbs or the index fingers is performed concurrently on both the left touch sensor 21L and the right touch sensor 21R.

Figure 25A:
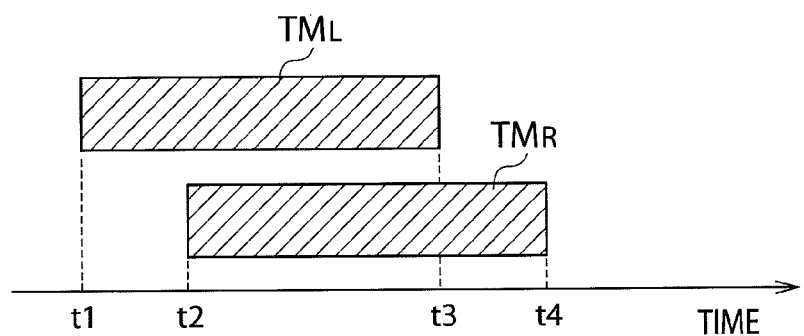
FIG. 25A and FIG. 25B are views each showing an example of input operations conceived to be performed concurrently.

The controller 10 determines that the input operation is performed concurrently on both sides in the following cases. For example, as shown in FIG. 25A, the dragging may be conceived to be performed concurrently on both sides in a case where time $TM_L$ from drag start timing t1 to drag end timing t3 performed with the left finger overlaps, for a predetermined period of time (at a predetermined rate) or more, with time $TM_R$ from drag start timing t2 to drag end timing t4 performed with the right finger.

Figure 25B:
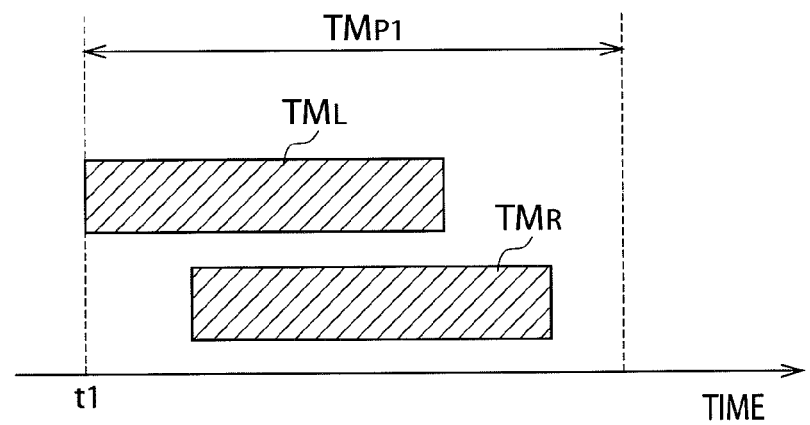

As shown in FIG. 25B, the dragging may be conceived to be performed concurrently on both sides in a case where a predetermined period of time $TM_{P1}$ is measured from drag start timing t1 performed with, for example, the left finger which starts dragging first, and dragging is sequentially performed with the right finger within the time $TM_{P1}$. Standards for determination on the input operation conceived to be performed concurrently may be determined as appropriate.

Since the completely same input operation is not made with right and left fingers, an allowable range for considering as the same input operation is arranged. In the case of the dragging, when the fingers slide in the same direction within the allowable range, the same input operation is considered to be performed.

In the case of the tapping T, the same input operation may be considered to be performed when the tapping T is performed on the same position. When the position of the tapping T is the same on the front part 21f or the rear part 21r, the tapping T is considered to be performed on the same position.

That is, when the tapping T is performed with the thumbs concurrently on both right and left sides or the tapping T is performed with the index fingers concurrently on both right and left sides, the input operation may be considered to be performed on the same position concurrently on both right and left sides.

In order to preventing incorrect operation, an acceptance mode of accepting the particular input operation performed on the touch sensor 21 as described above may be set in the controller 10, and the driver may intentionally select the acceptance mode.

It is also required to prevent an unintentional shift to the acceptance mode when shifting from an unaccepted mode.

Therefore, when the detector 10a detects the same input operation being performed with both hands on the respective touch sensors 21, the controller 10 shifts from the state of not accepting the particular input operation to the state of accepting the particular input operation (the acceptance mode) as described above. The same input operation is the same as explained with reference to FIG. 24A to FIG. 24C.

As is explained with reference to FIG. 25A and FIG. 25B, it is preferable to shift to the acceptance mode when the same input operation performed concurrently is detected.

In addition, when the particular input operation explained with reference to FIG. 11A to FIG. 11E, FIG. 12A to FIG. 12D and FIG. 13A to FIG. 13D is performed, and the particular input operation performed is then fixed, the operation target device may be controlled according to the particular input operation.

When the detector 10a detects the state where the particular input operation as explained in FIG. 11A to FIG. 11E, FIG. 12A to FIG. 12D and FIG. 13A to FIG. 13D (a first particular input operation) being performed, and the detector 10a then detects the particular input operation defined as the same input operation as explained in FIG. 24A to FIG. 24C (a second particular input operation) being performed, the controller 10 fixes the last first particular input operation.

As explained with reference to FIG. 25A and FIG. 25B, when detecting the state where the particular input operation defined as the same input operation is performed concurrently, the controller 10 may fix the last first particular input operation.

Figure 26:
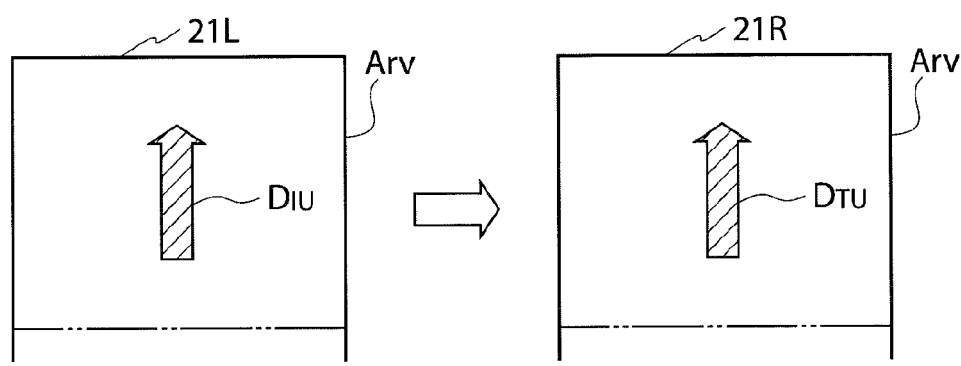
FIG. 26 is a view showing an example of predetermined input operations sequentially performed on right and left touch sensors with right and left hands.

As shown in FIG. 26, when the upward dragging $D_{IU}$ with the left index finger is detected and the upward dragging $D_{TU}$ with the right thumb is then detected within a predetermined period of time, the acceptance mode may be selected.

Figure 27:
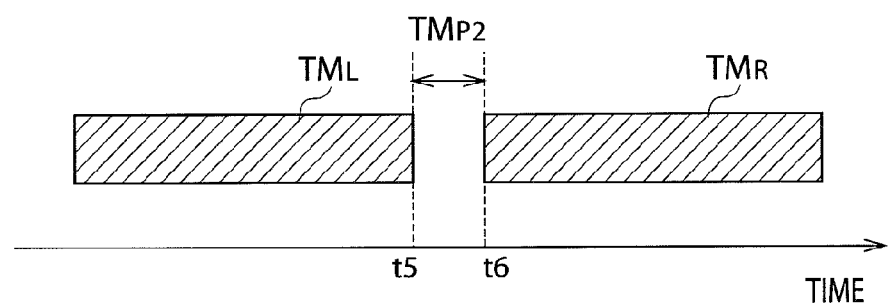
FIG. 27 is a view showing an example of input operations conceived to be performed sequentially.

As shown in FIG. 27, when there is a predetermined period of time $TM_{P2}$ between time $TM_L$ of the upward dragging $D_{IU}$ with the left index finger and time $TM_R$ of the upward dragging $D_{TU}$ with the right thumb, the controller 10 determines that the upward dragging $D_{IU}$ and the upward dragging $D_{TU}$ are performed as the continuous input operation so as to select the acceptance mode.

In addition, the target to be operated may be switched depending on the pattern of the input operations performed with the right and left hands.

Figure 28:
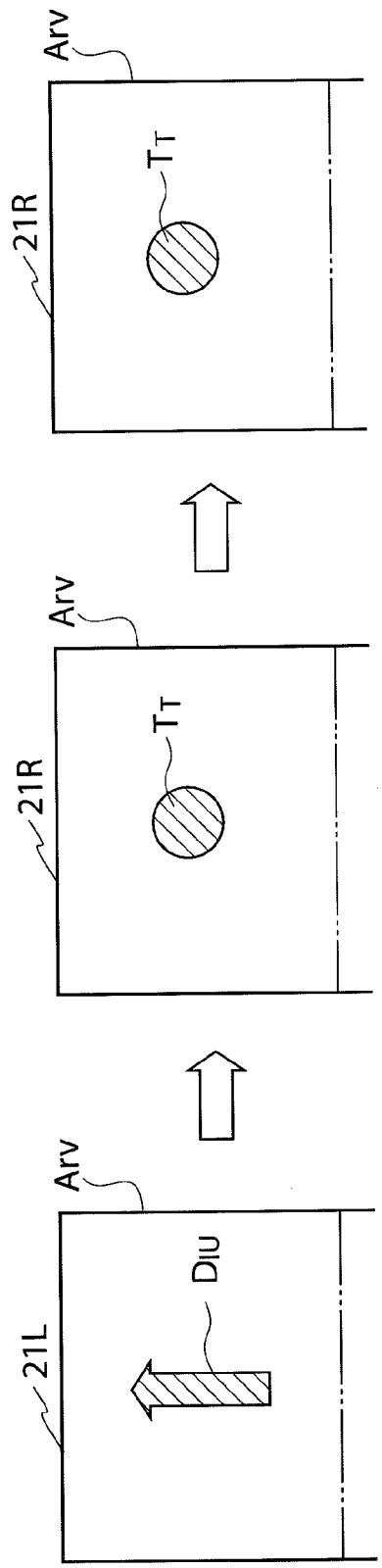
FIG. 28 is a view showing a first example of setting an operation mode according to a combination of input operations performed on right and left touch sensors with right and left hands.

For example, as shown in FIG. 28, when the detector 10a detects a state where the upward dragging $D_{IU}$ to slide the index finger in the upward direction on the left touch sensor 21L is performed and tapping $T_T$ to tap the right touch sensor 21R with the thumb is then repeated twice, the controller 10 selects an audio operation mode of operating the audio reproduction unit 12.

The controller 10 sets the audio reproduction unit 12 in the onboard equipment 100 as a target to be operated based on the particular input operation.

As shown in FIG. 29, when the detector 10a detects a state where the upward dragging $D_{TU}$ to slide the thumb in the upward direction on the left touch sensor 21L is performed and the tapping $T_T$ to tap the right touch sensor 21R with the thumb is then repeated twice, the controller 10 selects a navigation operation mode of operating the navigation processing unit 11.

The controller 10 sets the navigation processing unit 11 in the onboard equipment 100 as a target to be operated based on the particular input operation. Note that the combination of each input operation is merely an example and is not limited to FIG. 28 and FIG. 29.

In the constitution examples as explained with reference to FIG. 24A to FIG. 24C, FIG. 25A, FIG. 25B and FIG. 26 to FIG. 29, the respective operations may be performed on the assumption that the driver is gripping the circular portion 200r (the touch sensor 21).

Sixth Embodiment

A control apparatus and method for controlling an operation target device in a vehicle according to a sixth embodiment will be explained below. Fundamental constitutions and operations in the sixth embodiment are the same as those in the first embodiment, and only different elements will be explained below. The sixth embodiment shows still another constitution example of preventing occurrence of incorrect operation.

Figure 30A:
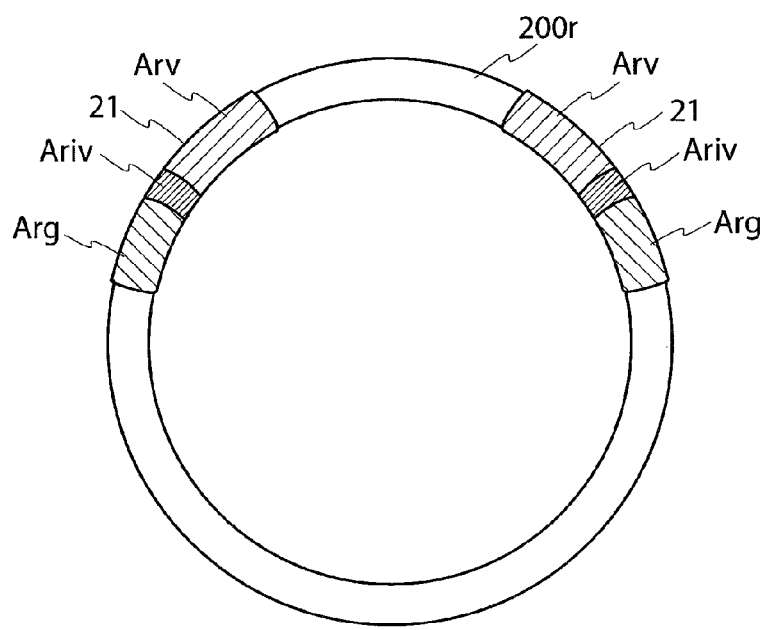
FIG. 30A and FIG. 30B are views each showing an example of dividing each area in the touch sensor by color.

FIG. 30A shows an example of sorting the touch sensor 21 by color into the grip detection area Arg, the operation invalid area Ariv and the operation detection area Arv. The classification by color may be made by applying paints or attaching sheets having different colors to the respective areas.

Sorting by color into the touch sensor 21 and other parts of the circular portion 200r other than the touch sensor 21 may also be effective. In such a case, the touch sensor 21 may be colored, or the other parts may be colored.

Alternatively, different colors may be used in each of the other parts other than the touch sensor 21, the grip area Arg, the operation invalid area Ariv and the operation detection area Arv.

Figure 30B:
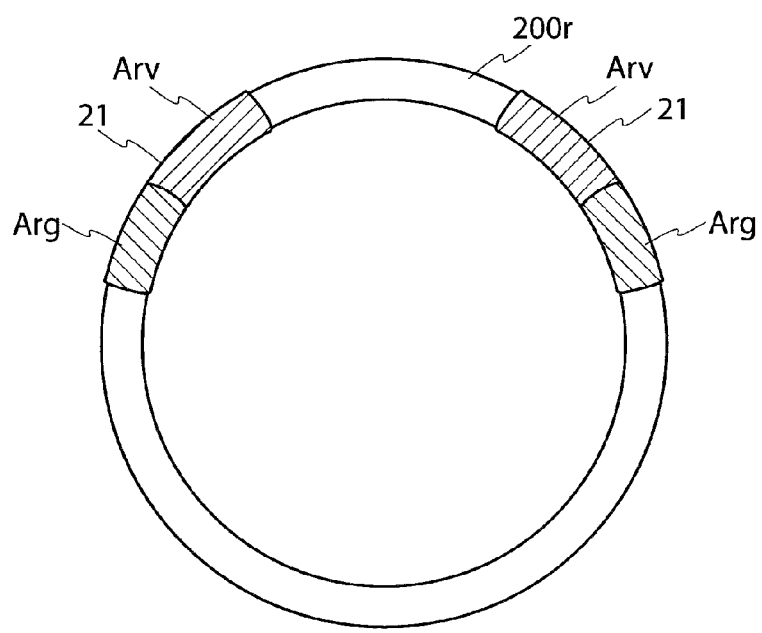

FIG. 30B is an example in which the operation invalid area Ariv is not provided, and the grip detection area Arg and the operation detection area Arv are sorted by color. When the touch sensor 21 and the other parts of the circular portion 200r other than the touch sensor 21 are sorted by color, the driver can visually recognize the position of the touch sensor 21 clearly and immediately.

As shown in FIG. 30A and FIG. 30B, the classification by color into the respective areas can allow the driver to visually recognize the positions of the respective areas on the touch sensor 21 clearly and immediately. The color change sheet 41 described above may also be used in FIG. 30A and FIG. 30B.

When the positions of the grip detection area Arg and the operation detection area Arv are dynamically set according to the position of the touch sensor 21 gripped by the driver, the color change sheet 41 may be used as follows.

The controller 10 arranges the grip detection area Arg and the operation detection area Arv in the touch sensor 21 after the driver touches the touch sensor 21 on the circular portion 200r.

The controller 10 classifies the grip detection area Arg and the operation detection area Arv by color after the arrangement of the grip detection area Arg and the operation detection area Arv.

In either case, the classification by color may be made by applying different colors to the respective areas or coloring one area so as to sort by color consequently.

Figure 31A:
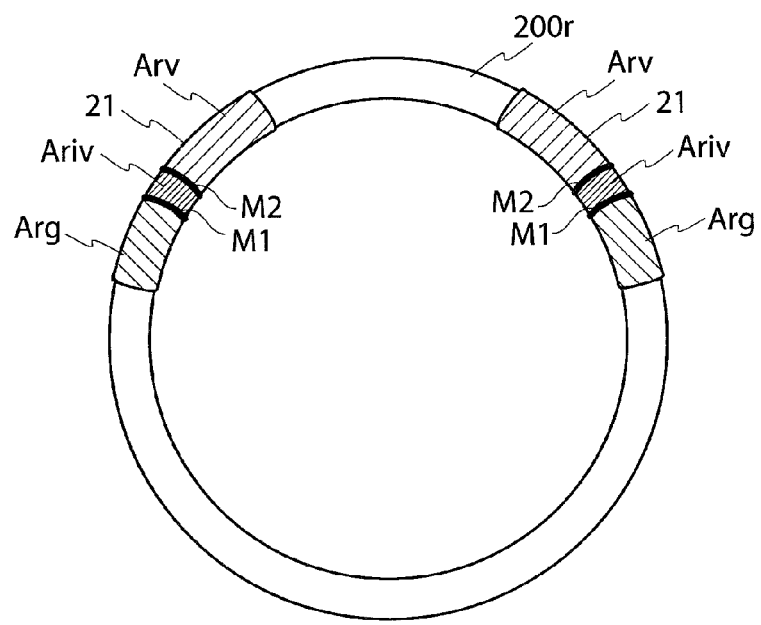
FIG. 31A and FIG. 31B are views each showing an example of providing markers at boundaries of the respective areas in the touch sensor.

FIG. 31A shows an example of applying markers M1 and M2 with a particular color to the respective boundaries of the grip detection area Arg, the detection invalid area Ariv and the operation detection area Arv. The application of the markers M1 and M2 is an example of boundary distinction means for distinguishing the respective boundaries. The markers M1 and M2 may be provided by applying paints or seals.

Figure 31B:
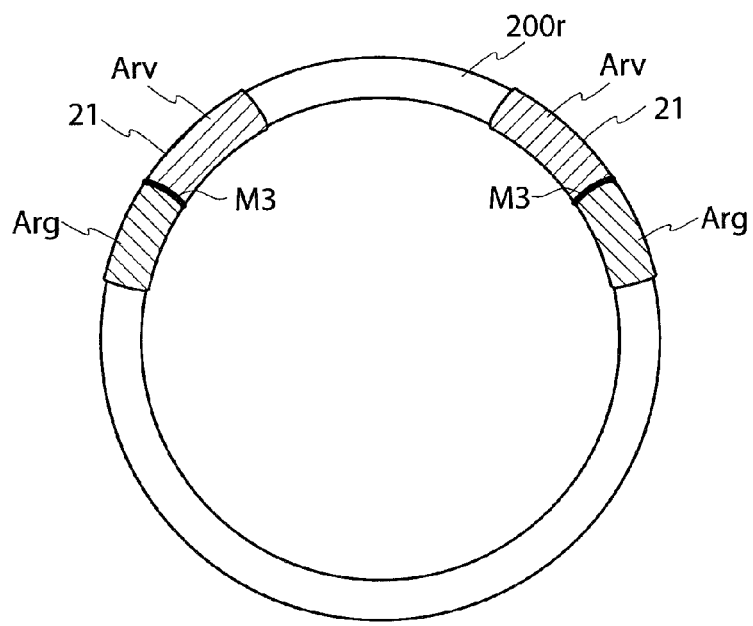

FIG. 31B is an example in which the operation invalid area Ariv is not provided, and a marker M3 with a particular color is applied to the boundary between the grip detection area Arg and the operation detection area Arv.

As shown in FIG. 31A and FIG. 31B, the indication of the boundaries can allow the driver to visually recognize the respective areas in the touch sensor 21 clearly and immediately.

Figure 32:
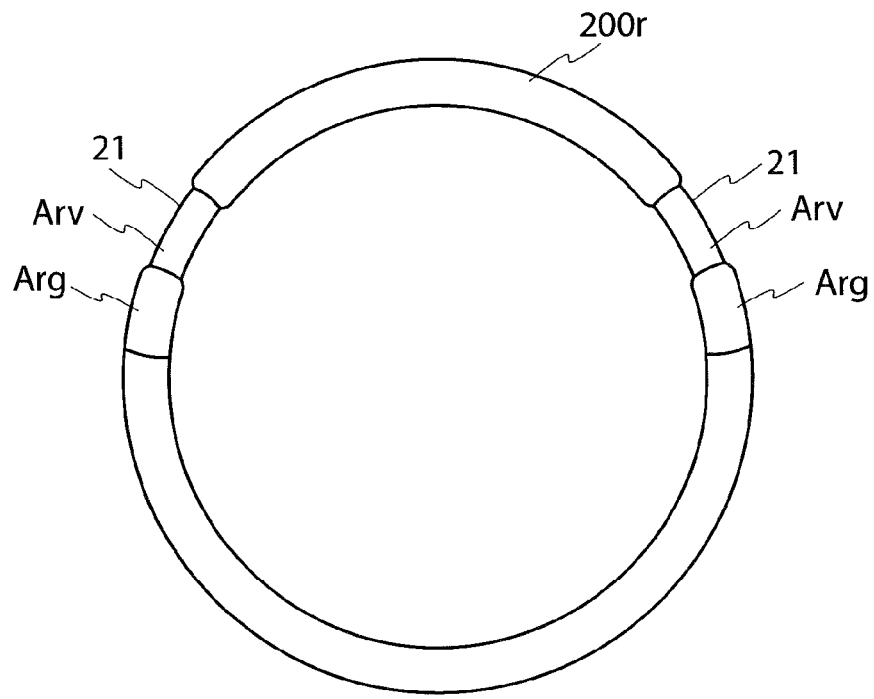
FIG. 32 is a view showing an example of decreasing the diameter of an operation detection area in the touch sensor.

FIG. 32 shows an example in which the diameter of the circular portion 200r in the operation detection area Arv is smaller than that in the grip detection area Arg. FIG. 32 is a case where the operation invalid area Ariv is not provided.

The diameter in the operation detection area Arv may be decreased to the extent that the driver can operate the steering wheel 200 without hindrance and tactually recognize that the part with the smaller diameter is located in the operation detection area Arv. The diameter of the boundary between the grip detection area Arg and the operation detection area Arv may change gradually.

Figure 33:
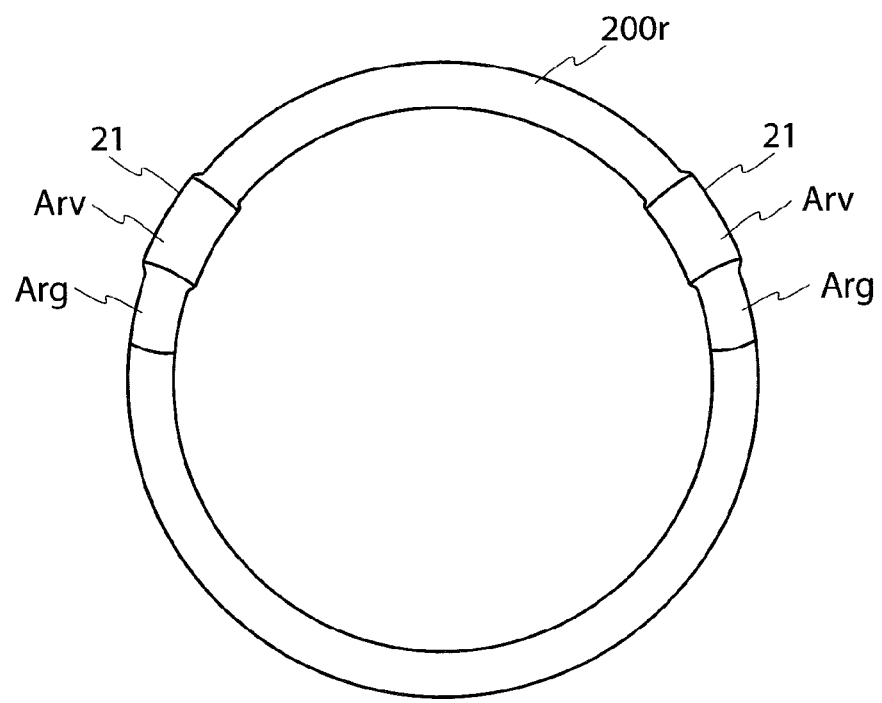
FIG. 33 is a view showing an example of increasing the diameter of the operation detection area in the touch sensor.

FIG. 33 shows an example in which the diameter of the circular portion 200r in the operation detection area Arv is larger than that in the grip detection area Arg. FIG. 33 is a case where the operation invalid area Ariv is not provided.

The diameter in the operation detection area Arv may be increased to the extent that the driver can operate the steering wheel 200 without hindrance and tactually recognize that the part with the smaller diameter is located in the operation detection area Arv. The diameter of the boundary between the grip detection area Arg and the operation detection area Arv may change gradually.

In the constitution examples of FIG. 32 and FIG. 33, the diameter of the circular portion 200*r* changes in the boundary between the grip detection area Arg and the operation detection area Arv. The change of the diameter may be an example of boundary distinction means for physically distinguishing the boundary.

Figure 34:
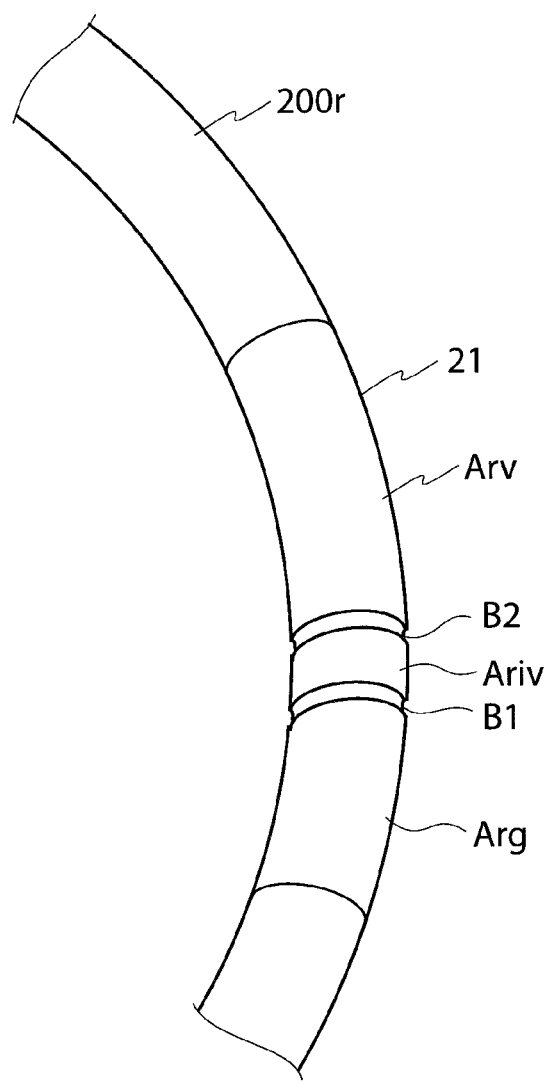
FIG. 34 is a view showing an example of providing recess portions at boundaries in the touch sensor.

FIG. 34 shows an example in which recesses B1 and B2 are formed in the respective boundaries of the grip detection area Arg, the operation invalid area Ariv and the operation detection area Arv.

The provision of the recesses B1 and B2 allows the driver to visually recognize the respective areas and tactually recognize the respective areas when gripping the touch sensor 21. Although not shown in the figure, a recess may be formed in the boundary between the grip detection area Arg and the operation detection area Arv when the operation invalid area Ariv is not provided.

The touch sensor 21 may be divided by the recesses B1 and B2 but is not required. The provision of the recesses B1 and B2 is another example of boundary distinction means for physically distinguishing the respective boundaries.

Figure 35:
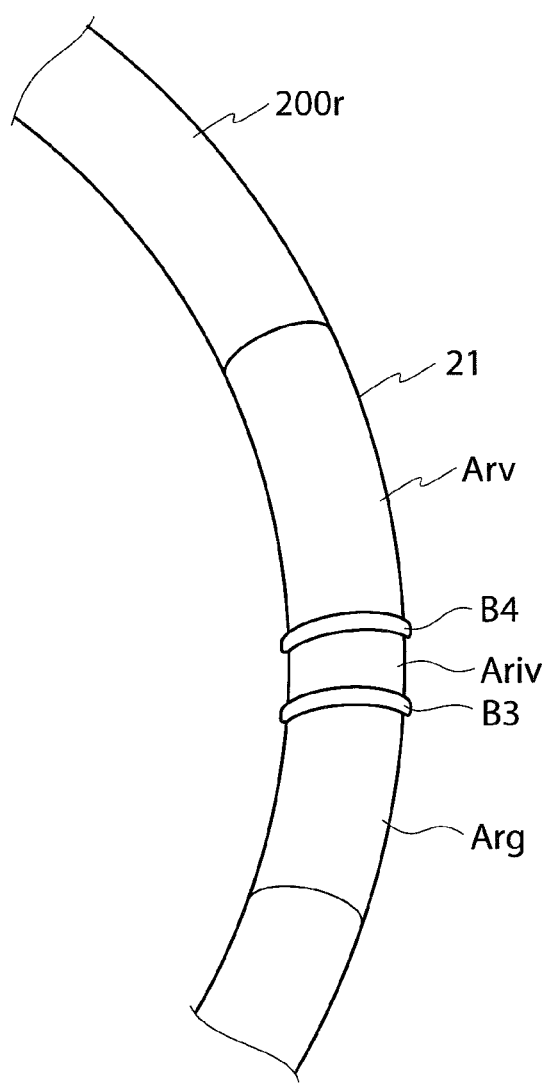
FIG. 35 is a view showing an example of providing projections at boundaries in the touch sensor.

FIG. 35 shows an example in which projections B3 and B4 are formed in the respective boundaries of the grip detection area Arg, the operation invalid area Ariv and the operation detection area Arv.

The provision of the projections B3 and B4 allows the driver to visually recognize the respective areas and tactually recognize the respective areas when gripping the touch sensor 21. Although not shown in the figure, a projection may be formed in the boundary between the grip detection area Arg and the operation detection area Arv when the operation invalid area Ariv is not provided.

The touch sensor 21 may be divided by the projections B3 and B4 but is not required. The provision of the projections B3 and B4 is still another example of boundary distinction means for physically distinguishing the respective boundaries.

The following is an explanation of a constitution example of further decreasing the occurrence of incorrect operation in a manner such that the driver accurately recognizes the position of the operation detection area Arv when the driver grips the grip detection area Arg.

Figure 36A:
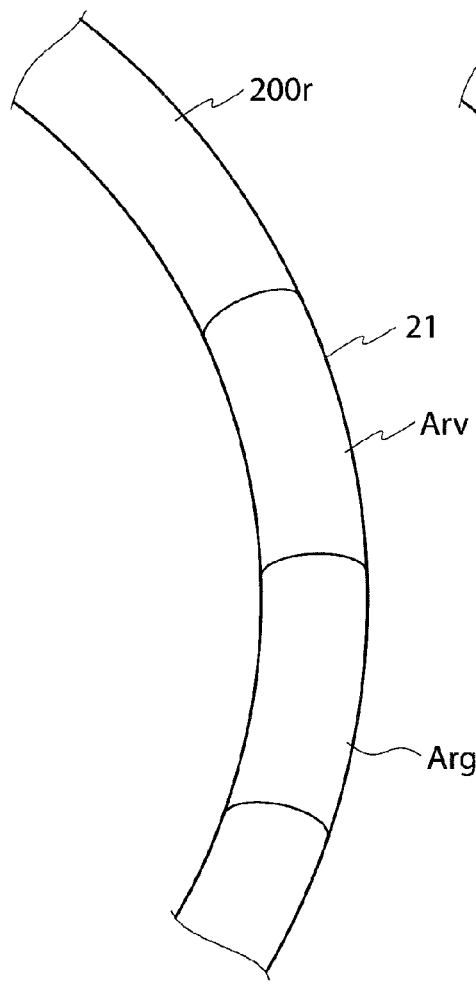
FIG. 36A and FIG. 36B are views showing an example of changing color in the operation detection area when determining that a grip detection area of the touch sensor is held.

FIG. 36A is a state where the driver is not gripping the grip detection area Arg. FIG. 36A is an example in which the operation invalid area Ariv is not provided.

Figure 36B:
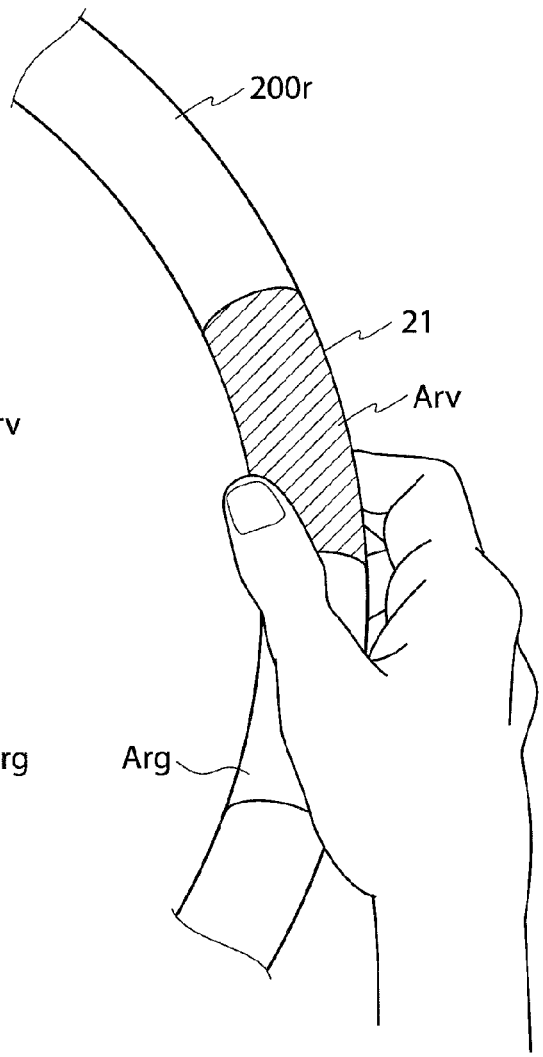

FIG. 36B is a state where the driver is gripping the grip detection area Arg. In the constitution examples of FIG. 36A and FIG. 36B, the color change sheet 41 described above is placed on the lower surface side of the operation detection area Arv.

When the detector 10*a* detects the grip detection area Arg being gripped, the controller 10 changes the color of the color change sheet 41 as shown in FIG. 36B. The change in color can allow the driver to clearly and visually recognize the position of the operation detection area Arv so as to further decreasing the occurrence of incorrect operation.

Figure 37A:
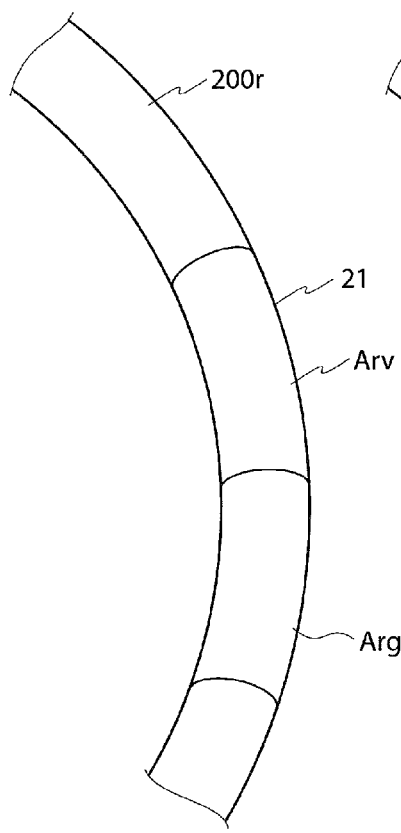
FIG. 37A and FIG. 37B are views showing an example of changing a texture of the operation detection area when determining that the grip detection area of the touch sensor is held.
Figure 37B:
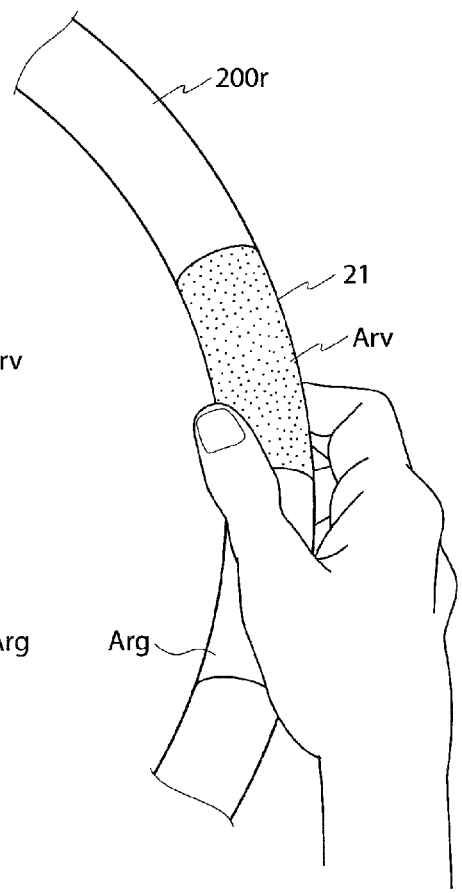

FIG. 37A and FIG. 37B each show an example of placing the tactile feedback sheet 42 described above on the upper surface of the operation detection area Arv. FIG. 37A is a state where the driver is not gripping the grip detection area Arg. FIG. 37B is a state where the driver is gripping the grip detection area Arg.

When the detector 10*a* detects the grip detection area Arg being gripped, the controller 10 controls the tactile feedback sheet 42 to change the texture thereof to, for example, a coarse state.

Alternatively, when the detector 10*a* detects the grip detection area Arg being gripped in a state where the texture of the tactile feedback sheet 42 is in a coarse state shown in FIG. 37A, the controller 10 may change the texture of the tactile feedback sheet 42 to a smooth state.

The change in texture of the tactile feedback sheet 42 can allow the driver to clearly and visually recognize the position of the operation detection area Arv so as to further decreasing the occurrence of incorrect operation.

The case of changing the texture of the tactile feedback sheet 42 does not require the driver to visually recognize the operation detection area Arv, which contributes to safety driving. The way of changing the texture of the tactile feedback sheet 42 is not particularly limited.

In the constitution examples of FIG. 36A, FIG. 36B, FIG. 37A and FIG. 37B, when the color change sheet 41 or the tactile feedback sheet 42 is placed not only on the operation detection area Arv but on the entire the touch sensor 21, the color or texture in the operation detection area Arv can be changed even if the positions of the grip detection area Arg and the operation detection area Arv, and the operation invalid area Ariv as necessary, are determined dynamically depending on the position in the touch sensor 21 gripped by the driver.

Although the color or texture is changed only in the operation detection area Arv in FIG. 36A, FIG. 36B, FIG. 37A and FIG. 37B, the color or texture of each of the grip detection area Arg and the operation detection area Arv may be changed in a manner such that the grip detection area Arg and the operation detection area Arv have different colors or textures from each other.

Here, the color or texture of the respective areas may be changed so as to have different colors or textures from each other, or the color or texture of only part of the areas may be changed so as to have different colors or textures consequently.

Although not shown in the figure, only the operation detection area Arv may preliminarily have a different texture from each of the grip detection area Arg and the operation detection area Arv.

Only the operation detection area Arv may be subjected to surface treatment to have a coarse, rough or smooth texture, or may be provided thereon with a sheet having such a texture so as to have a different texture form the grip detection area Arg and the operation invalid area Ariv.

The driver can clearly and tactually recognize the position the operation detection area Arv due to such a process, although the process is not applicable to the case where the operation detection area Arv is determined dynamically.

As explained above with reference to FIG. 30A, FIG. 30B, FIG. 31A, FIG. 31B, FIG. 32 to FIG. 35, FIG. 36A, FIG. 36B, FIG. 37A and FIG. 37B, the grip detection area Arg and the operation detection area Arv are configured to be distinguishable from each other at least when the detector detects the grip detection area Arg being gripped.

Note that the constitutions shown in FIG. 30A, FIG. 30B, FIG. 31A, FIG. 31B, FIG. 32 to FIG. 35, FIG. 36A, FIG. 36B, FIG. 37A and FIG. 37B are merely examples. Each of the constitutions shown in FIG. 30A, FIG. 30B, FIG. 31A, FIG. 31B, FIG. 32 to FIG. 35, FIG. 36A, FIG. 36B, FIG. 37A and FIG. 37B may be combined together.

The grip detection area Arg and the operation detection area Arv may be configured to be always distinguishable from each other. Alternatively, the grip detection area Arg and the operation detection area Arv may be configured to be distinguishable from each other only when detecting the grip detection area Arg being gripped, so as to indicate whether the operation input to the operation detection area Arv is acceptable depending on whether the grip detection area Arg and the operation detection area Arv are distinguishable from each other.

Seventh Embodiment

A control apparatus and method for controlling an operation target device in a vehicle according to a seventh embodiment will be explained below. Fundamental constitutions and operations in the seventh embodiment are the same as those in the first embodiment, and only different elements will be explained below.

FIG. 11A to FIG. 11E, FIG. 12A to FIG. 12D and FIG. 13A to FIG. 13D show several kinds of patterns of dragging to slide the fingers on the touch sensors 21 in the right-left direction or in the vertical direction. However, even when the driver intends to slide the fingers in the right-left direction or in the vertical direction as viewed from the driver, a track made by contact of the finger is not necessarily a straight line and may be an arc-like curve. Further, a line connecting a starting point and an end point of dragging may greatly be shifted from a horizontal line or a vertical line.

This is because the surface of the circular portion 20r is not flat, and because the movement of the finger tends to be a rotational movement about the base of the finger.

Figure 38:
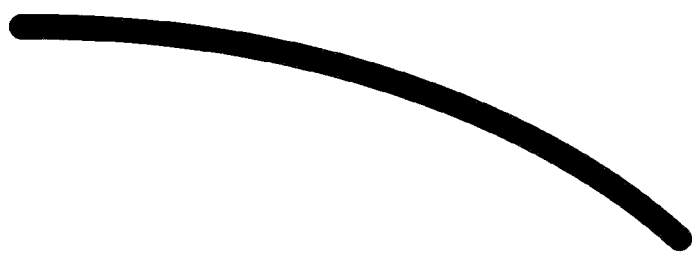
FIG. 38 is a view showing an example of a track obtained when sliding a finger in a right-left direction.

FIG. 38 shows an example of a track when sliding the left finger on the touch sensor 21 in the right-left direction. The left side in FIG. 38 is the outer side of the circular portion 200r, and the right side is the inner side of the circular portion 200r. As shown in FIG. 38, the position of the track on the inner side of the circular portion 200 tends to be located below that on the outer side.

Figure 39A:
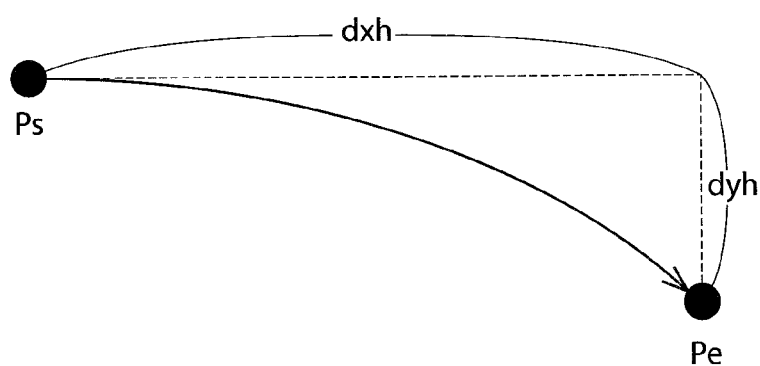
FIG. 39A and FIG. 39B are views for explaining a track correction when sliding a finger in a right direction.
Figure 39B:
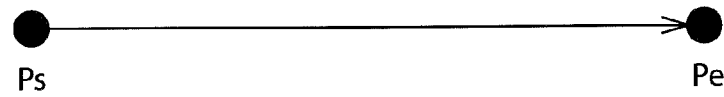

It is not preferred to require the driver to draw not an arc-like curved line shown in FIG. 38 but a straight line in view of operability. Thus, according to the present embodiment, the controller 10 determines that the dragging is made in a straight line in the horizontal direction as shown in FIG. 39B when a difference dxh of components "x" in the horizontal direction from a starting point Ps to an end point Pe of the track is a predetermined threshold value or greater, and a difference dyh of components "y" in a vertical direction is less than a predetermined threshold value as shown in FIG. 39A.

Alternatively, the controller 10 may determine that the dragging is made in a straight line in the horizontal direction when a ratio of the difference dyh to the difference dxh (dyh/dxh) is less than a predetermined threshold value. For example, the threshold value is ½.

The dragging to slide the finger on the touch sensor 21 in the vertical direction also tends to draw not a straight line but a curved line.

Figure 40A:
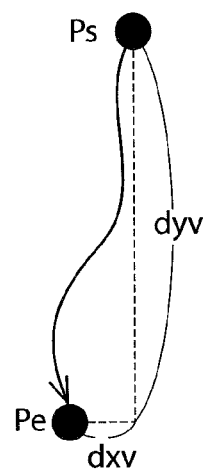
FIG. 40A and FIG. 40B are views for explaining a track correction when sliding a finger in a downward direction.
Figure 40B:

Thus, according to the present embodiment, the controller 10 determines that the dragging is made in a straight line in the vertical direction as shown in FIG. 40B when a difference dyv of components "y" from a starting point Ps to an ending point Pe of the track is a predetermined threshold value of greater, and a difference dxv of components "x" is less than a predetermined threshold value as shown in FIG. 40A.

When the threshold value for the difference dxh is defined as THxh, the threshold value for the difference dyh is defined as THyh, the threshold value for the difference dyv is defined as THyv, and the threshold value for the difference dxv is defined as THxv, it is preferable to fulfill the conditions of THxv<THxh and THyh<THyv. The respective threshold values are preliminarily stored in the controller 10.

As in the case of the dragging in the horizontal direction, the controller 10 may determine that the dragging is made in a straight line in the vertical direction when a ratio of the difference dxv to the difference dyv (dxv/dyv) is less than a predetermined threshold value. For example, the threshold value is ½.

In order to increase the patterns of dragging, oblique dragging to slide the finger in an oblique direction may be added. However, the oblique dragging tends to be difficult to be distinguished from the case where the driver slides the finger in the right-left direction as shown in FIG. 38 that unintentionally results in an arc-like curve.

Figure 41A:
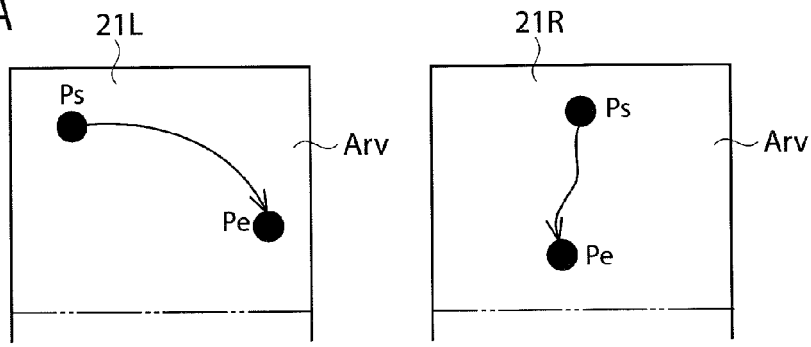
FIG. 41A to FIG. 41D are views for explaining an example of dragging in an oblique direction.

In view of this, oblique dragging defined as follows further improves the operability. FIG. 41A shows a state of sliding one of the fingers in the right direction on the left touch sensor 21L and a state of sliding one of the fingers in the downward direction on the right touch sensor 21R.

Figure 41B:
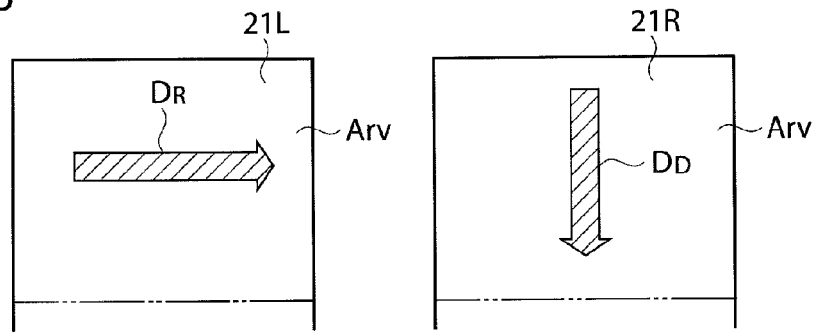

In such a case, the controller 10 can consider the operation on the left touch sensor 21L as right dragging $D_R$ and consider the operation on the right touch sensor 21R as downward dragging $D_D$ as shown in FIG. 41B according to the track correction as explained in FIG. 39A, FIG. 39B, FIG. 40A and FIG. 40B.

Figure 41C:
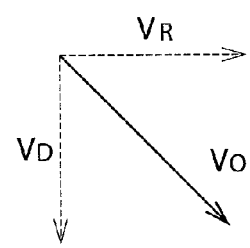

As shown in FIG. 41C, an oblique vector $V_O$ is obtained by composition of a vector $V_R$ of the right dragging $D_R$ and a vector $V_D$ of the downward dragging $D_D$. Thus, when the right dragging $D_R$ is performed on the left touch sensor 21L and the downward dragging $D_D$ is performed on the right touch sensor 21R, the controller 10 obtains the oblique vector $V_O$ by the composition of the vectors so as to determine that the oblique dragging $D_O$ having the oblique vector $V_O$ is performed as shown in FIG. 41D.

Figure 41D:
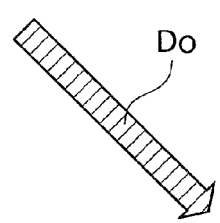

FIG. 41D shows an example of the oblique dragging $D_O$ in the obliquely lower right direction. Alternatively, the oblique dragging $D_O$ in the obliquely upper right direction, the oblique dragging $D_O$ in the obliquely lower left direction, or the oblique dragging $D_O$ in the obliquely upper left direction may also be performed. The oblique dragging $D_O$ achieved according to the present embodiment improves the operability.

When, for example, upper dragging is performed both on the left touch sensor 21L and on the right touch sensor 21R, the controller 10 may control an operation performed based on a larger vector obtained by composition of the two drag vectors in the same direction (in the upward direction in this case).

Such an operation controlled by the controller 10 can achieve wide scrolling on a map only by one dragging so as to improve operability.

In addition, a specific operation may be performed when a direction of a vector of dragging performed on the left touch sensor 21L is opposite to that of a vector of dragging performed on the right touch sensor 21R and when the angle between the two vectors is close to 180° (for example, 180° with a margin of plus or minus α: α is an arbitrary angle). For example, a map may be rotated.

As explained above, the controller 10 according to the present embodiment controls the operation target device according to the combination patterns of the input operation on the left touch sensor 21L and the input operation on the right touch sensor 21R.

Note that, although the present embodiment exemplified the vector composition on the basis of the four directions of the upward direction, the downward direction, the left direction and the right direction, the vector composition may be made on the basis of more directions.

A difference between a track of dragging that the user intends and a track of dragging actually made tends to be in a symmetric state, and the track deviation may be cleared by performing the vector composition. Here, only the correction of dragging to draw a straight line connecting from the starting point to the end point of the track may be performed, and the direction consideration of the dragging which is either in the horizontal direction or in the vertical direction described above may be omitted.

Eighth Embodiment

A control apparatus and method for controlling an operation target device in a vehicle according to an eighth embodiment will be explained below. Fundamental constitutions and operations in the eighth embodiment are the same as those in the first embodiment, and only different elements will be explained below. Although the way of defining dragging in the horizontal direction and in the vertical direction in the eighth embodiment is different from that in the seventh embodiment, the track correction when sliding fingers and the operation of the vector composition are the same as those in the seventh embodiment.

Figure 42:
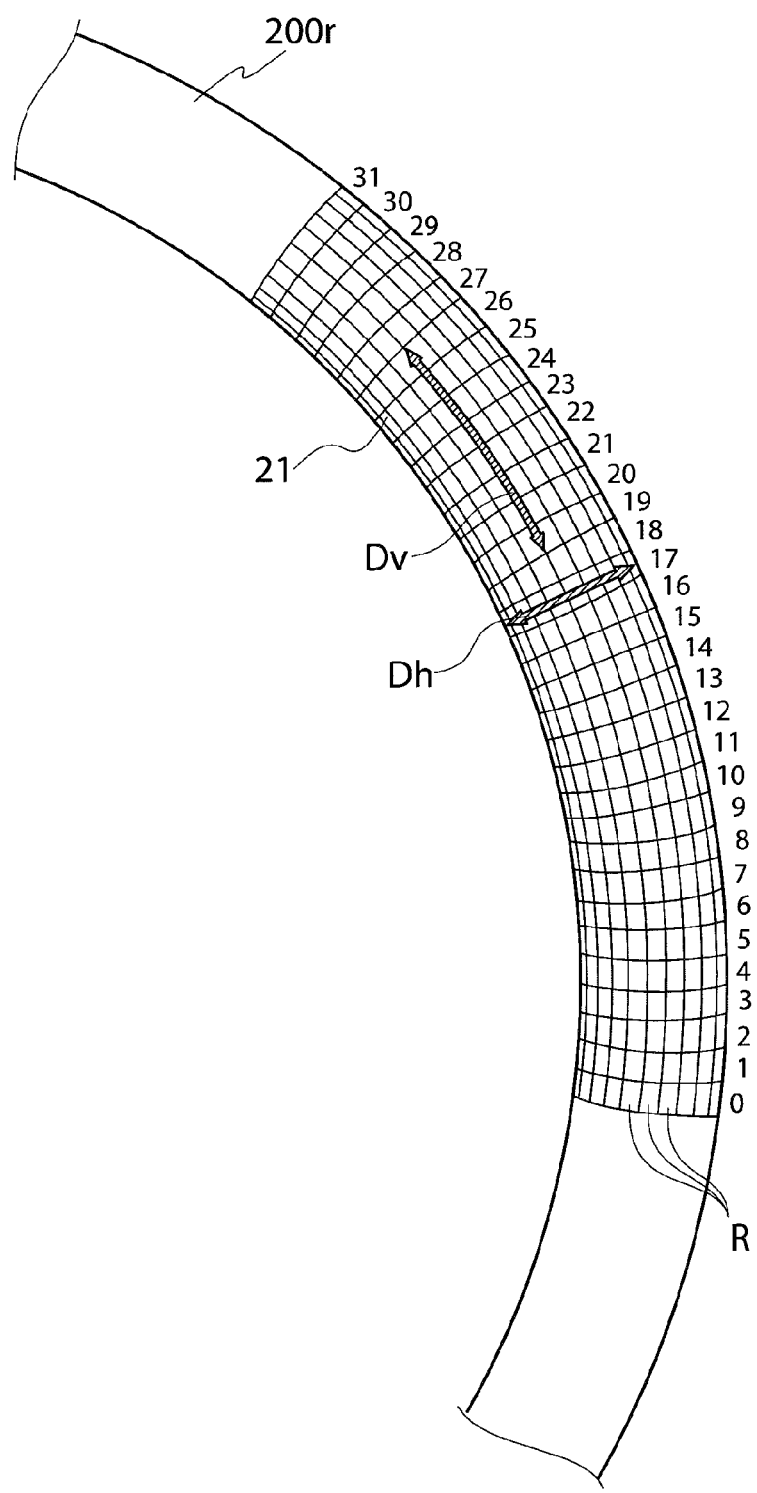
FIG. 42 is a partial perspective view for explaining a definition of dragging in a horizontal direction and in a vertical direction according to an eighth embodiment.

In the present embodiment, as shown in FIG. 42, an operation to slide the finger on the touch sensor 21 in the diameter direction of the circular portion 200r (the steering wheel 200) is defined as horizontal dragging Dh, and an operation to slide the finger in the circumferential direction of the circular portion 200r is defined as vertical dragging Dv.

Figure 43:
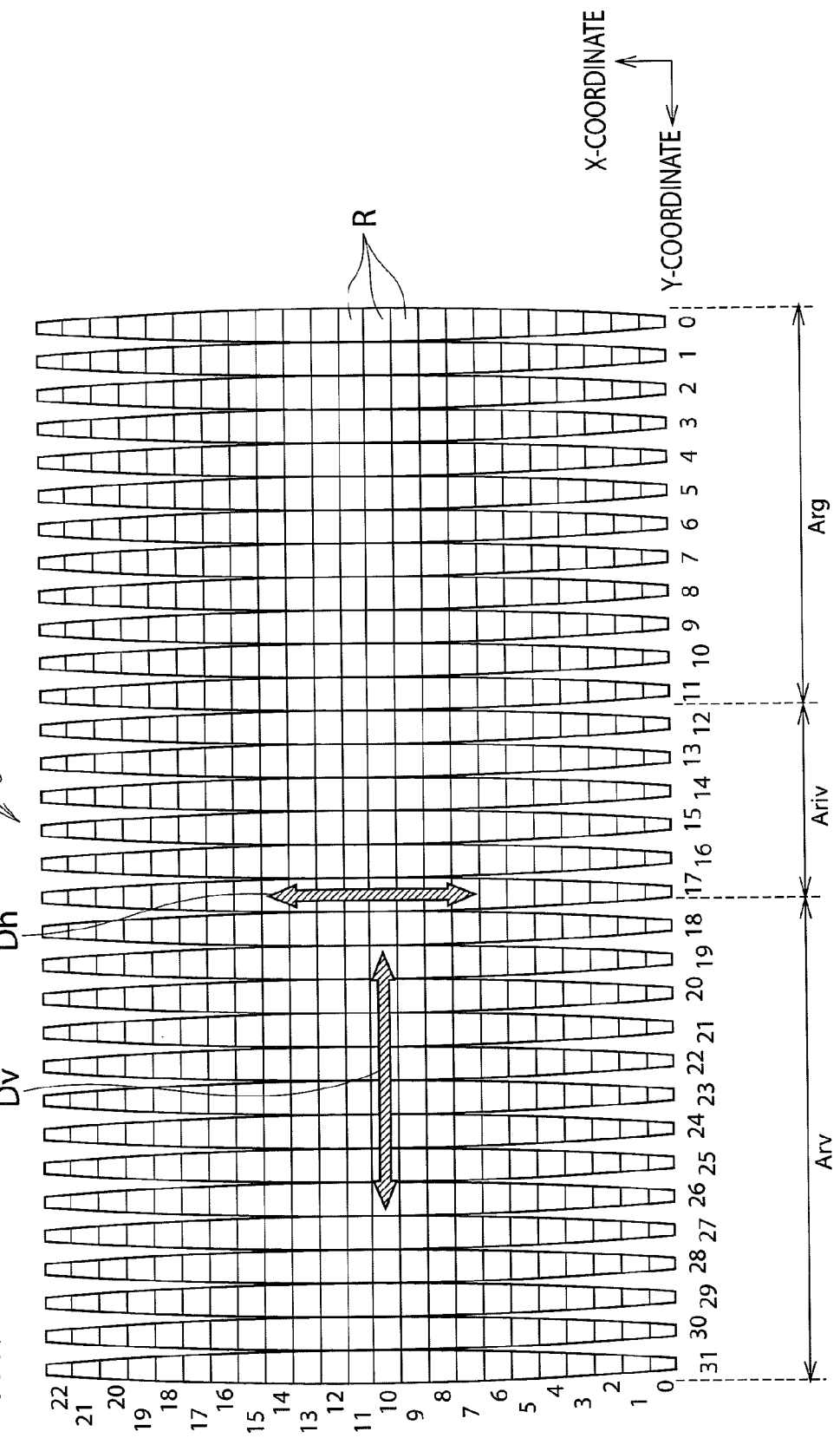
FIG. 43 is a plan view for explaining a definition of dragging in each of a horizontal direction and a vertical direction in a state where the touch sensor is developed according to the eighth embodiment.

FIG. 43 shows a development of the touch sensor 21 obtained by adding the horizontal dragging Dh and the vertical dragging Dv to the development of FIG. 8. FIG. 42 and FIG. 43 each show a case where the horizontal dragging Dh and the vertical dragging Dv are each shown in one row of the detection regions R on the respective X-coordinate and Y-coordinate respectively. However, the dragging may be made in a manner such that the finger comes into contact with plural rows of the detection regions R.

FIG. 11A to FIG. 11E, FIG. 12A to FIG. 12D and FIG. 13A to FIG. 13D show several kinds of patterns of dragging to slide the fingers on the touch sensors 21 in the right-left direction or in the vertical direction. However, even when the driver intends to perform the horizontal dragging Dh or the vertical dragging Dv described above, the fingers do not necessarily slide in the radial direction or in the circumferential direction appropriately.

As is apparent from the development of FIG. 43, when the horizontal dragging Dr or the vertical dragging Dv is performed appropriately, the track obtained by contact of the finger results in a straight line. However, the track is not necessarily in a straight line and may actually result in a curved line. In addition, a line connecting a starting point and an end point of dragging may greatly deviate from the horizontal direction or the vertical direction.

The track correction and the operation of the vector composition in the eighth embodiment are the same as those in the seventh embodiment with reference to FIG. 38, FIG. 39A, FIG. 39B, FIG. 40A, FIG. 40B and FIG. 42A to FIG. 41C, and the explanations thereof are not repeated here.

Ninth Embodiment

A control apparatus and method for controlling an operation target device in a vehicle according to a ninth embodiment will be explained below. Fundamental constitutions and operations in the ninth embodiment are the same as those in the first embodiment, and only different elements will be explained below.

A constitution example of the ninth embodiment in which the deformed steering wheel 201 shown in FIG. 5 is further developed is explained below with reference to FIG. 44, FIG. 45, FIG. 46 and FIG. 47A to FIG. 47C.

Figure 44:
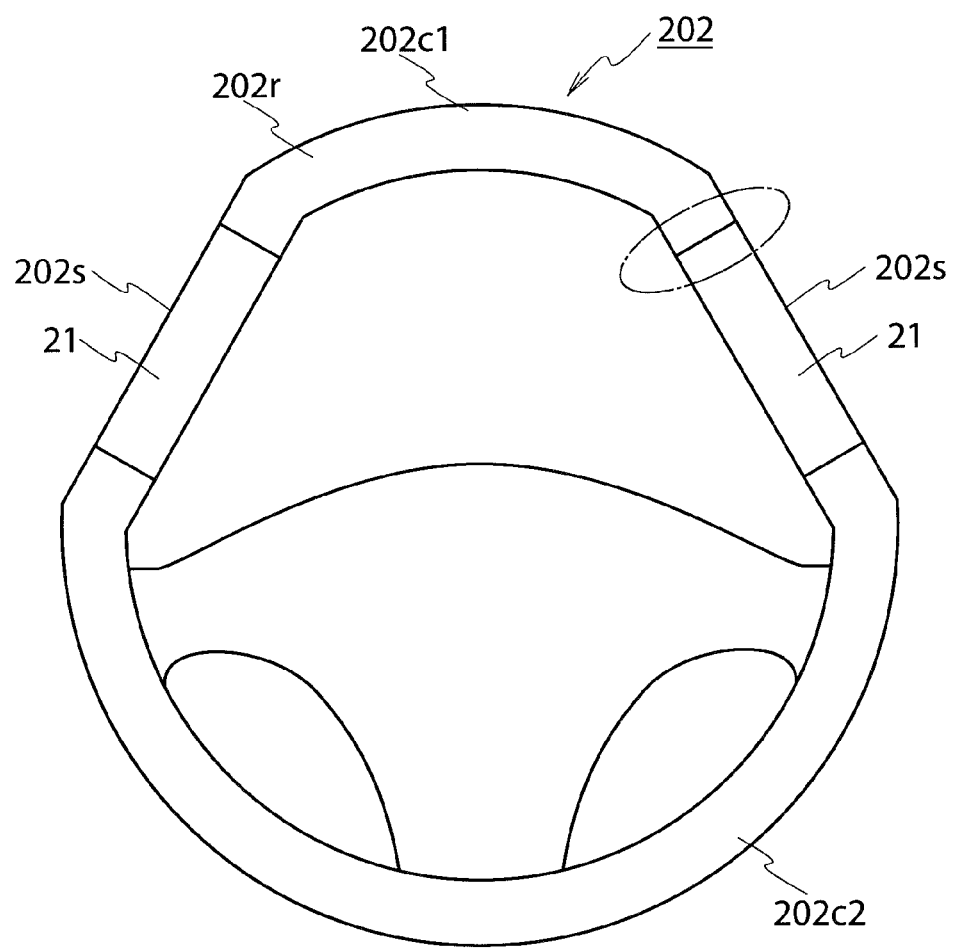
FIG. 44 is a plan view showing a modified constitution example of a deformed steering wheel.

As shown in FIG. 44, a deformed steering wheel 202 includes grip portions 202s having a right cylindrical shape formed in part of the circular portion 200r on both right and left sides that the driver grips. The pair of grip portions 202s on the right and left sides are connected via an upper connecting portion 202c1 and a lower connecting portion 202c2 so as to form a ring portion 202r. The touch sensor 21 is mounted on each grip portion 202s.

Figure 45:
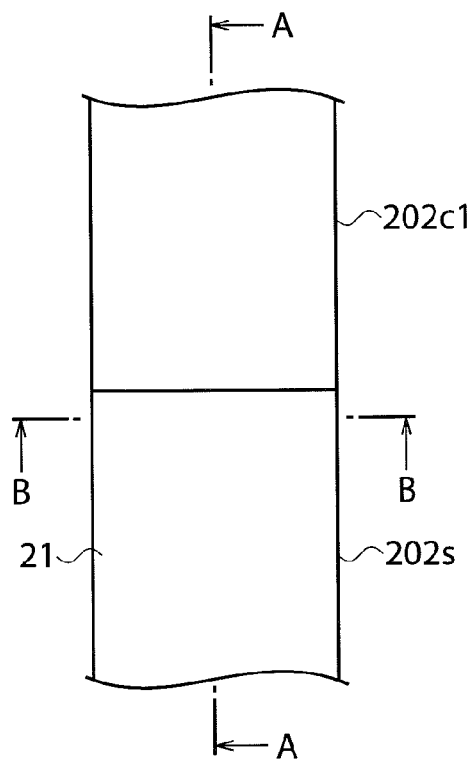
FIG. 45 is a partially enlarged plan view of FIG. 44.
Figure 46:
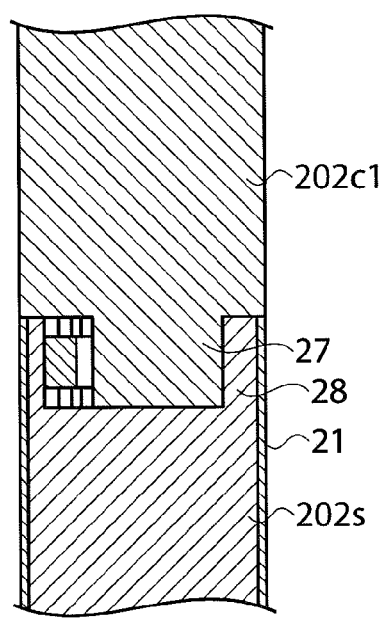
FIG. 46 is a cross-sectional view along the line A-A of FIG. 45.

FIG. 45 is an enlarged view showing the boundary between the connecting portion 202c1 and the grip portion 202s surrounded by a dashed-dotted line in FIG. 44. FIG. 46 is a cross-sectional view along the line A-A in FIG. 45.

The grip portion 202s is formed to have a slightly smaller diameter than the connecting portions 202c1 and 202c2, and the touch sensor 21 is mounted on the grip portion 202s. Therefore, there is almost no difference in level at the boundary between the grip portion 202s and the respective connecting portions 202c1 and 202c2 so as to provide a continuously smooth surface.

In the deformed steering wheel 202 shown in FIG. 44, the driver switches the ON/OFF state of the input operation performed on the touch sensor 21 by operating the grip portion 202s.

The ON state of the input operation is to allow (enable) the particular input operation described above, and the OFF state of the input operation is not to allow (disable) the particular input operation described above.

The grip portion 202s has an ON/OFF switching mechanism installed therein, which switches the input operation between the ON state and the OFF state.

Figure 47A:
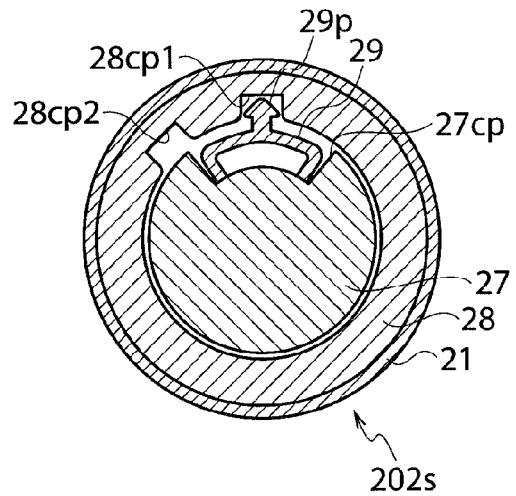
FIG. 47A to FIG. 47C are cross-sectional views along the line B-B of FIG. 45 and for explaining an ON/OFF switching operation by means of an ON/OFF switching mechanism.
Figure 47B:
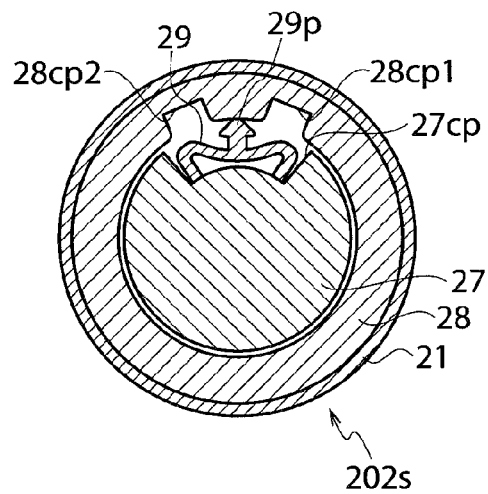
Figure 47C:
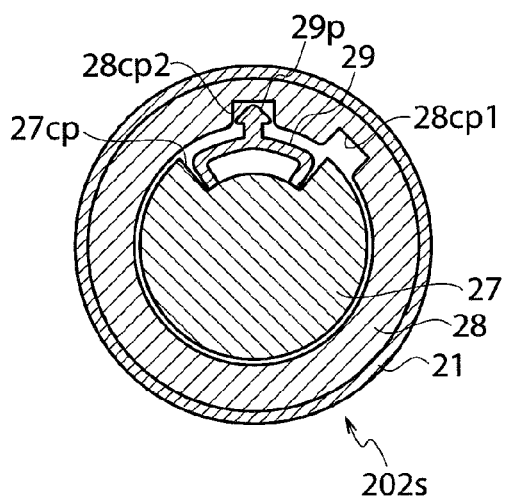

The ON/OFF switching mechanism and the switching operation with the ON/OFF switching mechanism are explained below with reference to FIG. 46 and FIG. 47A to FIG. 47C. FIG. 47A to FIG. 47C each show a cross-sectional view along the line B-B of FIG. 45. As shown in FIG. 46, the end portion of the connecting portion 202c1 towards the grip portion 202s is provided with a protrusion 27. The end portion of the grip portion 202s towards the connecting portion 202c1 is provided with a receiving portion 28 having a recess to receive the protrusion 27.

As shown in FIG. 47A to FIG. 47C, part of the protrusion 27 in the circumferential direction is provided with a cutout serving as a recess 27cp. An elastic deforming portion 29 having a projection 29p is fixed to the recess 27cp. Two recesses 28cp1 and 28cp2 are formed on the inner surface of the receiving portion 28.

In the normal state of the deformed steering wheel 202, the grip portion 202s is in the state shown in FIG. 47A. Namely, the projection 29p is engaged with the recess 28cp1. FIG. 47A shows a state where the input operation performed on the touch sensor 21 is in the OFF state. When the driver normally drives the vehicle without operating the operation target device with the touch sensor 21, the ON/OFF switching mechanism is in the OFF state shown in FIG. 47A.

Once the grip portion 202s in the OFF state shown in FIG. 47A rotates towards the outer circumference of the deformed steering wheel 202, the engagement between the projection 29p and the recess 28cp1 is released as shown in FIG. 47B so that the projection 29p comes into contact with a protruding portion between the recesses 28cp1 and 28cp2. At this point, the elastic deforming portion 29 is pressed and deformed by the protruding portion between the recesses 28*cp*1 and 28*cp*2.

When the grip portion 202*s* further rotates towards the outer circumference of the deformed steering wheel 202, the projection 29*p* is engaged with the recess 28*cp*2 as shown in FIG. 47C so that the input operation performed on the touch sensor 21 is in the ON state.

Although not shown n the figure, the OFF state of the input operation on the touch sensor 21 shown in FIG. 47A and the ON state of the input operation on the touch sensor 21 shown in FIG. 47C are each electrically detected. A state detection signal from the ON/OFF switching mechanism in the grip portion 202*s* is input into the controller 10.

The driver selects the state shown in FIG. 47A when normally driving the vehicle without operating the operation target device with the touch sensor 21 and selects the state shown in FIG. 47C by rotating the grip portion 202*s* towards the outer circumference when intending to operate the operation target device with the touch sensor 21.

At the point where the projection 29*p* is engaged with the recess 28*cp*2 when shifting from the state of FIG. 47A to the state of FIG. 47C, and at the point where the projection 29*p* is engaged with the recess 28*cp*1 when shifting from the state of FIG. 47C to the state of FIG. 47A, the driver can ensure a feeling of clicking so as to recognize that the ON state and the OFF state are switched.

The ON/OFF switching mechanism shown in FIG. 47A to FIG. 47C may be provided in each of or in one of the grip portions 202*s* on the right and left sides. When the ON/OFF switching mechanism is provided in each of the right and left grip portions 202*s*, the input operation may be in the ON state when the right and left grip portions 202*s* are both in the ON state, or the input operation may be in the ON state when one of the grip portions 202*s* is in the ON state. Alternatively, the input operation may be in the ON state when the grip portion 202*s* rotates towards the inner circumference.

In the constitution example of FIG. 44, since a sense of touch (a feeling of gripping) of the driver when gripping the grip portion 202*s* does not change between the ON state and the OFF state of the input operation, there is no adverse effect on the driver.

In the constitution of the touch sensor 21 mounted on the grip portion 202*s* in the deformed steering wheel 202 shown in FIG. 44, the touch sensor 21 is not required to have a complicated shape as explained in FIG. 8 and may have a simple plane surface as shown in FIG. 9.

Therefore, the shape of the touch sensor 21 can be simplified so that the touch sensor 21 itself can be manufactured at lower cost. Further, the process of mounting the touch sensor 21 on the steering wheel (the deformed steering wheel 202) is simplified so that the control apparatus for controlling the operation target device can be manufactured at lower cost accordingly.

The ON/OFF switching mechanism is a rotation switch to rotate in the circumferential direction. The touch sensor 21 mounted on the grip portion 202*s* having the ON/OFF switching mechanism may include the grip detection area Arg, the operation detection area Arv and the operation invalid area Ariv as explained in FIG. 8 and FIG. 9.

However, since whether the driver has the intention of operating the operation target device or not is determined clearly due to the provision of the ON/OFF switching mechanism, only the operation detection area Arv may be provided without the grip detection area Arg and the operation invalid area Ariv. In other words, the operation detection area Arv may be provided on the entire surface of the touch sensor 21.

Next, processing executed by the controller 10 when using the deformed steering wheel 202 is explained below with reference to the flowchart shown in FIG. 48.

Figure 48:
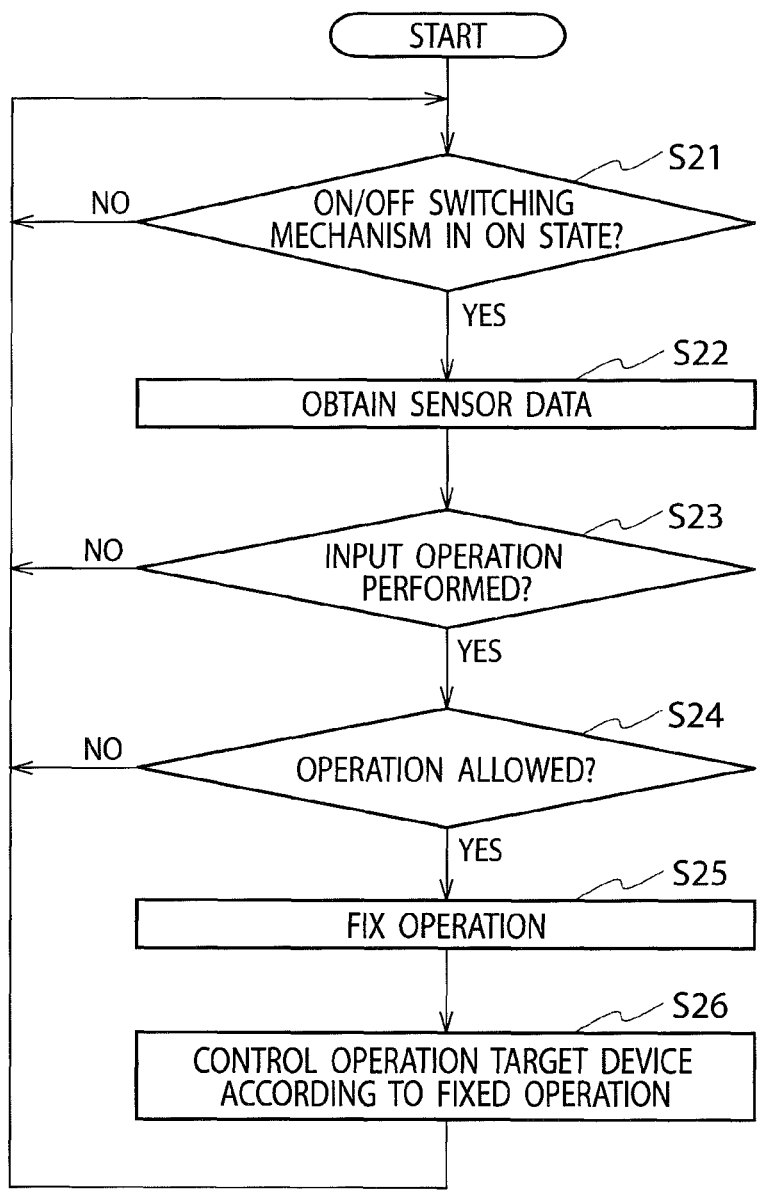
FIG. 48 is a flowchart for explaining the operation in the eighth embodiment when using the deformed steering wheel shown in FIG. 44.

In FIG. 48, the controller 10 determines whether the ON/OFF switching mechanism is in the ON state in step S21. When the controller 10 determines that the ON/OFF switching mechanism is not in the ON state (NO), the controller 10 returns to step S21. When the controller 10 determines that the ON/OFF switching mechanism is in the ON state (YES), the controller 10 obtains sensor data output from the sensor data generator 22 in step S22.

The controller 10 determines whether the input operation was performed based on the detection output from the detector 10*a* in step S23.

When the controller 10 determines that the input operation was performed (YES), the controller proceeds to step S24. When the controller 10 determines that the input operation was not performed (NO), the controller 10 returns to step S21.

The controller 10 determines in step S24 whether to allow the operation performed on the operation target device according to the input operation determined in step S23. When the controller 10 determines to allow the operation (YES), the controller 10 proceeds to step S25. When the operation is not allowable (NO), the controller 10 returns to step S21.

The controller 10 allows the operation performed on the operation target device when the particular input operation was performed on the touch sensor 21. The controller 10 fixes the operation based on the input operation in step S25, controls the operation target device according to the fixed operation in step S26, and returns to step S21.

Although the example shown in FIG. 48 does not include the process corresponding to step S2 in FIG. 4, the process of determining whether the grip portion 202*s* is gripped which corresponds to the step S2 in FIG. 4 may be carried out between step S22 and step S23.

As in the case of the constitution example shown in FIG. 44, the controller 10 can objectively determine whether the driver has the intention of operating the operation target device due to the provision of the grip portion 202*s* having the ON/OFF switching mechanism.

Accordingly the occurrence of incorrect operation can greatly be decreased. The grip portion 202*s* may return to the normal state shown in FIG. 47A when a vehicle equipped with an engine stops the engine or when an electric vehicle disconnects the power. In such a case, a motor may be installed in the grip portion 202*s* to return to the state of FIG. 47A from the state of FIG. 47C.

The touch sensor 21 may be detachably mounted on the circular portion 200*r* or the ring portion 202*r* by use of a hook-and-loop fastener. Although the circular portion 200*r* serves as the grip portion, the grip portion is not necessarily formed into a circular shape. The grip portion may be deformed as in the case of the ring portion 202*r*, or is not necessarily in a ring shape.

In the deformed steering wheel 202 shown in FIG. 44, the receiving portion having a recess may be formed on the connecting portion 202*c*1 or 202*c*2 side, and the protrusion may be formed on the grip portion 202*s* side, so as to engage the grip portion 202*s* with the connecting portion 202*c*1 or 202*c*2.

The constitution shown in FIG. 46 and FIG. 47A to FIG. 47C is an example of the ON/OFF switching mechanism, and the present embodiment is not limited only to the constitution shown in FIG. 46 and FIG. 47A to FIG. 47C.

Tenth Embodiment

A control apparatus for controlling an operation target device in a vehicle according to a tenth embodiment will be explained below. The tenth embodiment is at least one embodiment of a driver specification method. Fundamental constitutions and operations in the tenth embodiment are the same as those in the first embodiment, and only different elements will be explained below.

An embodiment of a driver specification method for specifying a driver driving a vehicle by use of the control apparatus for controlling an operation target device according to the present embodiment is explained below.

If a driver can be specified, the onboard equipment 100 can be set to an appropriate condition depending on the driver, or the vehicle can be set to an appropriate condition depending on the driver.

For example, a case may be conceived where the driver operates the audio reproduction unit 12 to automatically reproduce compositions frequently reproduced or to display compositions frequently reproduced in front of a list of compositions. In addition, a case may be conceived where an air conditioner is set to an appropriate condition or a seat is adjusted to an appropriate position depending on the driver.

Figure 49:
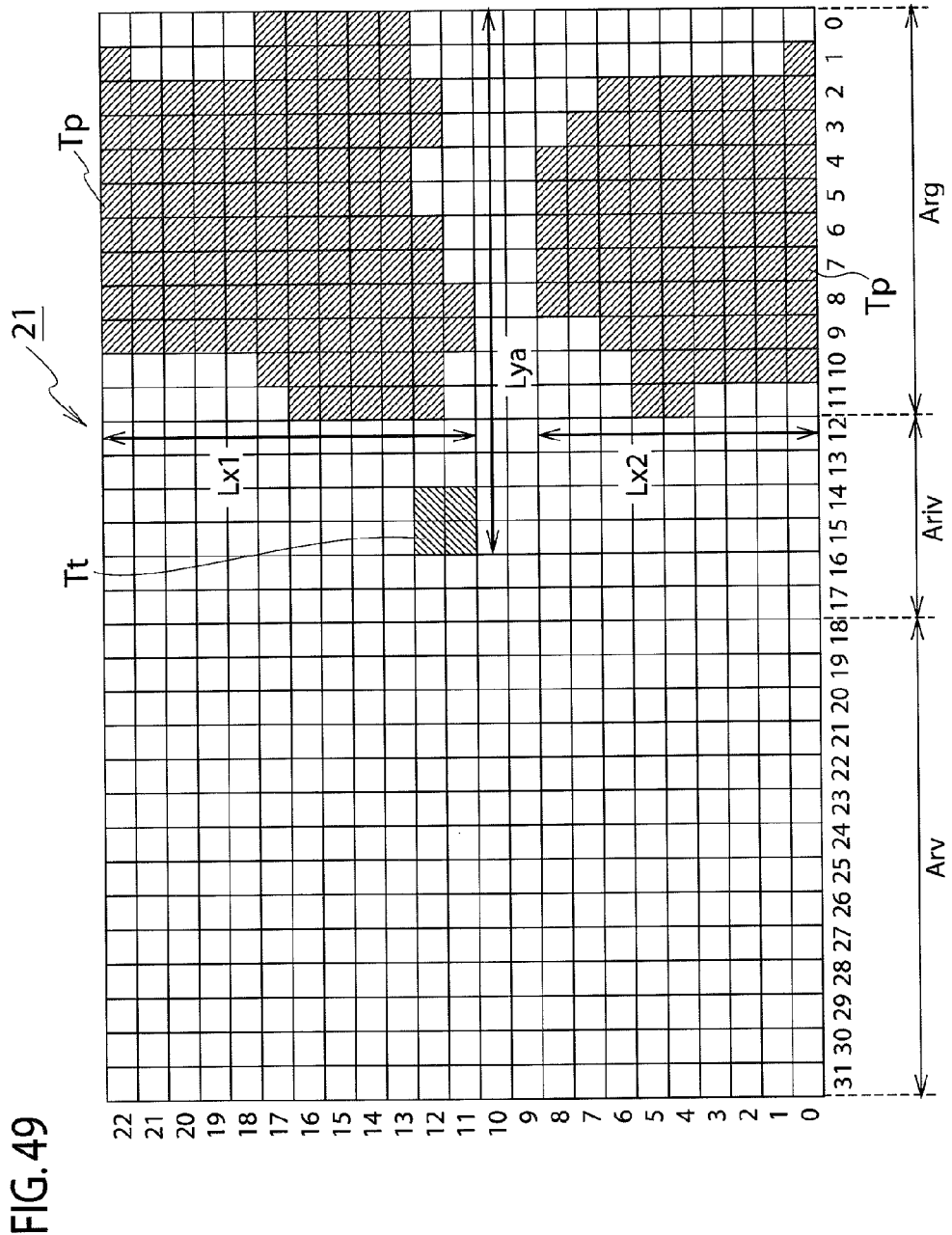
FIG. 49 is a schematic view showing an example of holding state recognition data showing how a driver holds the steering wheel on which the touch sensor is mounted.

Examples of specifying a driver are explained below with reference to FIG. 49 to FIG. 51. FIG. 49 shows an example of a contact state in the palm contact detection portions Tp and the thumb contact detection portions Tt when the driver intends to drive a vehicle and grips the circular portion 200r.

In this state, the thumb contact detection portions Tt are positioned close to the palm contact detection portions Tp since the driver does not intend to operate the operation target device with the touch sensor 21. FIG. 49 does not show the index finger contact detection portions Ti.

The controller 10 detects a length of the touched portions in the grip detection area Arg on the X-coordinate. In FIG. 49, the sum of a length Lx1 and a length Lx2 are the length of the touched portions on the X-coordinate.

Figure 50:
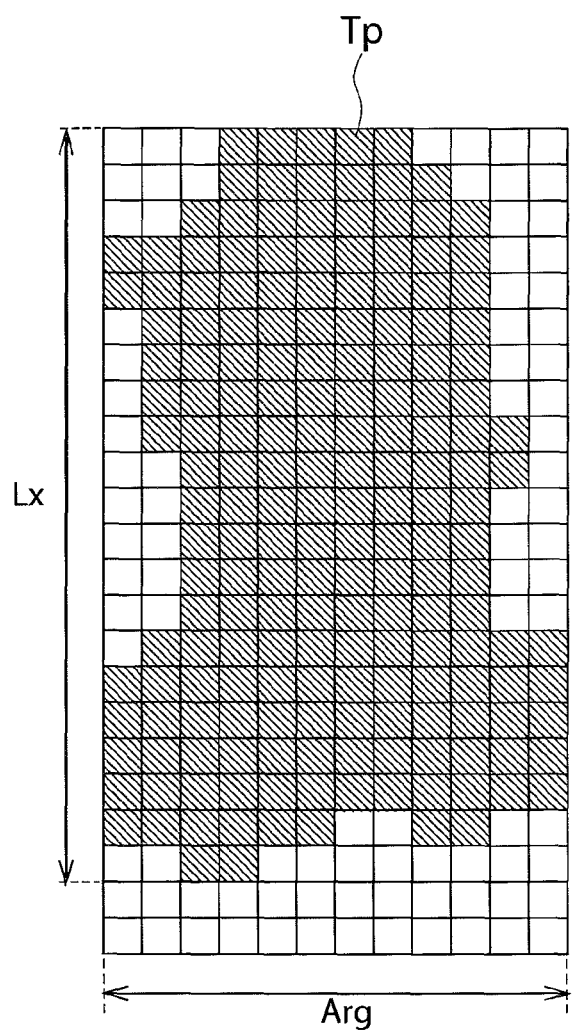
FIG. 50 is a modified schematic view of FIG. 49 for ease of comprehension.

FIG. 50 shows a state where the divided palm contact detection portions Tp in FIG. 49 are connected together, and shows a length Lx of the touched portions on the X-coordinate. The length Lx is information that shows a length of the portions gripped with the palm on the touch sensor 21 (the palm contact detection portions Tp) in the circumferential direction in the cross section when the circular portion 200r is cut in the radial direction.

The length Lx is a first example of holding state recognition data showing how the driver grips the part of the circular portion 200r on which the touch sensor 21 is mounted.

Although the controller 10 is configured to detect the length Lx, the controller 10 may obtain the number of the detection regions R corresponding to the length Lx. Of course, the number of the detection regions R corresponding to the length Lx can be converted into an actual distance.

The controller 10 also detects a length Lya of the thumb contact detection portions Tt and the palm contact detection portions Tp on the Y-coordinate. The length Lya is information that shows a length determined according to the portions in contact with the palm (the palm contact detection portions Tp) and the portions in contact with the thumb (the thumb contact detection portions Tt) on the touch sensor 21 in the circumferential direction of the steering wheel 200 (the circular portion 200r).

The length Lya is a second example of the holding state recognition data showing how the driver grips the part of the circular portion 200r on which the touch sensor 21 is mounted.

Although the controller 10 is configured to detect the length Lya, the controller 10 may obtain the number of the detection regions R corresponding to the length Lya. Of course, the number of the detection regions R corresponding to the length Lya can be converted into an actual distance.

In FIG. 49, the length between one end of the portions in contact with the palm on the opposite side of the other end towards the portions in contact with the thumb and one end of the portions in contact with the thumb on the opposite side of the other end towards the portions in contact with the palm, is defined as the length Lya. Although the present embodiment is not limited thereto, the above-described length shown in FIG. 49 is preferably defined as the length Lya.

The controller 10 further detects the total number of the detection regions R detected as touched regions (the contact detection region total number) in FIG. 49. The contact detection region total number corresponds to the area with which the hand of the driver is in contact. An actual area may be calculated based on the detected detection regions R.

Note that the contact detection region total number may be the total number of the detection regions R detected as touched regions in all of the grip detection area Arg, the operation detection area Arv and the operation invalid area Ariv, or may be the total number of the detection regions R detected as touched regions only in the grip detection area Arg.

The information corresponding to the area in the touch sensor 21 with which the hand is in contact is a third example of the holding state recognition data showing how the driver grips the part of the circular portion 200r on which the touch sensor 21 is mounted.

The driver specification may be executed according to the lengths Lx and Lya and the contact detection region total number. The driver specification may be executed only according to the lengths Lx and Lya or may be executed only according to the contact detection region total number although the specifying accuracy slightly decreases. The driver specification may be executed only according to the length Lx or only according to the length Lya.

In order to further increase the accuracy of specifying a driver in the present embodiment, the controller 10 detects, on the Y-coordinate, a length Lyb of the palm contact detection portions Tp and the thumb contact detection portions Tt in a state where the driver stretches the thumb to operate the operation target device.

Figure 51:
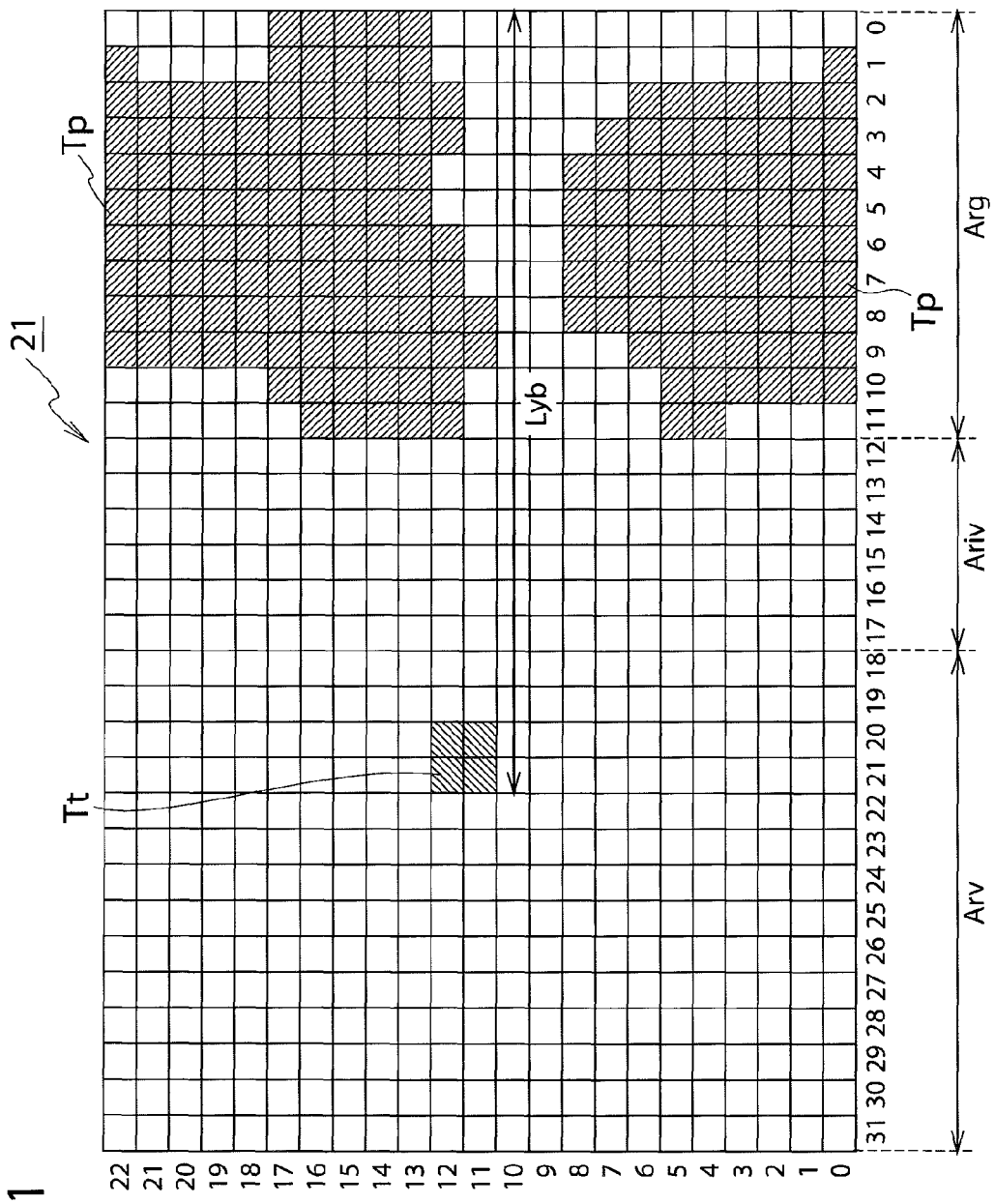
FIG. 51 is a schematic view showing another example of the holding state recognition data showing how a driver holds the steering wheel on which the touch sensor is mounted.

FIG. 51 shows a state where the driver stretches the thumb to operate the operation target device. In this case, the length Lyb of the palm contact detection portions Tp and the thumb contact detection portions Tt on the Y-coordinate is longer than the length Lya.

For example, the length Lyb can be immediately detected by use of voice directions such as, "For specifying a driver, please stretch the thumb and operate the touch sensor" after the detection of the lengths Lx and Lya and the contact detection region total number. The length Lyb may be detected after the driver actually starts operating the touch sensor 21 without any voice direction.

Although the length between one end of the portions in contact with the palm on the opposite side of the other end towards the portions in contact with the thumb and one end of the portions in contact with the thumb on the opposite side of the other end towards the portions in contact with the palm, is also defined as the length Lyb, the present embodiment is not limited thereto.

However, the above-described length shown in FIG. 51 is preferably defined as the length Lyb. The length Lyb is a fourth example of the holding state recognition data showing how the driver grips the part of the circular portion 200r on which the touch sensor 21 is mounted.

Figures 52, 53:
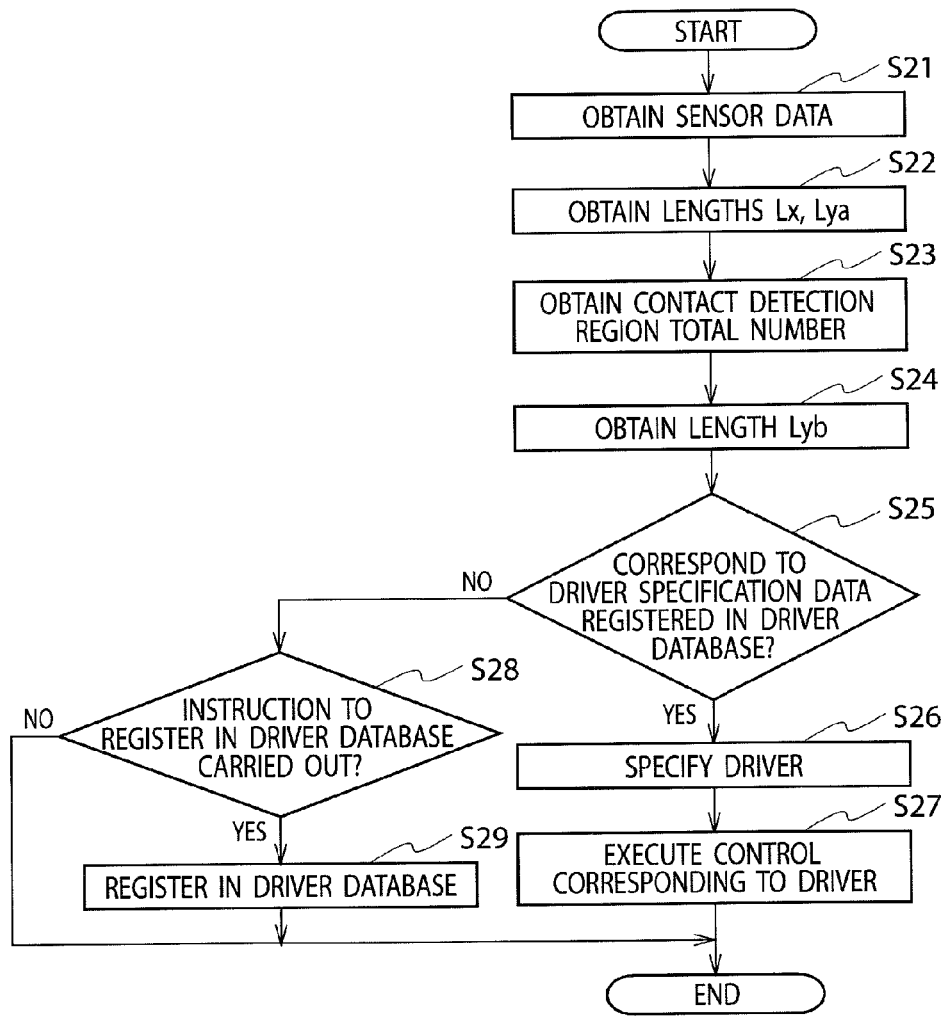
FIG. 52 is a view showing an example of driver specification data registered in a driver database.
FIG. 53 is a flowchart for explaining a process when specifying a driver.

FIG. 52 shows an example of a driver database stored in the storage unit 18. The lengths Lx, Lya and Lyb and the contact detection region total number are registered as driver specification data of each of drivers A, B and C.

Since each data of the lengths Lx, Lya and Lyb and the contact detection region total number does not necessarily result in the same value each time for each driver, an average value of each data is preferably registered every time the driver is specified. The driver specification data shows how the part of the circular portion 200r on which the touch sensor 21 is mounted is gripped. As described above, the information about the driver specification data may be registered correspondingly to the holding state recognition data obtained by the controller 10 for the driver specification.

The controller 10 may recognize the shape of the palm contact detection portions Tp and use the shape as an element for the driver specification. Although the thumb contact detection portions Tt are used in this example described above, the index finger contact detection portions Ti may be used in place of the thumb contact detection portions Tt or in addition to the thumb contact detection portions Tt.

Next, processing of specifying a driver executed by the controller 10 is explained below with reference to FIG. 53. As shown in FIG. 53, the controller 10 obtains sensor data output from the sensor data generator 22 in step S21.

The controller 10 then obtains the lengths Lx and Lya in step S22. The controller 10 can obtain the lengths Lx and Lya since the driver first grips the circular portion 200r for driving the vehicle.

As described above, the detector 10a detects the driver gripping the circular portion 200r (the touch sensor 21) based on the sensor data output from the sensor data generator 22. Thus, the controller 10 may obtain the lengths Lx and Lya after detecting the circular portion 200r being gripped. The controller 10 obtains the contact detection region total number in step S23. The order of step S22 and step S23 may be reversed.

The controller 10 obtains the length Lyb in step S24 after the controller 10 instructs the driver to stretch the thumb or after the driver starts operating the touch sensor 21. The process of step S24 may be omitted.

In step S25, the controller 10 compares the obtained holding state recognition data of the length Lx, Lya and Lyb and the contact detection region total number with the driver specification data registered in the driver database so as to determine whether the obtained holding state recognition data corresponds to the driver specification data of any driver.

Here, the respective pieces of data of the same driver do not necessarily correspond to each other. Therefore, the controller 10 sets a predetermined allowable range in the registered driver specification data and determines that the respective pieces of data correspond to each other when the obtained holding state recognition data of the lengths Lx, Lya and Lyb and the contact detection region total number is included in the allowable range.

When the controller 10 determines that the obtained holding state recognition data corresponds to the data of one of the drivers in step S25 (YES), the controller 10 specifies the driver in step S26, carries out the control corresponding to the driver in step S27 and finishes the processing. The control corresponding to the driver is to adjust the state of the onboard equipment 100 or the vehicle to appropriate conditions corresponding to the respective drivers.

Note that, if the driver is specified during driving of the vehicle, the position of the seat among the conditions of the vehicle is, of course, not adjusted.

When the controller 10 determines that there is no driver corresponding to the data in step S25 (NO), the controller 10 determines in step S28 whether the instruction to register the data in the driver database was carried out.

When the controller 10 determines that the instruction to register the data in the driver database was carried out (YES), the controller 10 in step S29 relates the name of the driver input by the operation unit (not shown in FIG. 1) to the obtained holding state recognition data of the lengths Lx, Lya and Lyb and the contact detection region total number, registers the related data in the driver database as the driver specification data and finishes the processing.

When the controller 10 determines that the instruction to register the data in the driver database was not carried out (NO), the controller 10 immediately finishes the processing.

As is apparent from the explanation above, the controller 10 is a driver specification unit that obtains the holding state recognition data showing how the driver grips the part of the circular portion 200r on which the touch sensor 21 is mounted based on the sensor data output from the sensor data generator 22 and compares the holding state recognition data with the driver specification data so as to specify the driver.

At the point of specifying the driver, the controller 10 learns a manner by which the onboard equipment 100 is operated and a situation where the vehicle is placed so as to recognize the characteristics of the respective drivers.

Although FIG. 1 does not show the operation of inputting information about conditions of the air conditioner or information about a position of a seat into the controller 10, these pieces of information may be supplied to the controller 10 via the in-vehicle communication unit 34.

Next, other examples of the holding state recognition data obtained to specify a driver is explained with reference to FIG. 54A and FIG. 54B. The gripping position on the circular portion 200r varies depending on the driver. Therefore, the gripping position in the circular portion 200r may be detected to be used as the holding state recognition data for the driver specification.

When the positions of the grip detection area Arg and the operation detection area Arv, and the operation invalid area Ariv used as necessary, are determined dynamically depending on the position on the touch sensor 21 that the driver grips, the gripping position on the circular portion 200r may be used as the holding state recognition data for the driver specification.

Figure 54A:
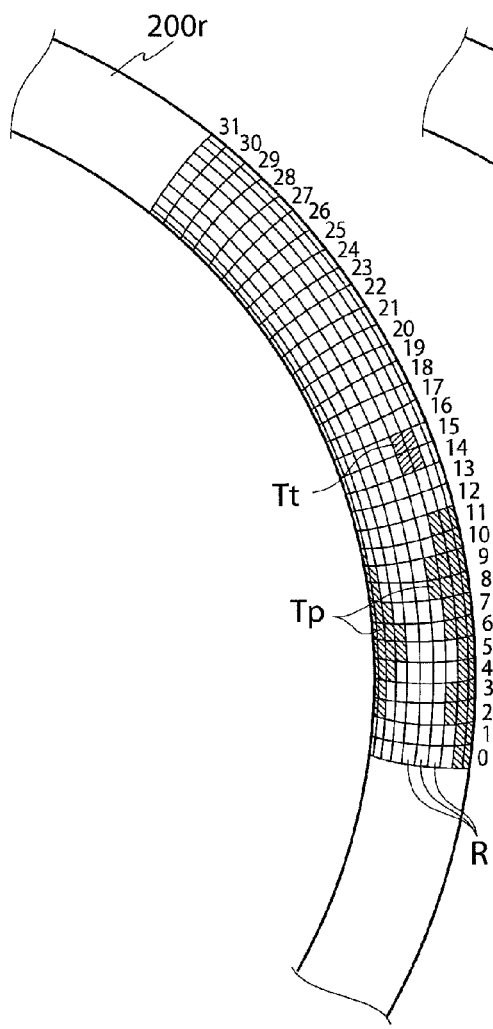
FIG. 54A and FIG. 54B are partial perspective views each showing still another example of the holding state recognition data showing how a driver holds the steering wheel on which the touch sensor is mounted.
Figure 54B:
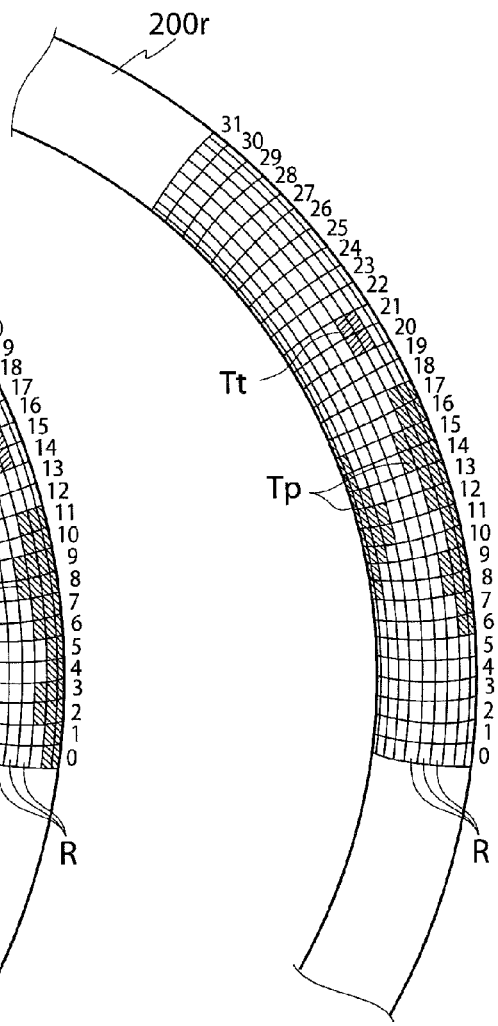

FIG. 54A is a state where the driver grips the lower end of the touch sensor 21, which is set as the grip detection area Arg. FIG. 54B is a state where the driver grips the position slightly above and away from the lower end of the touch sensor, which is set as the grip detection area Arg.

The position where the grip detection area Arg is arranged in the touch sensor 21 may be determined based on the Y-coordinate. For example, based on the integrated value on the Y-coordinate in the grip detection area Arg, the driver is conceived to grip a lower portion of the touch sensor 21 as the integrated value is smaller and conceived to grip an upper portion of the touch sensor 21 as the integrated value is larger.

The information showing the gripping position in the circumferential direction of the steering wheel 200 is registered in the driver database shown in FIG. 52 as the driver specification data. The controller 10 obtains, as the holding state recognition data, the information showing the gripping position in the circumferential direction of the steering wheel 200.

The information showing the gripping position on the steering wheel 200 is a fifth example of the holding state recognition data showing how the driver grips the part of the circular portion 200r on which the touch sensor 21 is mounted. The driver may be specified based on the information showing the gripping position on the steering wheel 200 although the accuracy of the driver specification decreases.

The first to fifth examples of the holding state recognition data described above may be combined as appropriate. One or plural examples may be selected as appropriate in view of the accuracy of the driver specification. Of course, the use of all of the first to fifth examples significantly increases the accuracy of the driver specification.

The present invention is not limited to the first to tenth embodiments described above, and various modifications and improvements can be made without departing from the scope of the present invention. The first to tenth embodiments described above may be combined as appropriate.

The first to tenth embodiments may be used as a control apparatus for controlling an arbitrary operation target device in the vehicle. These embodiments may also be used for any vehicles other than automobiles. Further, these embodiments may be used as a control apparatus for controlling games in game machines using operation units (controllers) such as steering wheels.

The detailed description described above discloses control apparatuses for controlling an operation target device in a vehicle at least described below in addition to control apparatuses for controlling an operation target device in a vehicle described in claims.

A control apparatus for controlling an operation target device in a vehicle, comprising:
 a data sensor generator that includes a plurality of detection regions and configured to generate sensor data including positional data showing which detection region is touched based on a contact detection signal obtained from a touch sensor mounted in a predetermined range of a grip portion that a driver grips on a steering wheel;
 a detector configured to detect whether the driver grips the grip portion and detect an input operation performed on the touch sensor based on the sensor data; and
 a controller configured to, when the detector detects the driver gripping the grip portion and detects a particular input operation being performed on the touch sensor, control an operation target device to be operated with the touch sensor according to the particular input operation.

A steering wheel comprising:
 a grip portion that a driver grips;
 a touch sensor including a plurality of detection regions and mounted in and covering a predetermined range of the grip portion;
 a sensor data generator configured to generate sensor data including positional data showing which detection region is touched based on a contact detection signal obtained from the touch sensor;
 a detector configured to detect whether the driver grips the touch sensor in the grip portion and detect an input operation performed on the touch sensor based on the sensor data; and
 a control signal generator configured to, when the detector detects the driver gripping the touch sensor and detects a particular input operation being performed on the touch sensor, control an operation target device to be operated with the touch sensor according to the particular input operation.

A control apparatus for controlling an operation target device in a vehicle, comprising:
 a data sensor generator that includes a plurality of detection regions and configured to generate sensor data including positional data showing which detection region is touched based on a contact detection signal obtained from a touch sensor mounted in and covering a predetermined range of a grip portion that a driver grips on a steering wheel of a vehicle;
 a detector configured to detect an input operation performed on the touch sensor based on the sensor data; and
 a controller configured to, when the detector detects a particular input operation being performed on the touch sensor, control an operation target device to be operated with the touch sensor according to the particular input operation, the controller disabling a control performed on the operation target device when the vehicle is in a particular state.

A control apparatus for controlling an operation target device in a vehicle, comprising:
 a data sensor generator that includes a plurality of detection regions and configured to generate sensor data including positional data showing which detection region is touched based on a contact detection signal obtained from a touch sensor mounted in a predetermined range of a grip portion that a driver grips on a steering wheel;
 a detector configured to detect an input operation performed on the touch sensor based on the sensor data; and
 a controller configured to switch from a state where a first particular input operation performed on an operation target device to be operated with the touch sensor is not accepted to a state where the first particular input operation is accepted when the detector detects a predetermined input operation being performed with each of right and left hands of the driver on the touch sensor.

What is claimed is:

1. A control apparatus for controlling an operation target device in a vehicle, comprising:
 a touch sensor mounted on a grip portion that a driver grips on a steering wheel, the touch sensor including a first area, a second area and a third area, the first area located in an area where a palm of the driver makes contact, the second area located on an upper side of the first area and located in an area where a thumb or an index finger of the driver makes contact, the third area provided as an operation invalid area where an operation input is invalid and located between the first area and the second area;
 a first detector configured to detect a state where the first area is touched;
 a second detector configured to detect a state where a particular input operation is performed on the second area, the particular input operation being a sliding pattern by the thumb or the index finger on the second area; and
 a controller configured to control an operation target device to be operated with the touch sensor according to the sliding pattern when the first detector detects the state where the first area is touched by the palm and the second detector detects the state where the sliding pattern was performed on the second area by the thumb or the index finger.

2. The control apparatus for controlling an operation target device in a vehicle according to claim 1, wherein the first detector determines that the first area is touched by the palm when the first detector detects a predetermined area or greater of the first area being touched.

3. The control apparatus for controlling an operation target device in a vehicle according to claim 1, wherein the second area includes a front side facing the driver and a rear side, the second detector detects the state where the sliding pattern was performed on the front side by the thumb and the state where sliding pattern was performed on the rear side by the index finger.

4. A method for controlling an operation target device in a vehicle, the vehicle comprising a touch sensor mounted on a grip portion that a driver grips on a steering wheel the touch sensor comprising a first area, a second area and a third area, the first area located in an area where a palm of the driver makes contact, the second area located on an upper side of the first area and located in an area where a thumb or an index finger of the driver makes contact, the third area provided as an operation invalid area where an operation input is invalid located between the first area and the second area, the method comprising:

detecting a state where the first area is touched;

detecting a particular input operation being performed on the second, area, the particular input operation being a sliding pattern by the thumb or the index finger on the second area; and controlling an operation target device to be operated with the touch sensor according to the sliding pattern when the state where the first area is touched by the palm is detected and the sliding pattern was performed on the second area by the thumb or the index finger.

5. The method for controlling an operation target device in a vehicle according to claim 4, wherein the state where the first area is touched by the palm is detected when detecting a predetermined area or greater of the first area being touched.

6. The method for controlling an operation target device in a vehicle according to claim 4, wherein the second area includes a front side facing the driver and a rear side, further comprising detection of the state where the sliding pattern by the thumb on the front side was performed and detection of the state where the sliding pattern by the index finger on the rear side was performed.

\* \* \* \* \*